US012473308B2

(12) United States Patent
Braddock-Wilking et al.

(10) Patent No.: US 12,473,308 B2
(45) Date of Patent: Nov. 18, 2025

(54) LUMINESCENT SILAFLUORENE AND GERMAFLUORENE COMPOUNDS

(71) Applicant: The Curators Of The University Of Missouri, Columbia, MO (US)

(72) Inventors: Janet Braddock-Wilking, St. Louis, MO (US); Cynthia M. Dupureur, St. Louis, MO (US); Stephan Germann, St. Louis, MO (US); Helena Spikes, St. Louis, MO (US)

(73) Assignee: The Curators of the University of Missouri, Columbia, MO (US)

( * ) Notice: Subject to any disclaimer, the term of this patent is extended or adjusted under 35 U.S.C. 154(b) by 1073 days.

(21) Appl. No.: 17/594,282

(22) PCT Filed: Apr. 9, 2020

(86) PCT No.: PCT/US2020/027355
§ 371 (c)(1),
(2) Date: Oct. 8, 2021

(87) PCT Pub. No.: WO2020/210416
PCT Pub. Date: Oct. 15, 2020

(65) Prior Publication Data
US 2022/0162235 A1 May 26, 2022

Related U.S. Application Data

(60) Provisional application No. 62/831,924, filed on Apr. 10, 2019.

(51) Int. Cl.
| | |
|---|---|
| *C07F 7/08* | (2006.01) |
| *C07F 7/30* | (2006.01) |
| *C09K 11/06* | (2006.01) |
| *C12Q 1/02* | (2006.01) |
| *G01N 1/30* | (2006.01) |
| *G01N 21/64* | (2006.01) |

(52) U.S. Cl.
CPC ............ *C07F 7/0816* (2013.01); *C07F 7/083* (2013.01); *C07F 7/30* (2013.01); *C09K 11/06* (2013.01); *C12Q 1/02* (2013.01); *G01N 1/30* (2013.01); *G01N 21/6428* (2013.01); *C09K 2211/1018* (2013.01); *G01N 2001/302* (2013.01); *G01N 2021/6439* (2013.01)

(58) Field of Classification Search
CPC .......... C07F 7/0816; C07F 7/083; C07F 7/30; C09K 11/06; C09K 2211/1018; C12Q 1/02; G01N 1/30; G01N 21/6428; G01N 2001/302; G01N 2021/6439
See application file for complete search history.

(56) References Cited

U.S. PATENT DOCUMENTS

| 7,662,478 B2 | 2/2010 | Kobayashi et al. |
| 8,492,007 B2 | 7/2013 | Kobayashi et al. |
| 2006/0094042 A1 * | 5/2006 | Mackintosh ........ C09B 67/0083 549/299 |

FOREIGN PATENT DOCUMENTS

WO  WO-2013188421 A1 * 12/2013 ............... C07F 7/30

OTHER PUBLICATIONS

Hammerstroem, et al., Journal of Organometallic Chemistry 813 (2016) 110-118) (Year: 2016).*
Hammerstroem, et al., Journal of Organometallic Chemistry 830 (2017) 196-202 (Year: 2017).*
R.M. Christie, Handbook of Textile and Industrial Dyeing, vol. 1, Chapter 17 (Year: 2011).*
D. Linke, Chapter 34 Detergents: An Overview, in 463 Methods in Enzymology vol. 603-617 (2009) (Year: 2009).*
A. Klymchenko et al., 50 Accounts of Chemical Research, 366-375 (2017) (Year: 2017).*
A. van de Ven et al., 14 Journal of Biomedical Optics, 1-10 (2009) (Year: 2009).*
S. Mallick et al., 499 Journal of Colloid and Interface Science, 46-53 (2017) (Year: 2017).*
L. Li et al., 51 Tetrahedron Letters, 622-624 (2010) (Year: 2010).*
D. Hammerstroem et al., 830 Journal of Organometallic Chemistry, 196-202 (2017) (Year: 2017).*
Auvray et al., Silafluorene as a promising core for cell-permeant, highly bright and two-photon excitable fluorescent probes for live-cell imaging, Dyes and Pigments, 2021, vol. 187, pp. 109083-109091.
Fuller et al., "Solvatochromism in perylene diimides; experiment and theory", Phys. Chem. Chem. Phys., 2017, vol. 19, pp. 31781-31787.
Gao et al., "Fluorescent probes for organelle-targeted bioactive species imaging", Chem. Sci., 2019, vol. 10, pp. 6035-6071.
Niko et al., "Emerging Solvatochromic Push-Pull Dyes for Monitoring the Lipid Order of Biomembranes in Live Cells", J. Biochem., 2021, pp. 1-12.
Park et al., "Effect of conjugation on the optoelectronic properties of pyrazine-based push-pull chromophores: Aggregation-induced emission, solvatochromism, and acidochromism", Dyes and Pigments, 2021, vol. 190, p. 109320.
Schafer-Hales et al., "Fluorene-Based Fluorescent Probes with High Two-Photon Action Cross-sections for Biological Multiphoton Imaging Applications", Journal of Biomedical Optics, 2005, vol. 10, No. 5, pp. 1-8.
Spikes et al., "Group 14 Metallafluorenes as Sensitive Luminescent Probes of Surfactants in Aqueous Solution", J. Fluoresc., 2021, vol. 31, No. 4, pp. 961-969.
Spikes et al., "Group 14 Metallafluorenes for Lipid Structure Detection and Cellular Imaging", Chem. Proc., 2021, vol. 3, https://doi.org/10.3390/CSAC2021-10455, 6 pages.

(Continued)

*Primary Examiner* — Alexander R Pagano
(74) *Attorney, Agent, or Firm* — Armstrong Teasdale LLP

(57) ABSTRACT

Described herein are luminescent sila- and germafluorenes. Also described herein are methods of making and using sila- and germafluorenes. The position and the type of substituent impact the absorption and emission properties in solution and in the solid-state and subsequently influence the role of sila- and germafluorenes as biosensors.

10 Claims, 53 Drawing Sheets

(56) References Cited

OTHER PUBLICATIONS

Tarai et al., "ICT and AIE Characteristics Two Cyano-Functionalized Probes and Their Photophysical Properties, DFT Calculations, Cytotoxicity, and Cell Imaging Applications", Molecules, 2020, vol. 25, 14 pages.

Wang et al., Conjugated Fluorene and Silole Copolymers: Synthesis Characterization, Electron Transmission, Light Emission, Photovoltaic Cell, and Field Effect Hole Mobility in Macromolecules, 2005, vol. 38, pp. 2253-2260.

Zhao et al., "A viscosity sensitive azide-pyridine BODIPY-based fluorescent dye for imaging of hydrogen sulfide in living cells", Dye. Pigment, 2018, vol. 159, pp. 166-172.

International Search Report and Written Opinion for PCT/US2020/027355, mailed Jul. 16, 2020, 11 pages.

\* cited by examiner

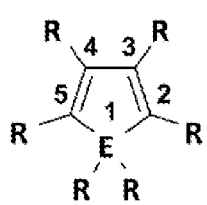 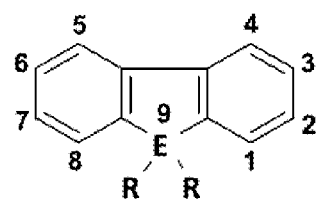
E = Si, silole                    E = Si, dibenzosilole
    Ge, germole                       Ge, dibenzogermole
sila - and germacyclopentadiene    sila - and germafluorene
FIG. 5

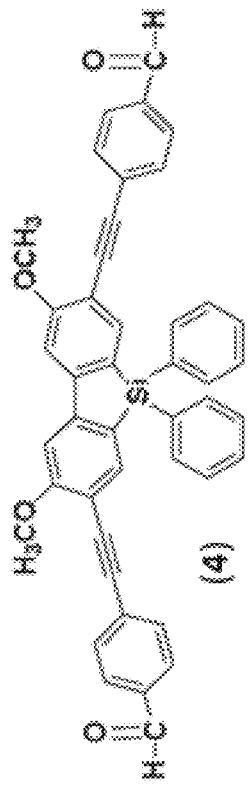
(4)
Selected Bond distances (Å)
Si-C (ring) 1.855, 1.858
Si-C (phenyl) 1.865, 1.865
C-C (central ring) 1.407, 1.482, 1.408
Selected bond angles (deg)
C-Si-C (exocyclic) 112.50
C-Si-C (central ring) 91.47
Torsion angles (deg) 7.66, 8.96
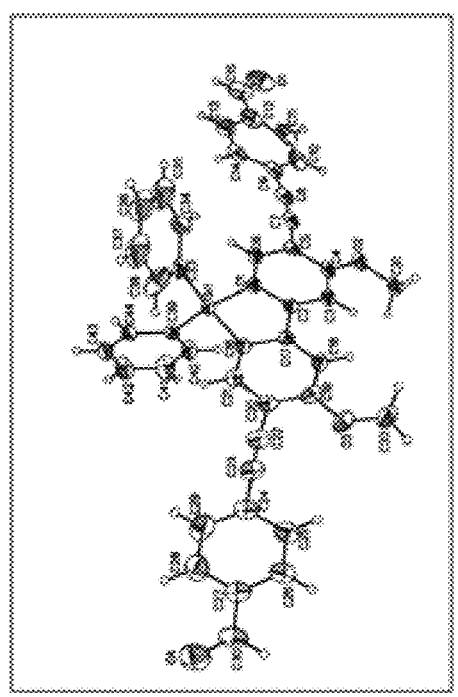
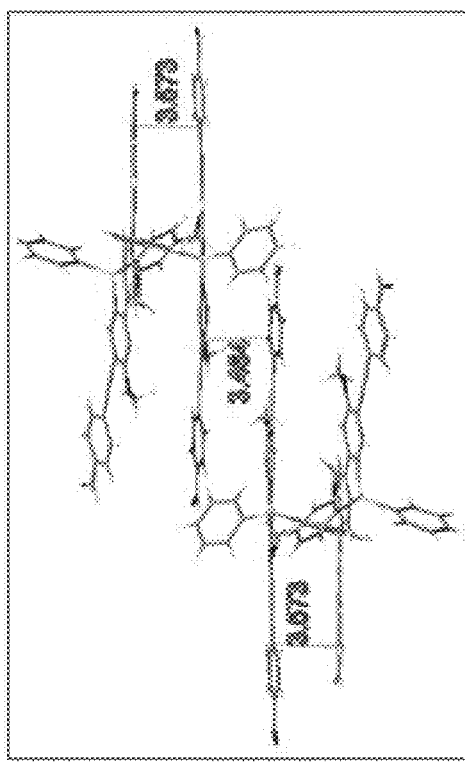
The packing in the crystalline lattice shows a repeating pattern with two molecules nearly coplanar but offset to each other and two other molecules with different orientations than the center two molecules.
FIG. 14

Fluorescence of several silafluorenes dissolved in DMSO and diluted in aqueous buffer.

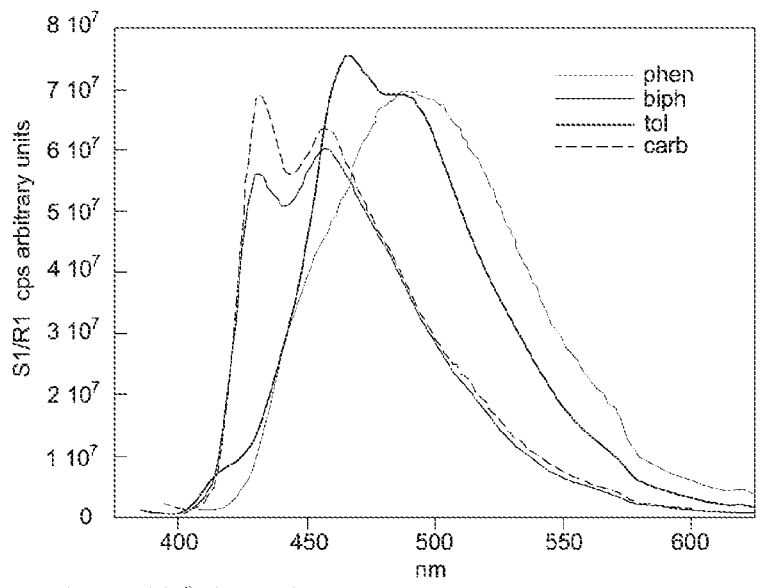

For carbazole and biphenyl: ~ 425, 450 nm;
compare to 418, 433 and 417, 440 nm (in $CH_2Cl_2$), respectively.

$\lambda_{max}$ for *p*-tol : 460 and 480 nm; compare to 405, 426 nm (in $CH_2Cl_2$).

$\lambda_{max}$ for phen: ca 490 nm; compare to 420, 447 nm (in $CH_2Cl_2$).
Aqueous solution may contain suspended particles.
Solid-state $\lambda_{em}$ is 491 nm for phenanthrene-silafluorene.

FIG. 18

Each structure's backbone provides unique electronic characteristics; the phenyl groups enhance solution emission; methoxy groups assist with synthesis and water-solubility; R groups are used to tune fluorescence.

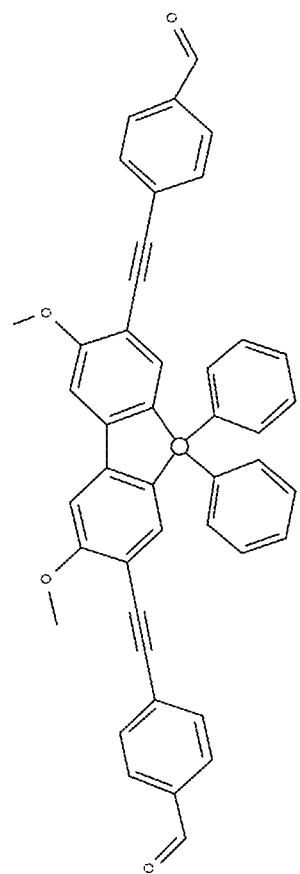
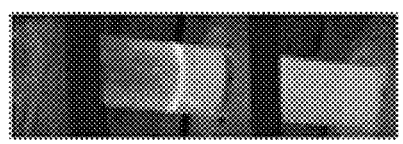
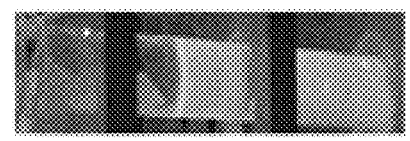
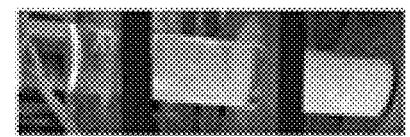
FIG. 25

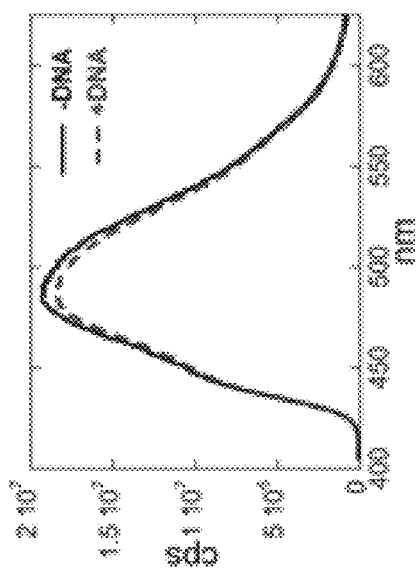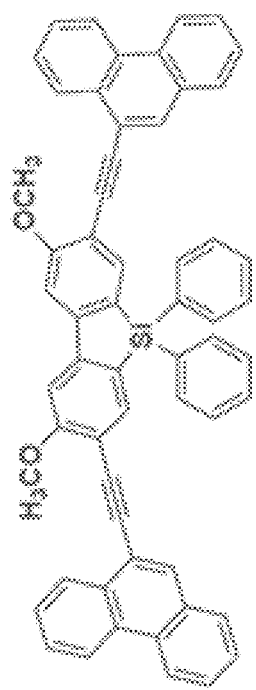
FIG. 29

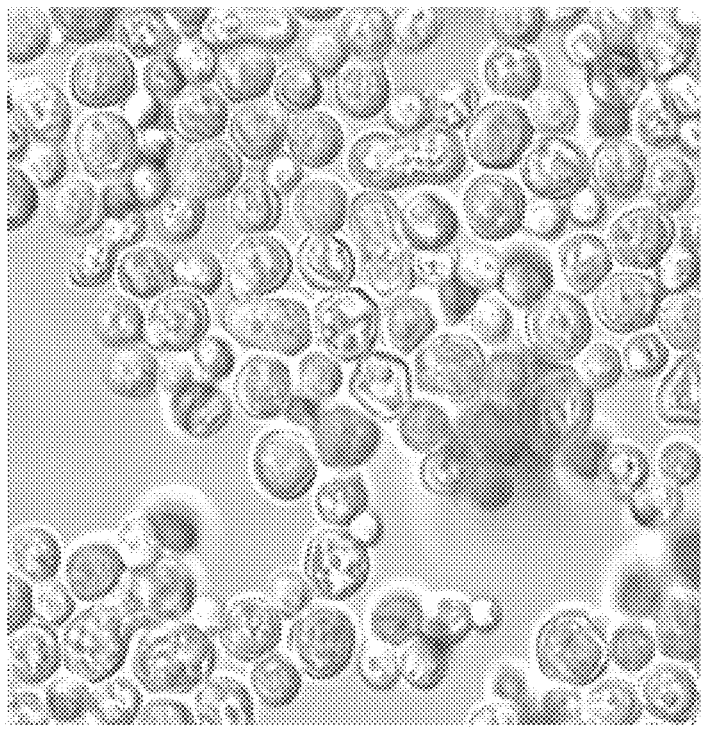
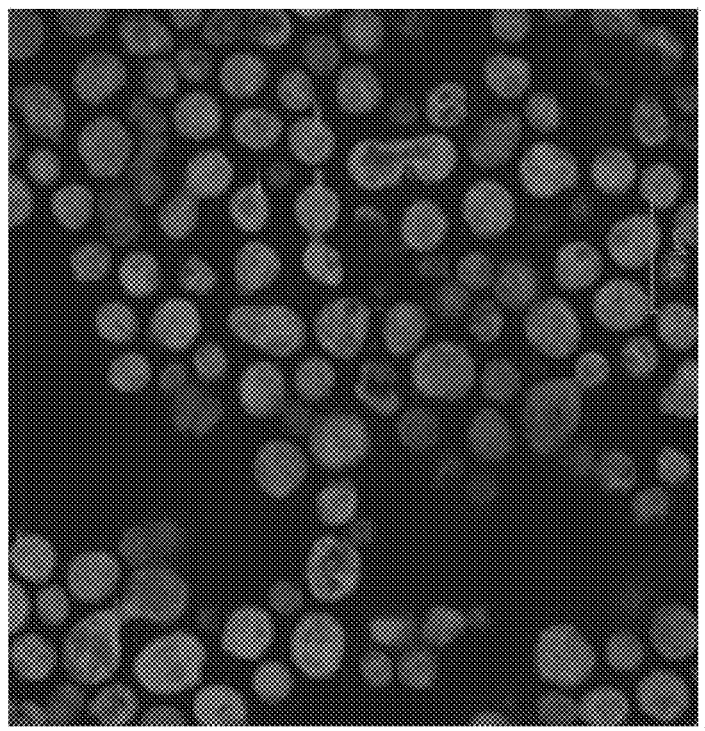
FIG. 37

LUMINESCENT SILAFLUORENE AND GERMAFLUORENE COMPOUNDS

CROSS-REFERENCE TO RELATED APPLICATIONS

This application is a U.S. National Phase Application of International Patent Application No. PCT/US2020/027355 filed Apr. 9, 2020, which claims priority to U.S. Provisional Application No. 62/831,924 filed Apr. 10, 2019, the contents of which are incorporated herein by reference in their entirety.

FEDERAL SUPPORT

This invention was made with government support under National Science Foundation grant CHE-1362431. The government has certain rights in the invention.

FIELD OF DISCLOSURE

Described herein are luminescent sila- and germafluorenes. The position and the type of substituent impact the absorption and emission properties in solution and in the solid-state and subsequently influence the role of sila- and germafluorenes as biosensors.

BACKGROUND OF THE DISCLOSURE

Bioimaging has become the centerpiece of cell biology and diagnostic medicine. The ability to literally look at the interior structures of cells has dramatically increased understanding of their processes, including disease. This has been made possible through the development and application of fluorescent or luminescent molecules, which are introduced into cells and used to map structures and track biochemical processes.

Ideal compounds for the bioimaging applications have some of the following properties: (a) chemical stability in a cell; (b) high quantum efficiency; (c) favorable excitation and emission maxima and Stokes shift; (d) low toxicity; (e) facile synthetic preparation that could also involve efficiency and low environmental impact (green chemistry); and (f) sensitivity to differences in cellular structures and conditions such as pH, oxygen levels, viscosity, etc.

Molecules containing Si as a central atom (not as a protecting group) with aromatic polycyclic groups have been shown to have useful applications in the biological milieu. Sila-dimetricrine and disila-bexarotene are examples.

Sila- and germafluorenes represent a unique opportunity to add to the repertoire of luminescent compounds used in bioimaging. They have exceptional quantum efficiencies, remarkable chemical stability, and many of the compounds, including many of the compounds described herein, are nontoxic to cells. Through the synthesis of new sila- and germafluorenes, there is great potential for favorable tuning of spectral properties and synthetic efficiency. These compounds can target specific cellular structures and are useful in mapping.

Described herein are sila- and germafluorenes that have shown excellent solid-state properties as Group 14-based luminophores such as high thermal stability and strong luminescence in both solution and in the solid-state. These properties are often good indicators for interactions with biomolecules, which can shield molecules from solvent-induced relaxation.

Also described herein are a series of silafluorenes with a broad range of alkynyl substituent groups. Also described herein are the synthesis routes for these compounds and the use of these compounds as probes for bioimaging.

BRIEF DESCRIPTION OF THE DISCLOSURE

In one aspect, disclosed herein is a compound of Formula I,

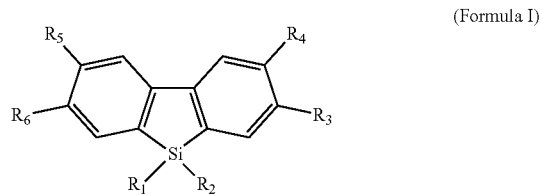
(Formula I)

wherein $R_1$ and $R_2$ are each independently selected from the group consisting of hydrogen, alkyl, and aryl;

wherein $R_3$, $R_4$, $R_5$, and $R_6$ are each independently selected from the group consisting of hydrogen, alkoxy, Y, and

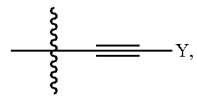

with the proviso that at least two of $R_3$, $R_4$, $R_5$, and $R_6$ are selected from the group consisting of Y and

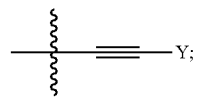

and wherein Y is selected from the group consisting of aryl, substituted aryl, heteroaryl, and substituted heteroaryl.

In another aspect, disclosed herein is a method of producing a compound of Formula I,

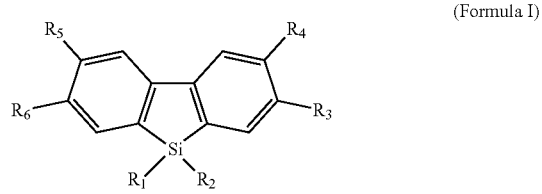
(Formula I)

wherein $R_1$ and $R_2$ are each independently selected from the group consisting of hydrogen, alkyl, and aryl;

wherein $R_3$, $R_4$, $R_5$, and $R_6$ are each independently selected from the group consisting of hydrogen, alkoxy, Y, and

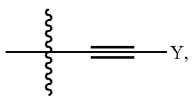

with the proviso that at least two of $R_3$, $R_4$, $R_5$, and $R_6$ are selected from the group consisting of Y and

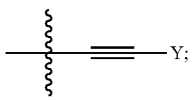

and
wherein Y is selected from the group consisting of aryl, substituted aryl, heteroaryl, and substituted heteroaryl, the method comprising
forming a mixture comprising
a compound of Formula II,

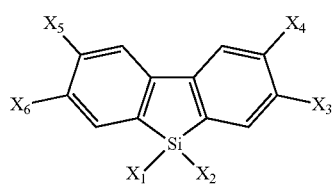

(Formula II)

wherein $X_1$ and $X_2$ are each independently selected from the group consisting of hydrogen, alkyl, and aryl; and
wherein $X_3$, $X_4$, $X_5$, and $X_6$ are each independently selected from the group consisting of hydrogen, alkoxy, and halogen with the proviso that at least two of $X_3$, $X_4$, $X_5$, and $X_6$ are halogen;
a compound of Formula III, R—Y    (Formula III)

wherein R is selected from the group consisting of hydrogen, alkynyl, and borono;
a noble metal catalyst;
a base; and
optionally a co-catalyst comprising a metal; and
reacting the mixture.
In another aspect, disclosed herein is a method of measuring luminescence, the method comprising
introducing a composition comprising
a compound of Formula I,

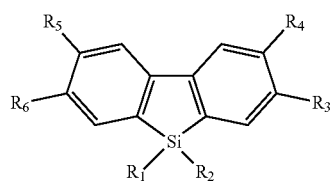

(Formula I)

wherein $R_1$ and $R_2$ are each independently selected from the group consisting of hydrogen, alkyl, and aryl; and wherein $R_3$, $R_4$, $R_5$, and $R_6$ are each independently selected from the group consisting of hydrogen, alkoxy, Y, and

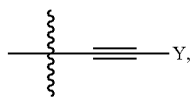

with the proviso that at least two of $R_3$, $R_4$, $R_5$, and $R_6$ are selected from the group consisting of Y and

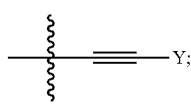

wherein Y is selected from the group consisting of aryl, substituted aryl, heteroaryl, and substituted heteroaryl:
a solvent; and
optionally a detergent;
optically exciting the composition; and
measuring the luminescence produced by the compound of Formula I.

In another aspect, disclosed herein is a compound of Formula IV,

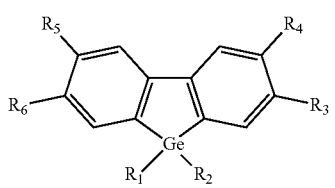

(Formula IV)

wherein $R_1$ and $R_2$ are each independently selected from the group consisting of hydrogen, alkyl, and aryl;
wherein $R_3$, $R_4$, $R_5$, and $R_6$ are each independently selected from the group consisting of hydrogen, alkoxy, Y, and

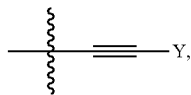

with the proviso that at least two of $R_3$, $R_4$, $R_3$, and $R_6$ are selected from the group consisting of Y and

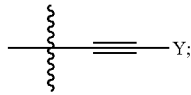

and wherein Y is selected from the group consisting of

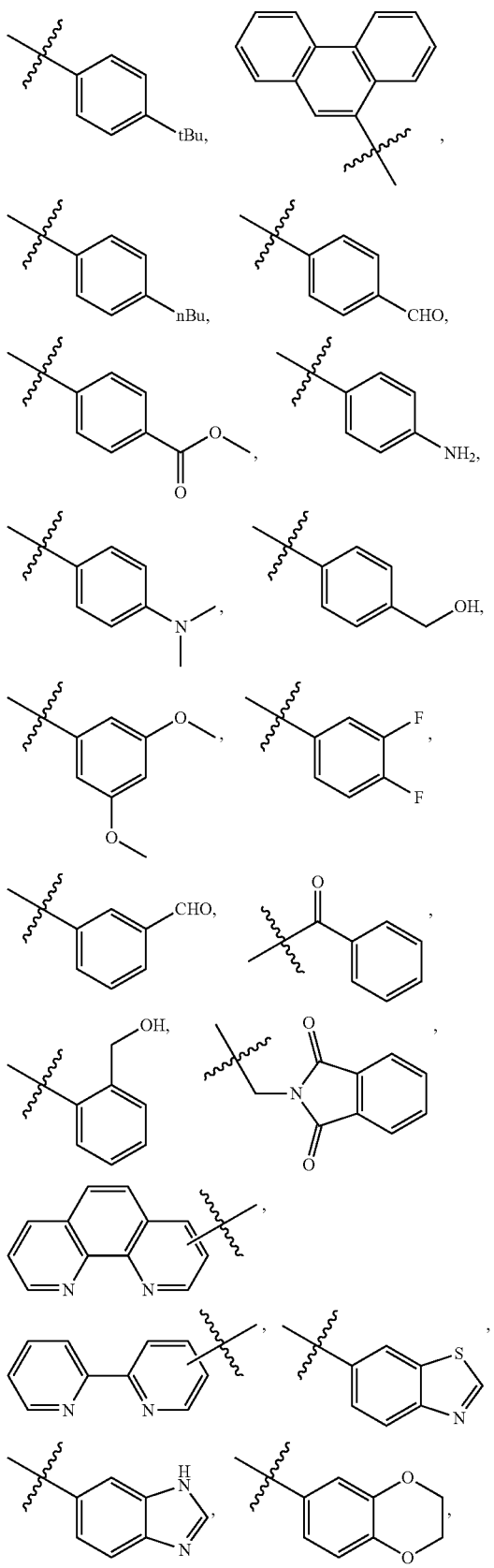

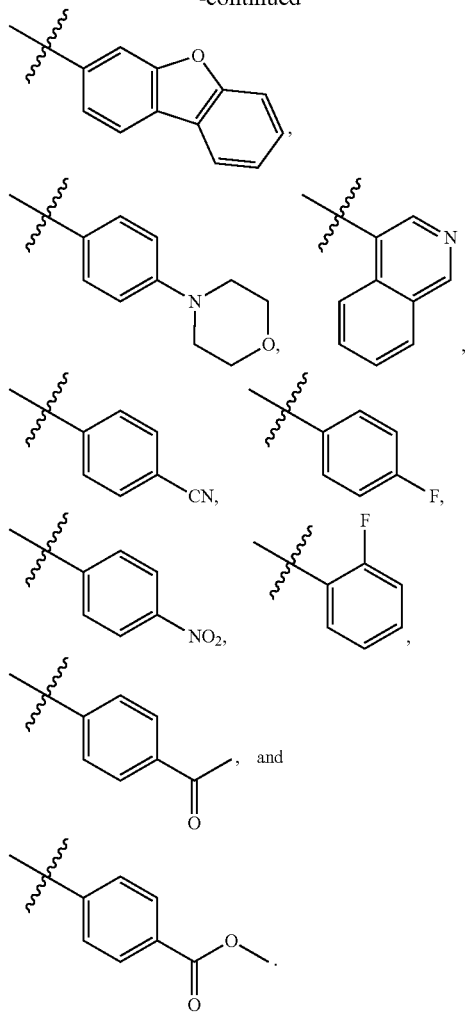

In another aspect, disclosed herein is a method of producing a compound of Formula IV,

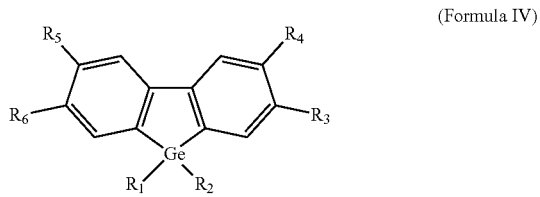

(Formula IV)

wherein $R_1$ and $R_2$ are each independently selected from the group consisting of hydrogen, alkyl, and aryl;

wherein $R_3$, $R_4$, $R_5$, and $R_6$ are each independently selected from the group consisting of hydrogen, alkoxy, Y, and

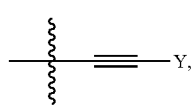

with the proviso that at least two of $R_3$, $R_4$, $R_5$, and $R_6$ are selected from the group consisting of Y and

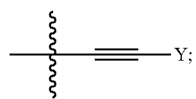
and
wherein Y is selected from the group consisting of
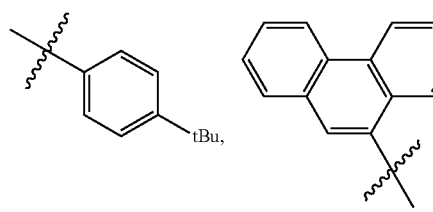
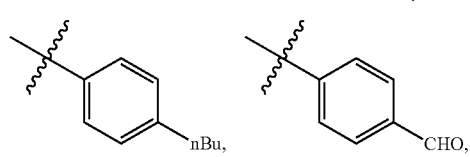
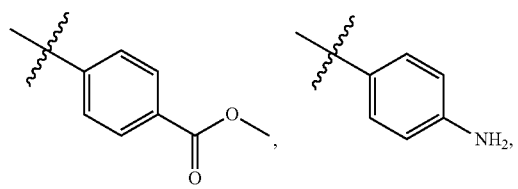
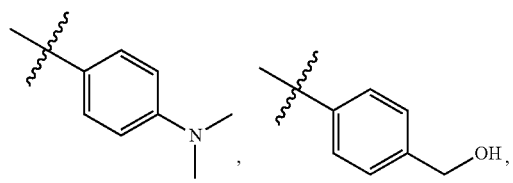
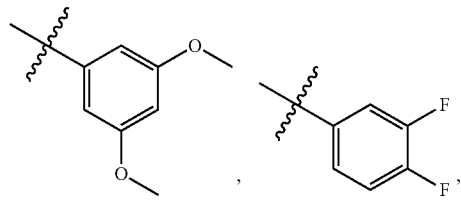
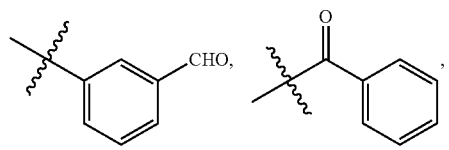
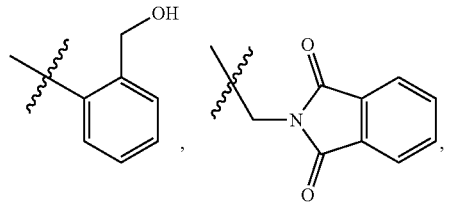
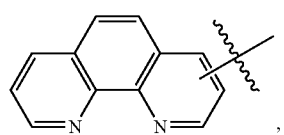
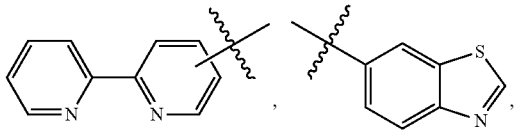
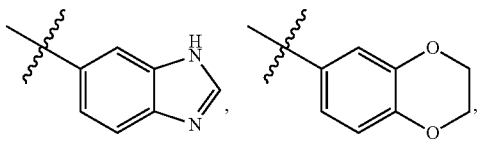
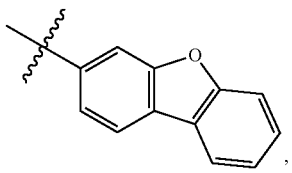
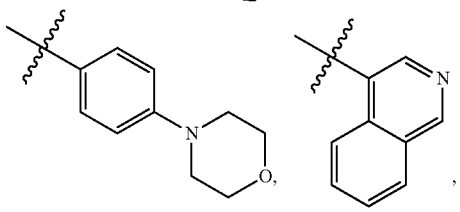
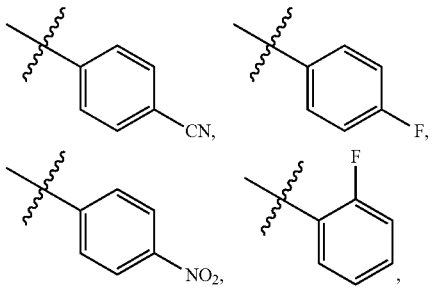
, and
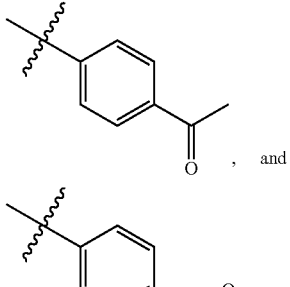
the method comprising
forming a mixture comprising
a compound of Formula V,
(Formula V)
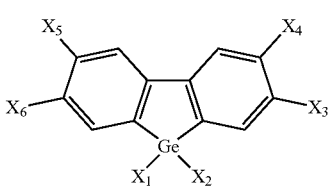

wherein $X_1$ and $X_2$ are each independently selected from the group consisting of hydrogen, alkyl, and aryl; and wherein $X_3$, $X_4$, $X_5$, and $X_6$ are each independently selected from the group consisting of hydrogen, alkoxy, and halogen with the proviso that at least two of $X_3$, $X_4$, $X_5$, and $X_6$ are halogen;

a compound of Formula III,

R—Y  (Formula III)

wherein R is selected from the group consisting of hydrogen, alkynyl, and borono;

a noble metal catalyst;

a base; and optionally a co-catalyst comprising a metal; and reacting the mixture.

In another aspect, disclosed herein is a method of measuring luminescence, the method comprising introducing a composition comprising a compound of Formula V,

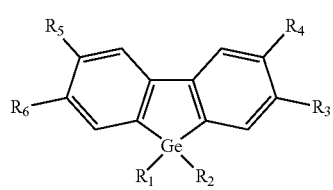

(Formula IV)

wherein $R_1$ and $R_2$ are each independently selected from the group consisting of hydrogen, alkyl, and aryl; and wherein $R_3$, $R_4$, $R_5$, and $R_6$ are each independently selected from the group consisting of hydrogen, alkoxy, Y, and

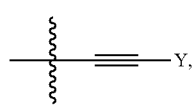

with the proviso that at least two of $R_3$, $R_4$, $R_5$, and $R_6$ are selected from the group consisting of Y and

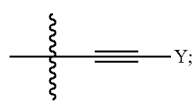

wherein Y is selected from the group consisting of

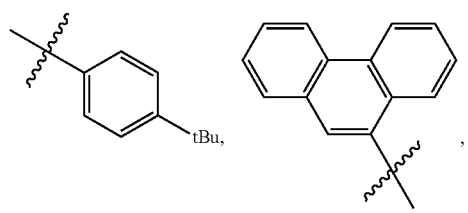

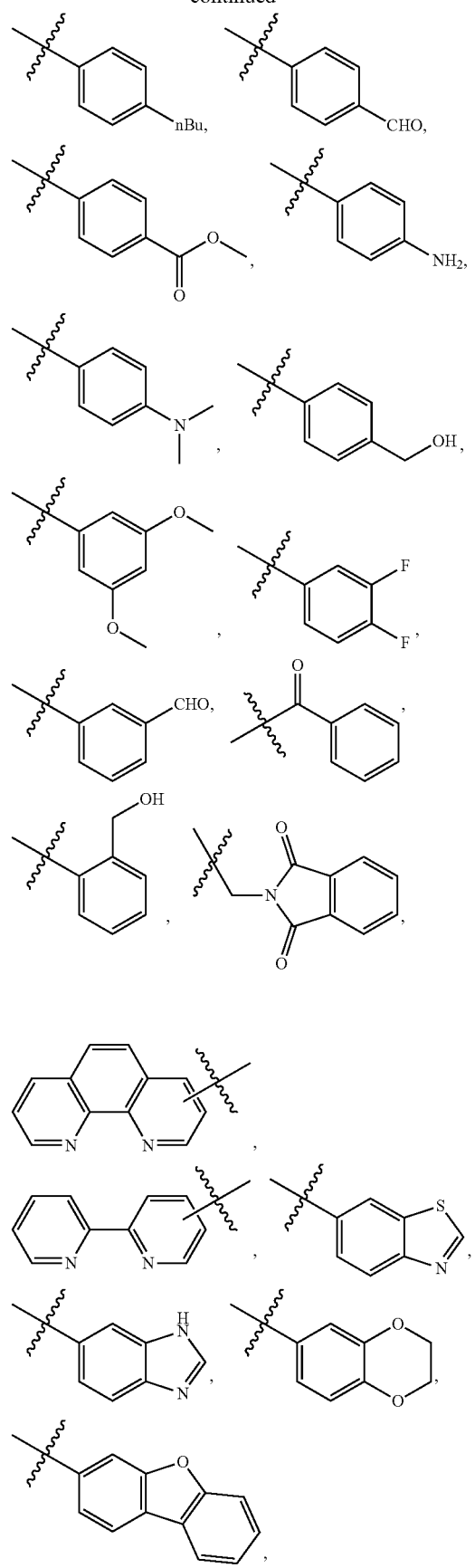

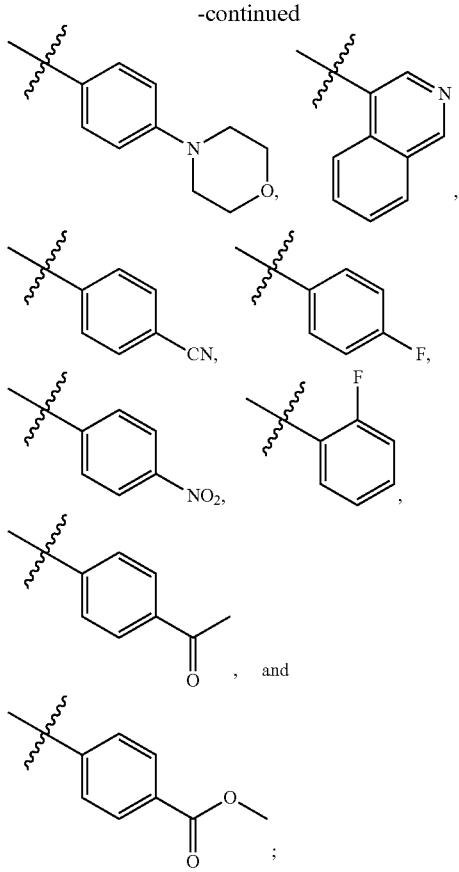

a solvent; and
optionally a detergent;
optically exciting the composition; and
measuring the luminescence produced by the compound of Formula I.

BRIEF DESCRIPTION OF THE DRAWINGS

FIG. 5 is an exemplary embodiment of the general structures of Group 14 metalloles.

FIG. 14 is an exemplary embodiment of X-ray crystallography of compound 4 in accordance with the present disclosure.

FIG. 18 is an exemplary embodiment of emission data for silafluorenes in aqueous buffer in accordance with the present disclosure.

FIG. 25 is an exemplary embodiment of 2,7-bis(4-ethynylbenzaldehyde)-3,6-dimethoxy-9,9-diphenylsilafluorene in the indicated solvent, viewed under UV, in accordance with the present disclosure.

FIG. 29 is an exemplary embodiment of DNA binding studies in accordance with the present disclosure. These data indicate an interaction with DNA.

FIG. 37 is an exemplary embodiment of staining diffuse throughout the cell, contrary to aggregation seen in 9Si staining. 13Si fluorescence is shown in blue to distinguish it from 9Si in the previous image. Cells are shown at 100× magnification. 13Si was excited using a 405 nm laser.

DETAILED DESCRIPTION OF THE DISCLOSURE

Figure 1:
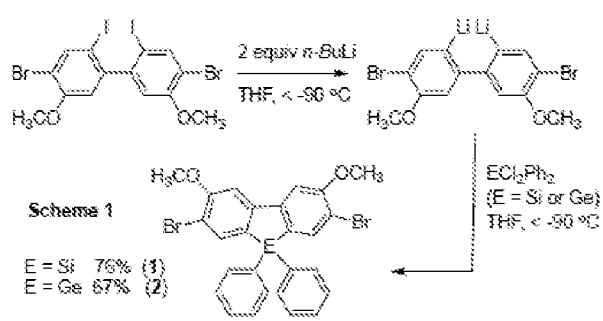
FIG. 1 is an exemplary embodiment depicting methods of synthesis in accordance with the present disclosure (Scheme 1).

As used herein, "aryl" refers to a radical of a monocyclic or poly cyclic (e.g., bicyclic or tricyclic) 4n+2 aromatic ring system (e.g., having 6, 10, or 14 electrons shared in a cyclic array) having 6-14 ring carbon atoms and zero heteroatoms provided in the aromatic ring system ("C6-14 aryl"). In some embodiments, an aryl group has 6 ring carbon atoms ("C6 aryl"; e.g., phenyl). In some embodiments, an aryl group has 10 ring carbon atoms ("C10 aryl"; e.g., naphthyl such as 1-naphthyl and 2-naphthyl). In some embodiments, an aryl group has 14 ring carbon atoms ("C14 aryl"; e.g., anthracyl).

As used herein, "heteroaryl" refers to aryl groups that contain at least one heteroatom (such as nitrogen, oxygen, silicon, phosphorous, boron, sulfur, or a halogen atom).

As used herein, "alkyl" refers to a radical of a straight-chain or branched saturated hydrocarbon group having from, in some embodiments, 1 to 4 carbon atoms ("C1-4 alkyl"), and in other embodiments 1 to 22 carbon atoms ("C, 1-22 alkyl"). In some embodiments, an alkyl group has 1 to 3 carbon atoms ("C1-3 alkyl"). In some embodiments, an alkyl group has 1 to 2 carbon atoms ("C1-2 alkyl"). In some embodiments, an alkyl group has 1 carbon atom ("C1 alkyl"). In some embodiments, an alkyl group has 2 to 4 carbon atom ("C224 alkyl"). In yet other embodiments, an alkyl group has 1 to 21 carbon atoms ("C1-21 alkyl"), 1 to 20 carbon atoms ("C1-20 alkyl"), 1 to 15 carbon atoms ("C1-15 alkyl"), 1 to 10 carbon atoms ("C1-10 alkyl"), etc. Examples of such alkyl groups include methyl (C1), ethyl (C2), n-propyl (C3), isopropyl (C3), n-butyl (C4), tert-butyl (C4), sec-butyl (C4), iso-butyl (C4), pentyl (C5), and the like.

As used herein, "alkynyl" or "alkyne" refers to a radical of a straight-chain or branched hydrocarbon group having from 2 to 4 carbon atoms and one or more carbon-carbon triple bonds ("C2-10 alkynyl"). In some embodiments, an alkynyl group has 2 to 3 carbon atoms ("C2-3 alkynyl"). In some embodiments, an alkynyl group has 2 carbon atoms ("C2 alkynyl"). The one or more carbon-carbon triple bonds can be internal (such as in 2-butynyl) or terminal (such as in 1-butynyl). Examples of C2-4 alkynyl groups include, without limitation, ethynyl (C2), 1-propynyl (C3), 2-propynyl (C3), 1-butynyl (C4), 2-butynyl (C4), and the like.

Alkyl, alkynyl, and aryl groups, as defined herein, are substituted or non-substituted, also referred to herein as "optionally substituted". In general, the term "substituted", whether preceded by the term "optionally" or not, means that at least one hydrogen present on a group (e.g., a carbon or nitrogen atom) is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, any of the substituents described herein that result in the formation of a stable compound. The present disclosure contemplates any and all such combinations in order to arrive at a stable compound. For purposes of this disclosure, heteroatoms such as nitrogen may have hydrogen substituents and/or any suitable substituent as described herein which satisfy the valencies of the heteroatoms and results in the formation of a stable moiety.

As used herein, "alkoxy" refers to a radical of an oxygen atom bonded to an alkyl group. In some embodiments, the alkyl group has 1-6 carbon atoms. In some embodiments, the alkyl group has 1-5 carbon atoms. In some embodiments, the alkyl group has 1-4 carbon atoms. In some embodiments, the alkyl group has 1-3 carbon atoms. In some embodiments, the alkyl group has 1-2 carbon atoms. In some embodiments, the alkyl group has 1 carbon atom.

As used herein, "borono" refers to a radical of a boron atom bonded to at least one oxygen atom. In some embodiments, the borono group comprises an aryl group. In some embodiments, the borono group is selected from Ar(B)(OH)$_2$, Ph(B)(OH)$_2$. In some embodiments, the borono group is Ph(B)OH)$_2$.

As used herein, "halogen" refers to a radical of a halogen atom. In some embodiments, the halogen atom is selected from fluorine, chlorine, bromine, and iodine.

Described herein are luminescent sila- and germafluorenes. The position and the type of substituent impact the absorption and emission properties in solution and in the solid-state and for the role of these compounds as biosensors.

The luminescent silafluorenes are selected from compounds of Formula I:

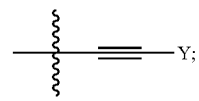

(Formula I)

wherein $R_1$ and $R_2$ are each independently selected from the group consisting of hydrogen, alkyl, and aryl;
wherein $R_3$, $R_4$, $R_5$, and $R_6$ are each independently selected from the group consisting of hydrogen, alkoxy, Y, and

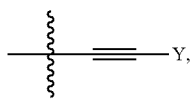

with the proviso that at least two of $R_3$, $R_4$, $R_5$, and $R_6$ are selected from the group consisting of Y and

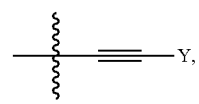

and wherein Y is selected from the group consisting of aryl, substituted aryl, heteroaryl, and substituted heteroaryl.

The luminescent germafluorenes are selected from compounds of Formula IV:

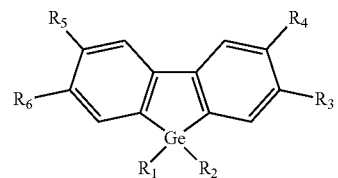

(Formula IV)

wherein $R_1$ and $R_2$ are each independently selected from the group consisting of hydrogen, alkyl, and aryl;
wherein $R_3$, $R_4$, $R_5$, and $R_6$ are each independently selected from the group consisting of hydrogen, alkoxy, Y, and

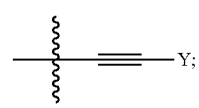

with the proviso that at least two of $R_3$, $R_4$, $R_5$, and $R_6$ are selected from the group consisting of Y and

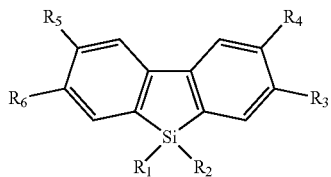

and wherein Y is selected from the group consisting of

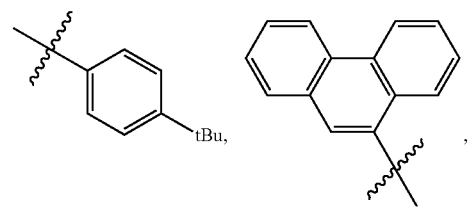

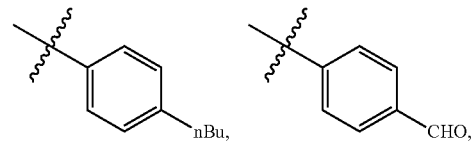

-continued

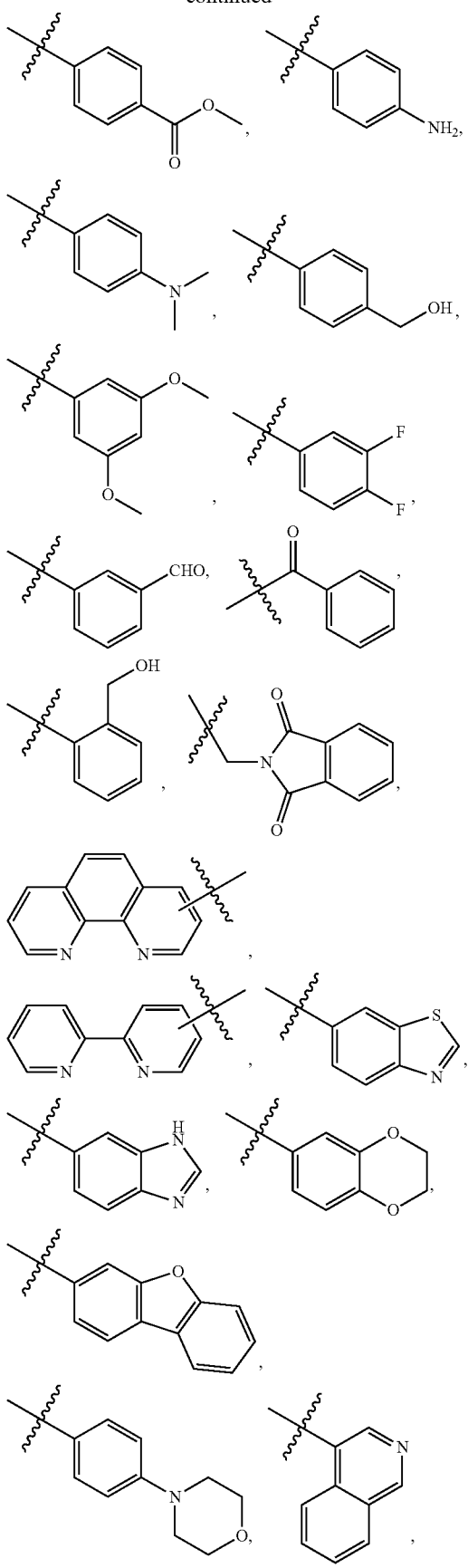

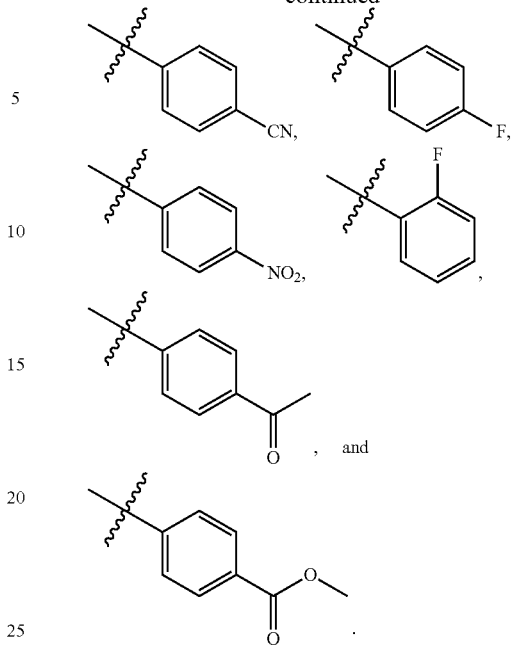

In some embodiments, the luminescent sila- and germafluorenes contain alkynyl(aryl) substituents at either the 2,7- or the 3,6-positions. In some embodiments, the luminescent sila- and germafluorenes contain alkynyl(aryl) substituents at the 2,7-positions. In some embodiments, the luminescent sila- and germafluorenes contain alkynyl(aryl) substituents at the 3,6-positions.

In some embodiments, the luminescent sila- and germafluorenes contain aryl substituents at either the 2,7- or the 3,6-positions. In some embodiments, the luminescent sila- and germafluorenes contain aryl substituents at the 2,7-positions. In some embodiments, the luminescent sila- and germafluorenes contain aryl substituents at the 3,6-positions.

In some embodiments, the luminescent sila- and germafluorenes contain alkoxy substituents at the 2,7-positions. In some embodiments, the luminescent sila- and germafluorenes contain alkoxy substituents at the 3,6-positions.

In some embodiments, when the luminescent sila- and germafluorenes contain alkynyl(aryl) substituents at the 2,7-positions, the luminescent sila- and germafluorenes contain alkoxy substituents at the 3,6-positions. In some embodiments, when the luminescent sila- and germafluorenes contain alkynyl(aryl) substituents at the 3,6-positions, the luminescent sila- and germafluorenes contain alkoxy substituents at the 2,7-positions.

In some embodiments, when the luminescent sila- and germafluorenes contain aryl substituents at the 2,7-positions, the luminescent sila- and germafluorenes contain alkoxy substituents at the 3,6-positions. In some embodiments, when the luminescent sila- and germafluorenes contain aryl substituents at the 3,6-positions, the luminescent sila- and germafluorenes contain alkoxy substituents at the 2,7-positions.

In some embodiments, the luminescent sila- and germafluorenes contain at least one aryl or alkynyl(aryl) substituent at either the 2,7- or the 3,6-positions comprising a functional group selected from

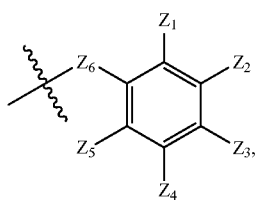

wherein $Z_1$-$Z_6$ are each independently selected from the group consisting of hydrogen, unsubstituted alkyl, substituted alkyl, unsubstituted aryl, substituted aryl, unsubstituted heteroaryl, substituted heteroaryl, alkoxy, aryloxy, halogen, haloalkyl, haloalkyl ether, ether, amine, nitrile, nitro, ester, carbonyl, aldehyde, and alcohol.

In some embodiments, the luminescent sila- and germa-fluorenes contain at least one aryl or alkynyl(aryl) substituent at either the 2,7- or the 3,6-positions comprising a functional group selected from

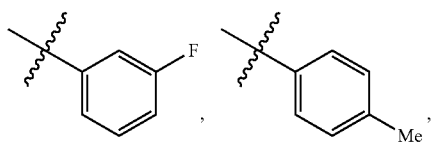

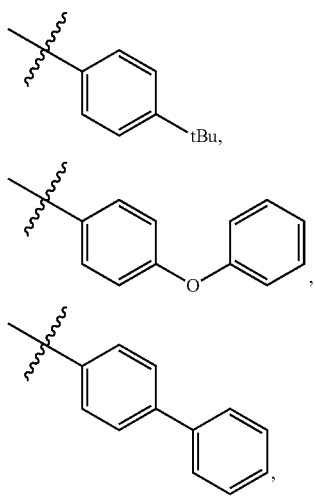

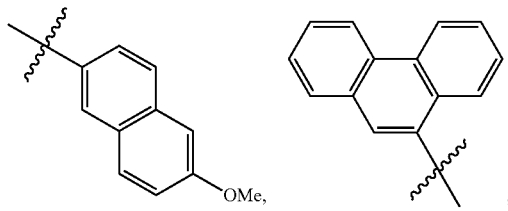

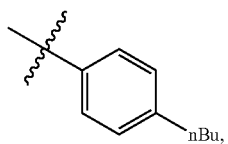

-continued

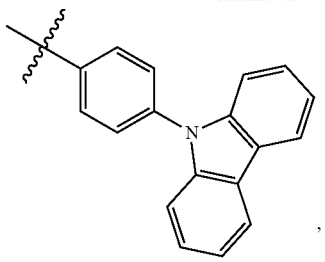

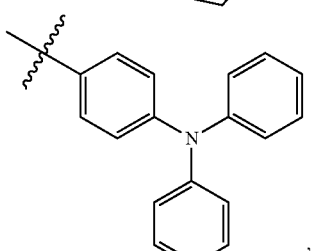

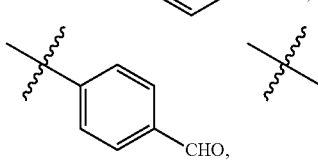

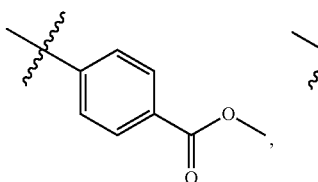

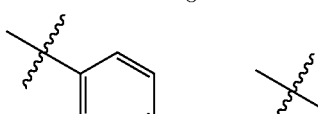

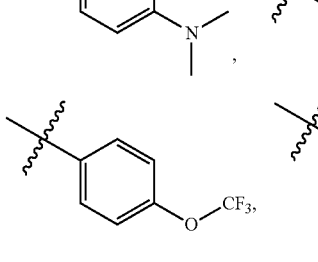

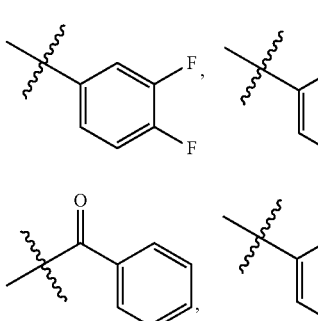

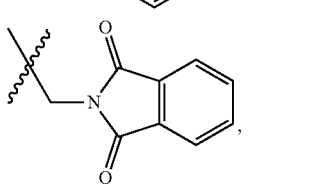

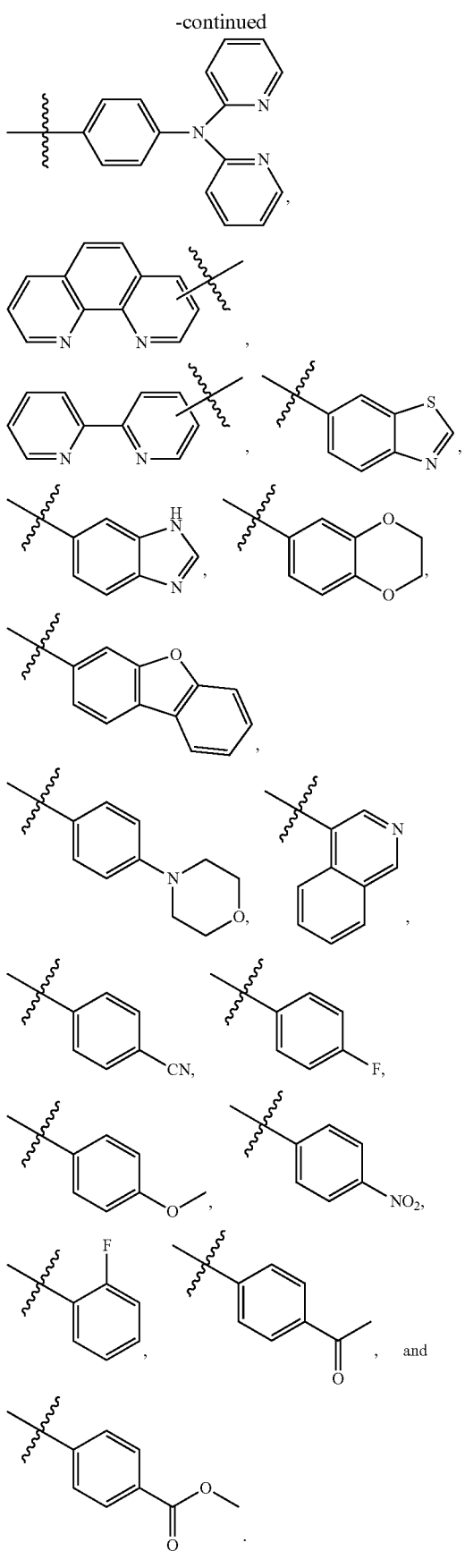
In some embodiments, the luminescent sila- and germa-fluorenes contain at least one aryl or alkynyl(aryl) substituent at either the 27- or the 3,6-position comprising a functional group selected from
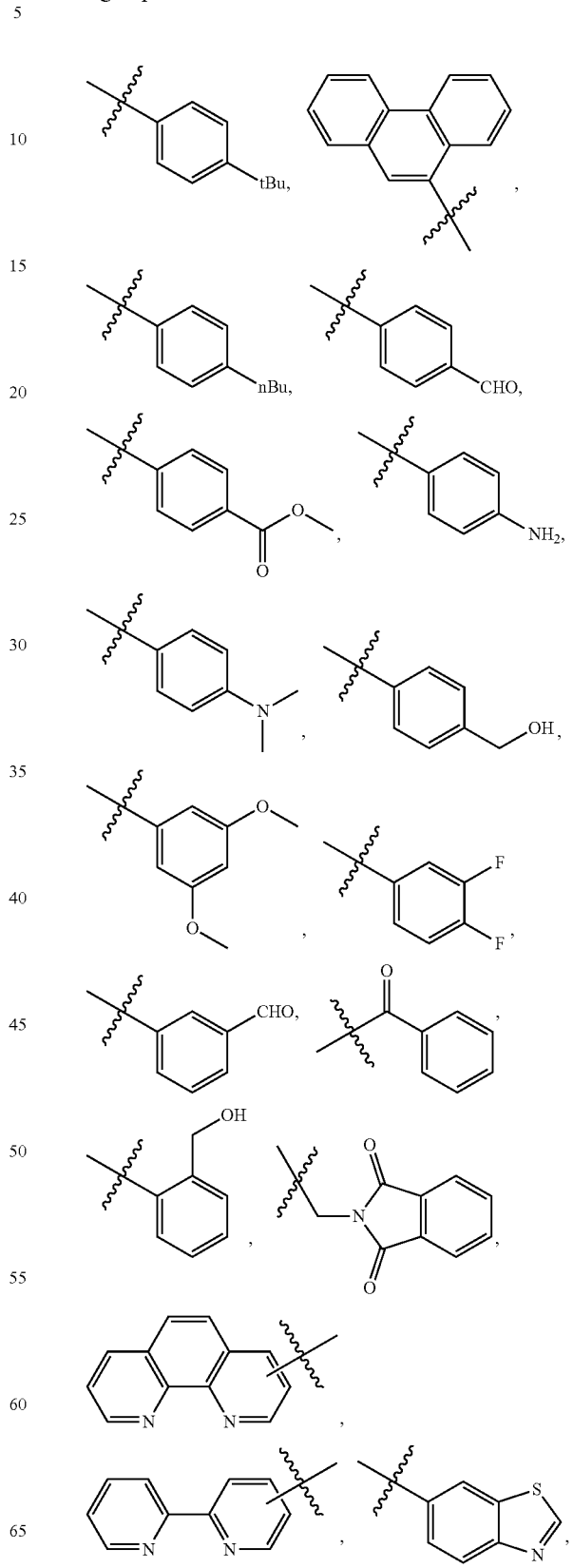

-continued
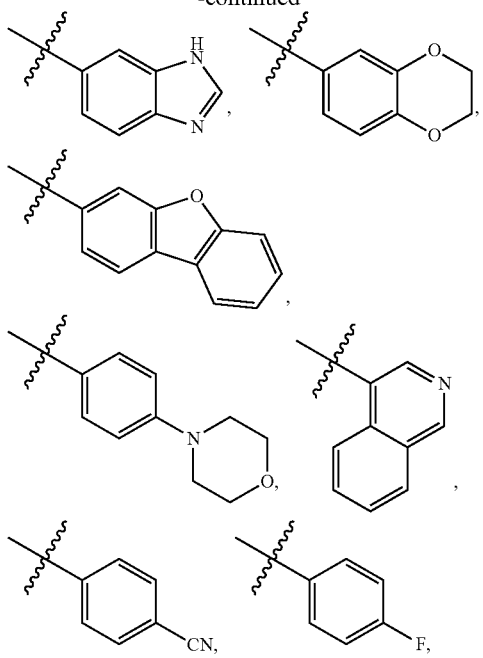
In some embodiments, the luminescent silafluorenes are selected from -continued

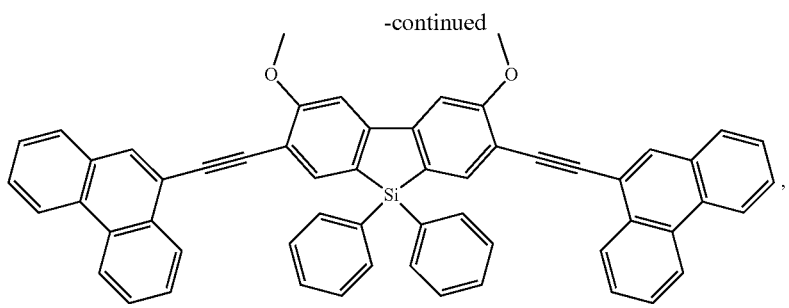

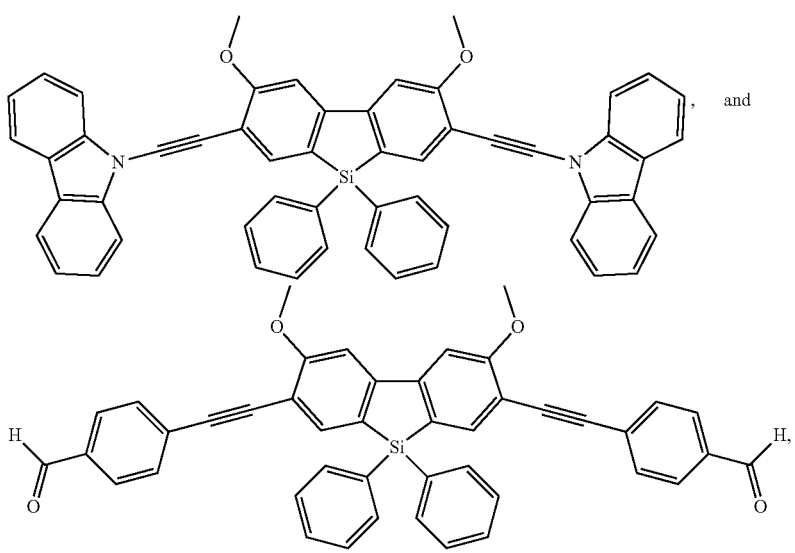

In some embodiments, the luminescent sila- and germafluorenes contain at least one aryl substituent bound to the silicon or the germanium atom. In some embodiments, the luminescent sila- and germafluorenes contain two aryl substituents bound to the silicon or the germanium atom. In some embodiments, the luminescent sila- and germafluorenes contain two phenyl substituents bound to the silicon or the germanium atom.

In some embodiments, a plurality of individual luminescent sila- and germafluorenes are bonded together by their substituents. In some embodiments, a plurality of individual luminescent sila- and germafluorenes are bonded together by their substituents that are identical. In some embodiments, a plurality of individual luminescent sila- and germafluorenes are bonded together by their substituents that are different.

In some embodiments, the luminescent sila- and germafluorenes are produced according to a method comprising a reaction selected from an organometallic reaction, a metalation reaction, a coupling reaction, a boron-based coupling reaction, a Sukuzi coupling reaction, a Sonogashira coupling reaction, a Negishi coupling reaction, a Heck coupling reaction, a Stilli coupling reaction, a Kumada coupling reaction, a Schiff base reaction, and combinations thereof. In some embodiments, the luminescent sila- and germafluorenes are produced according to a method comprising a Sonogashira coupling reaction.

In some embodiments, the luminescent sila- and germafluorenes are produced according to a method comprising a Sonogashira coupling reaction of a compound of Formula II,

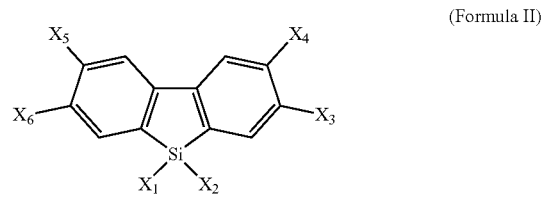

(Formula II)

wherein $X_1$ and $X_2$ are each independently selected from the group consisting of hydrogen, alkyl, and aryl; and wherein $X_3$, $X_4$, $X_5$, and $X_6$ are each independently selected from the group consisting of hydrogen, alkoxy, and halogen with the proviso that at least two of $X_3$, $X_4$, $X_5$, and $X_6$ are halogen; and a compound of Formula III,

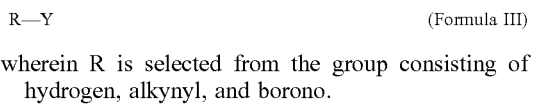

R—Y  (Formula III)

wherein R is selected from the group consisting of hydrogen, alkynyl, and borono.

In some embodiments, the luminescent sila- and germafluorenes are produced according to a method comprising a Sonogashira coupling reaction of
a compound of Formula V,

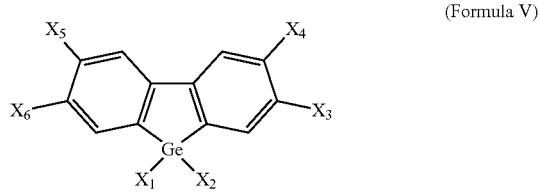

(Formula V)

wherein $X_1$ and $X_2$ are each independently selected from the group consisting of hydrogen, alkyl, and aryl; and wherein $X_3$, $X_4$, $X_5$, and $X_6$ are each independently selected from the group consisting of hydrogen, alkoxy, and halogen with the proviso that at least two of $X_3$, $X_4$, $X_5$, and $X_6$ are halogen; and a compound of Formula III,

R—Y    (Formula III)

wherein R is selected from the group consisting of hydrogen, alkynyl, and borono.

In some embodiments, the luminescent sila- and germafluorenes are produced according to a method comprising a Sonogashira coupling reaction that utilizes a mixture comprising a noble metal catalyst, a base, and optionally a metal catalyst. In some embodiments, the noble metal catalyst is selected from palladium, $Pd(PPh_3)_4$, $[Pd(PPh_3)_2Cl_2]$, palladium complexes comprising phosphine ligands, gold, silver, ruthenium, rhodium, osmium, iridium, platinum, and combinations thereof. In some embodiments, the base is selected from amines, secondary amines, piperidine, morpholine, diisopropylamine, and combinations thereof. In some embodiments, the metal catalyst is selected from copper, silver, nickel, gold, palladium, dendrimeric palladium complexes, nitrogen ligands, N-heterocyclic carbine palladium complexes, and combinations thereof.

In some embodiments the luminescent sila- and germafluorenes are produced according to a method comprising heating a reaction mixture to a temperature in the range of about 60° C. to about 100° C. In some embodiments the luminescent sila- and germafluorenes are produced according to a method comprising heating a reaction mixture to a temperature in the range of about 70° C. to about 90° C. In some embodiments the luminescent sila- and germafluorenes are produced according to a method comprising heating a reaction mixture to a temperature of about 80° C.

In some embodiments, the luminescent sila- and germafluorenes are used to measure luminescence according to a method comprising introducing a composition comprising a luminescent sila- and germafluorene compound of Formula I or Formula IV, a solvent, and optionally a detergent, optically exciting the composition, and measuring the luminescence produced by the compound of Formula I or Formula IV.

In some embodiments, the composition further comprises water.

In some embodiments, the solvent is a polar, water miscible solvent. In some embodiments, the solvent is selected from the group consisting of acetonitrile, isopropyl alcohol, DMSO, and combinations thereof.

In some embodiments, the detergent is selected from the group consisting of anionic detergents, nonionic detergents, cationic detergents, zwitterionic detergents, and combinations thereof. In some embodiments, the detergent is selected from detergents known in the art. In some embodiments, the detergent is selected from 2-[4-(2,4,4-trimethylpentan-2-yl)phenoxy]ethanol (Triton X-100), (3-((3-cholamidopropyl) dimethylammonio)-1-propanesulfonate) (CHAPS), Cetyl Trimethyl Ammonium Bromide (CTAB), sodium dodecyl sulfate (SDS), sodium dodecylbenzene sulfonate (SDBS), and combinations thereof.

In some embodiments, the method step of introducing the composition comprises introducing the composition into a live cell. In some embodiments, the method step of introducing the composition comprises introducing the composition into a dead cell. In some embodiments, the method step of introducing the composition comprises introducing the composition into a mixture of live cells and dead cells.

In some embodiments, the method step of introducing the composition comprises introducing the composition into a prokaryotic cell. In some embodiments, the method step of introducing the composition comprises introducing the composition into a eukaryotic cell. In some embodiments, the method step of introducing the composition comprises introducing the composition into a mixture of prokaryotic cells and eukaryotic cells.

In some embodiments, the method step of optically exciting the composition comprises irradiating the composition with a light source selected from a visible light source, an infrared light source, an ultraviolet light source, and combinations thereof. In some embodiments, the method step of optically exciting the composition comprises irradiating the composition with a visible light source.

In some embodiments, the light source is selected from the group consisting of xenon arc lamps, mercury vapor lamps, lasers, supercontinuum sources, light emitting diodes (LEDs), UV lamps, and combinations thereof. In some embodiments, a light source may be selected if it provides an appropriate wavelength of light that the compound of Formula I or Formula IV can absorb.

In some embodiments, the compound of Formula I or Formula IV produces peak luminescence in the range of about 200 nm to about 800 nm. In some embodiments, the compound of Formula I or Formula IV produces peak luminescence in the range of about 300 nm to about 700 nm. In some embodiments, the compound of Formula I or Formula IV produces peak luminescence in the range of about 400 nm to about 700 nm. In some embodiments, the compound of Formula I or Formula IV produces peak luminescence in the range of about 400 nm to about 600 nm. In some embodiments, the compound of Formula I or Formula IV produces peak luminescence in the range of about 300 nm to about 500 nm. In some embodiments, the compound of Formula I or Formula IV produces peak luminescence in the range of about 300 nm to about 450 nm.

In some embodiments, the compound of Formula I or Formula IV produces monomodal peak luminescence. In some embodiments, the compound of Formula I or Formula IV produces bimodal peak luminescence.

In some embodiments, the method step of measuring luminescence produced by the compound of Formula I or Formula IV comprises measuring luminescence with an instrument selected from a fluorescence microscope, a confocal microscope, a spectrophotometer, and combinations thereof. In some embodiments, the method step of measuring luminescence produced by the compound of Formula I or Formula IV comprises measuring luminescence with an

EXAMPLES

Example 1. Precursor Compounds

Precursor compounds, 2,7-dibromo-3,6-dimethoxy-9,9-diphenylsilafluorene (Compound 1) and 2,7-dibromo-3,6-dimethoxy-9,9-diphenylgermafluorene (Compound 2), were prepared utilizing a procedure involving reaction of 4,4'-dibromo-2,2'-diiodo-5,5'-dimethoxy-1,1'-biphenyl with 2 equivalents of nBuLi to give the corresponding dilithiobiphenyl intermediate as shown in Scheme 1 (FIG. 1). An improved procedure for the ring closure was developed (Scheme 1) with an increased yield (76%) relative to the previous report for the synthesis of the 2,7-dibromo-3,6-dimethoxy-9,9-diphenylsilafluorene. The 9,9-diphenyl-2,7-dibromo-3,6-dimethoxysilafluorene was first reported in 2006 in 12% yield and was later reported in 2010 in 68% yield. The synthesis of 9,9-diphenyl-2,7-dibromo-3,6-dimethoxygermafluorene reported herein is in 67% yield.

Example 2. Inventive Compounds

Compounds 1 and 2 were reacted with several terminal alkynes using a Sonogashira coupling reaction to produce new compounds with alkynyl(aryl) groups at the 2,7-sites of the ring in moderate to good yields (54-80%, Scheme 2). While the products shown in Schemes 1-3 are air and moisture stable, the reactions to prepare them were performed under an inert atmosphere of argon and under water-free conditions.

Figure 2:
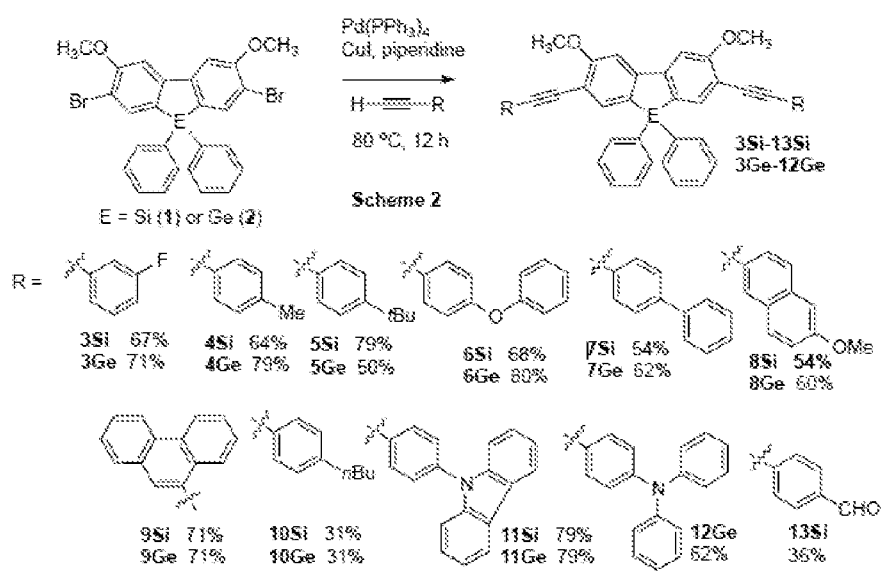
FIG. 2 is an exemplary embodiment depicting methods of synthesis in accordance with the present disclosure (Scheme 2).

These new compounds (3Si/3Ge through 8Si %8Ge) show a strong absorption band in $CH_2Cl_2$ solution in the region of 371-394 nm (log ε values ranged from 4.25-5.23) and emission maxima in the region of 401-452 nm. The quantum efficiencies determined from solution samples containing the silafluorenes 3Si-8Si were high (0.80-0.87) and the related germafluorenes 3Ge-8Ge had slightly lower values between 0.64-0.83. The silafluorenes and related germafluorenes compounds also show strong emission in the solid-state that is significantly red-shifted by about 60 nm. The solid-state quantum yields have been measured for several of the sila- and germafluorenes. The solid-state quantum yields for 7 compounds have been measured and the values range from 0.14 to 0.91 with the highest values for compounds 5Ge (0.92) and 6Ge (0.81). Additional quantum yield measurements both in solution and in the solid-state are made for other compounds shown in Scheme 2 (FIG. 2). The silafluorenes 3Si-8Si and germafluorenes 3Ge-8Ge exhibited melting points over 200° C., and have good thermal stability as determined by DSC and TGA measurements.

Figure 3:
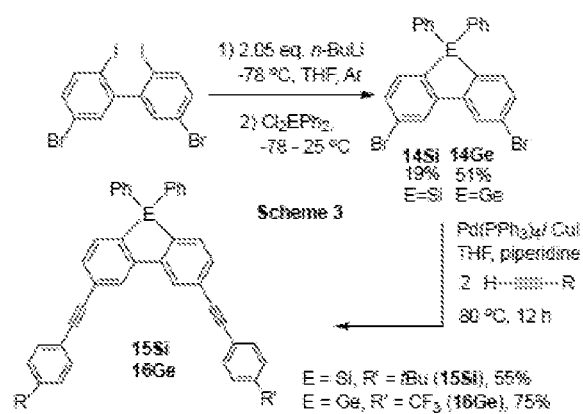
FIG. 3 is an exemplary embodiment depicting methods of synthesis in accordance with the present disclosure (Scheme 3).

The compound, 3,6-dibromo-9,9-diphenylsilafluorene (14Si) was synthesized (Scheme 3) following a procedure used for the related 9,9-dioctylsilafluorene (FIG. 3). A Pd-catalyzed coupling of 14Si with 4-tert-butylphenylacetylene afforded the new silafluorene 1Si in 55% yield. The related germafluorene 3,6-dibromo-9,9-diphenylgermafluorene 14Ge was also prepared and the Pd-catalyzed coupling reaction with (4-trifluoromethylphenyl)acetylene yielded the new germafluorene 16Ge in 75%. The molecular structure of 16Ge was confirmed by X-ray crystallography. Several new 3,6-bis(alkynyl(aryl)-9,9-diphenylsila- and -germafluorenes are synthesized (Scheme 3) with the same aryl groups as those shown in Scheme 2 to directly compare the photophysical properties of the related 2,7- and 3,6-disubstituted sila- and -germafluorenes. In particular, 3,6-bis[alkynyl(aryl)]-9,9-diphenylsila- and germafluorenes where the aryl=p-tolyl, p-phenoxy, p-t-butyl (Ge derivative) are synthesized and characterized since the related 2,7-bis [alkynyl(aryl)]-3,6-dimethoxy sila- and -germafluorenes (Scheme 2) exhibited the highest solution-state quantum yields. Data for the 3,6-bis[ethynyl(4-trifluoromethylphenyl)-9,9-diphenylgermafluorene (16Ge) show that a significant blue-shift was observed for the absorbance and emission data compared to the related 2,7-disubstituted derivatives.

The absorption maximum for (16Ge) was observed at 288 nm and the emission maximum at 352 nm (in $CH_2Cl_2$ solution). These results suggest that the locations of the alkynyl(aryl) groups in the sila- and germafluorenes have a significant impact on the absorption and emission. Emission from the solid-state for 16Ge was observed at 393 nm.

Example 3. Biological Behavior

Studies have been conducted herein for a series of silafluorenes with a broad range of alkynyl substituent groups: 3Si, 4Si, 7Si, 8Ge, 9Si, and 11Si, and 13Si. Briefly, all are soluble at low millimolar concentrations in DMSO and at low micromolar concentrations in aqueous solutions, and absorption spectra and extinction coefficients were determined for all in DMSO. All exhibit luminescence when these DMSO stocks were diluted into aqueous buffer (no more than 2% DMSO). In aqueous buffer, all compounds exhibit emission spectra from 400-650 nm, with varying $\lambda_{max}$ values. This provides a tunability to the optical behavior that is useful for bioimaging.

Figure 4:
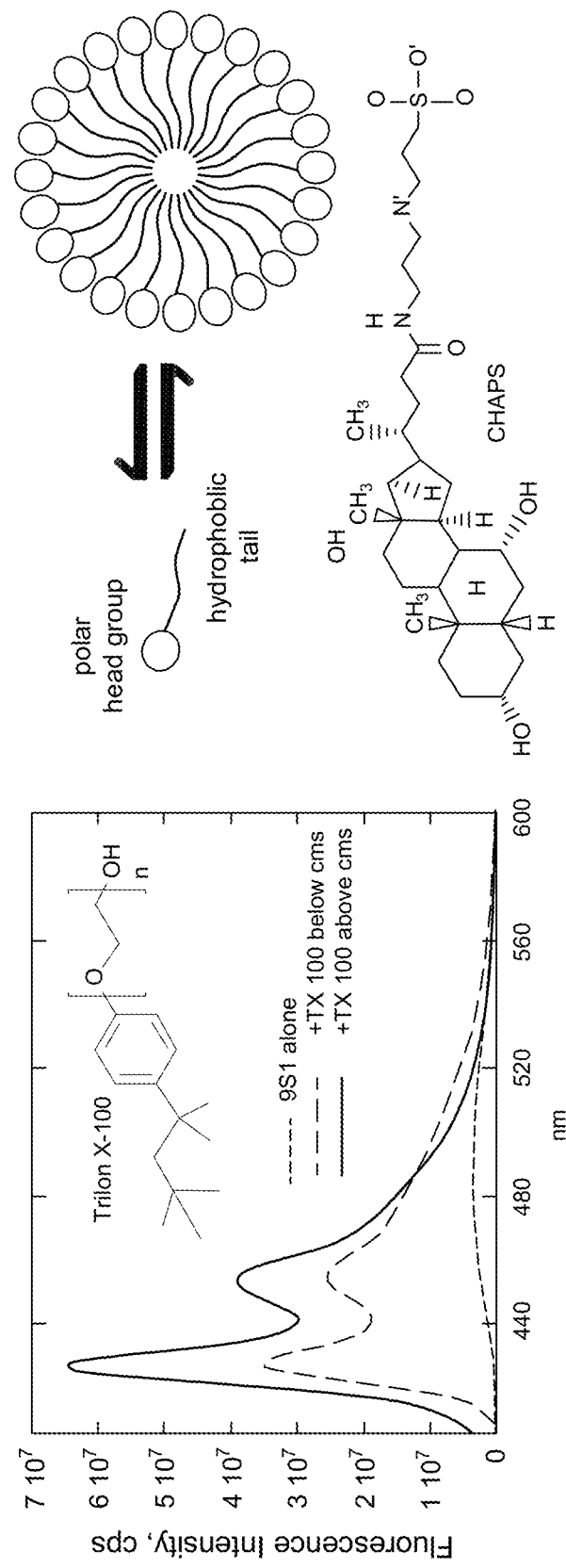
FIG. 4 is an exemplary embodiment of (left) fluorescence intensity of 9Si alone and in the presence of Triton X-100 below CMC and above CMC in aqueous buffer and (right) amphipathic molecules forming micellar aggregates in aqueous solution; structures of detergents Triton X-100 and CHAPS.

Non-denaturing detergents, common proxies for membranes and lipids, were added to each compound. Indeed, when the neutral detergent Triton X-100 is added to 13Si, 9Si, 4Si, and 3Si, dramatic blue shifts and emission enhancements were observed (FIG. 4). The degree of enhancement ranged from 2-18-fold in the increasing order 8Ge=11Si<4Si=7Si<<<3Si<<13Si=9Si. Moreover, the degree of enhancement is very sensitive to the aggregation state of the detergent: enhancement is more dramatic at concentrations at which the detergents are known to form micellar aggregates (critical micelle concentration).

Similar but less dramatic changes were also observed upon the addition of CHAPS, a zwitterionic detergent. This indicates that these compounds are sensitive to the surfaces that form due to detergent aggregation and suggest an affinity for membranes and their hydrophobic interiors. 9Si was added to *E. coli* bacteria and yeast cells and imaged using fluorescence confocal microscopy, exciting with a laser at 405 nm. The bacteria and yeast did take up 9Si and fluoresce, which demonstrates exciting potential for use of these compounds as a probe for bioimaging.

Example 4. Group 14 Metalloles

Group 14 metalloles are five-membered cyclic compounds that possess a Group 14 heteroatom (FIG. 5). They are analogs of cyclopentadiene and fluorene. Some potential applications include OLEDs, OFETs, solar cells, chemical and biosensors. Siloles and germoles exhibit a low HOMO-LUMO gap, fluorescence (tuneable) in visible region, can exhibit strong luminescence in the solid state, and can show high electron mobility and affinity. Polymers containing silafluorene units are actively investigated.

Figure 6:
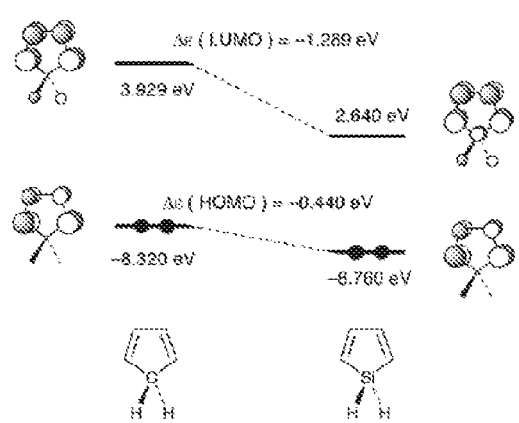
FIG. 6 is an exemplary embodiment of the relative energy levels of the HOMO and LUMO for silole and cyclopentadiene, based on HF/6-31G* calculations.
Figure 7:
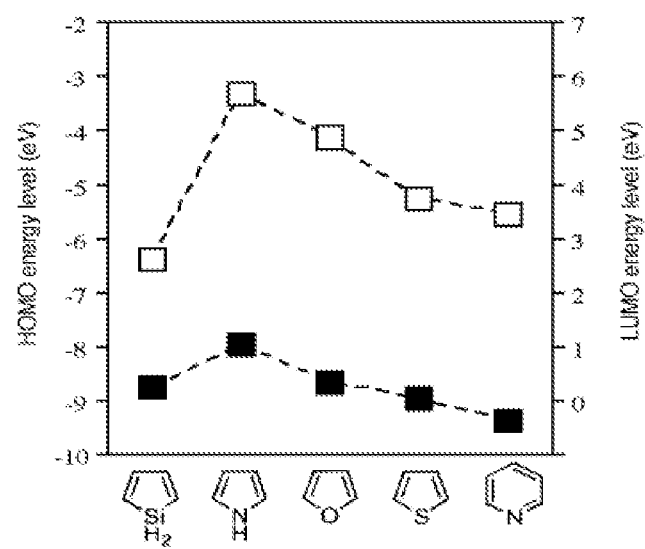
FIG. 7 is an exemplary embodiment of the relative HOMO and LUMO levels for silole and other heterocycles, based on HF/6-31G* calculations.
Figure 8:
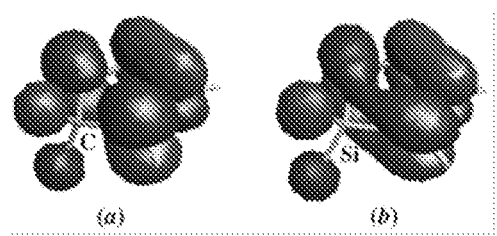
FIG. 8 is an exemplary embodiment of the LUMO of a) cyclopentadiene and b) silole.

Siloles have low-lying LUMO due to σ*-π* conjugation between σ*-orbital of exocyclic bonds on Si atom with the π-orbital of the butadiene unit (FIGS. 6-8). These energy levels are known. The HOMO and LUMO of siloles are 0.4 eV and 1.2 eV lower, respectively, compared to their carbon analogs. These properties result in red-shifted absorption spectra and high electron mobility (electron transport).

Figure 9:
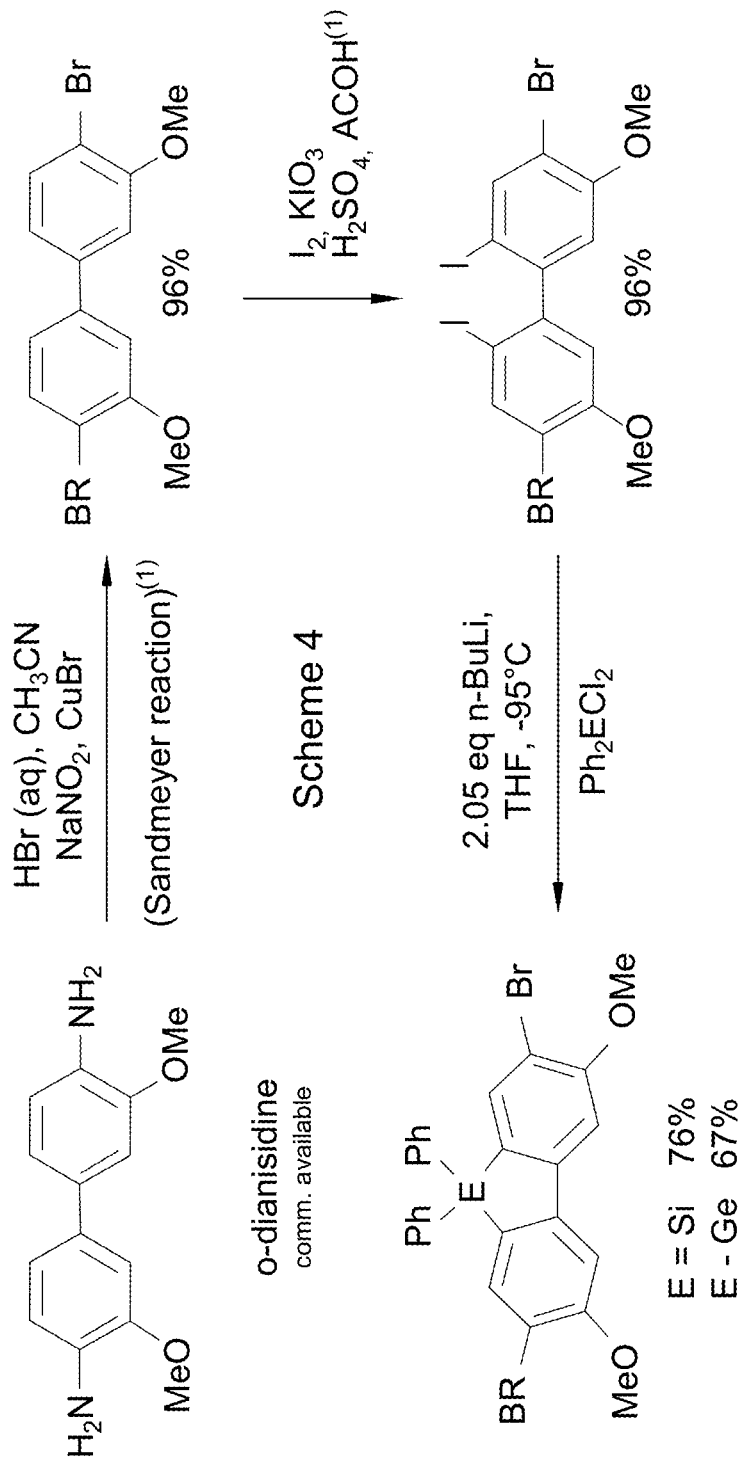
FIG. 9 is an exemplary embodiment depicting methods of synthesis in accordance with the present disclosure (Scheme 4).

The synthetic procedure used to synthesize the precursor compound, 2,7-dibromo-3,6-dimethoxy-9,9-diphenylsilafluorene and -germafluorene is shown in Scheme 4 (FIG. 9).

Figure 10:
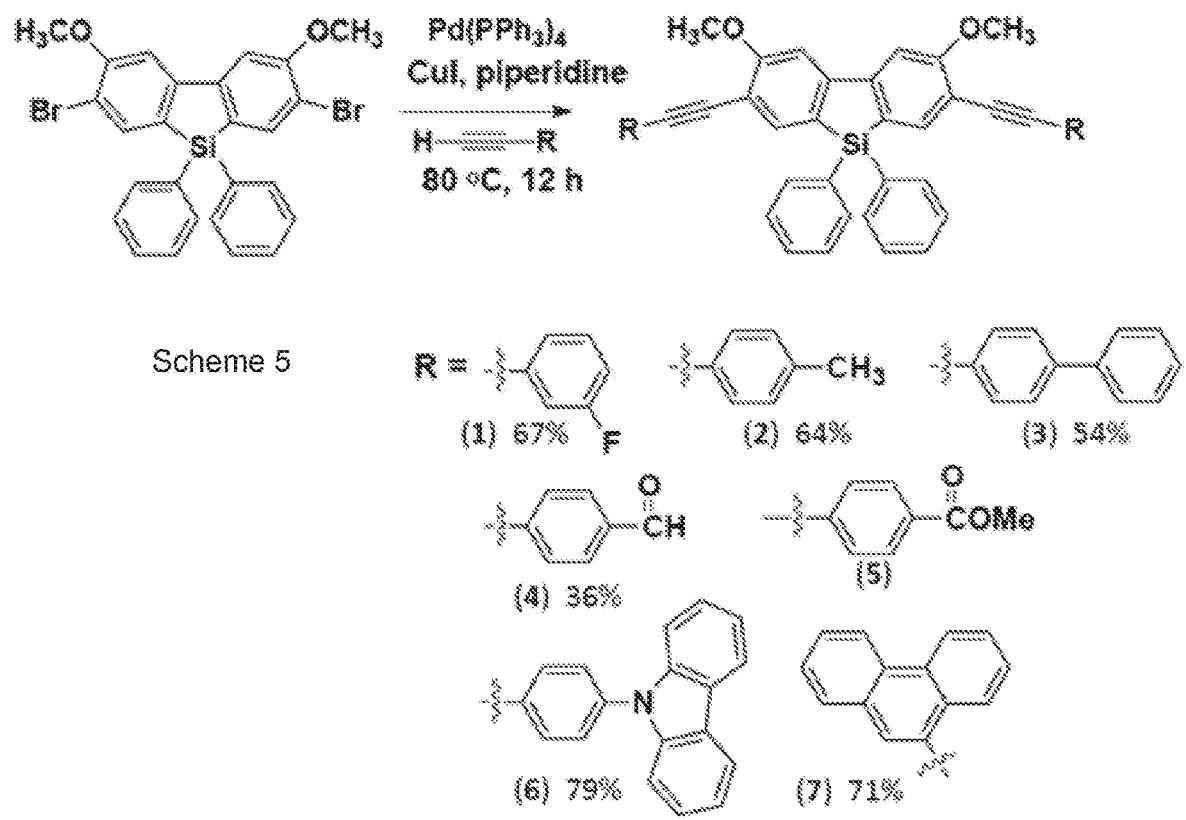
FIG. 10 is an exemplary embodiment depicting methods of synthesis in accordance with the present disclosure (Scheme 5).

A variety of different alkynyl groups can be incorporated in the ring system from a Pd-catalyzed Sonogashira coupling reaction shown in Scheme 5 (FIG. 10).

Figure 11:
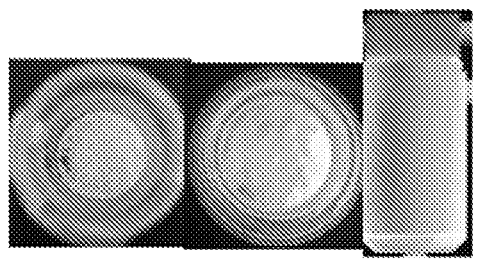
FIG. 11 is an exemplary embodiment of strong emission of meta-fluoro-silafluorene (compound 1 of FIG. 10) in methylene chloride (dichloromethane) solution and solid state meta-fluoro-silafluorene in accordance with the present disclosure.

The silafluorenes show intense fluorescence both in solution and in the solid-state (FIG. 11). The quantum yield range in $CH_2Cl_2$ solution is 0.80-0.89 for several silafluorenes studied to date.

Figure 12:
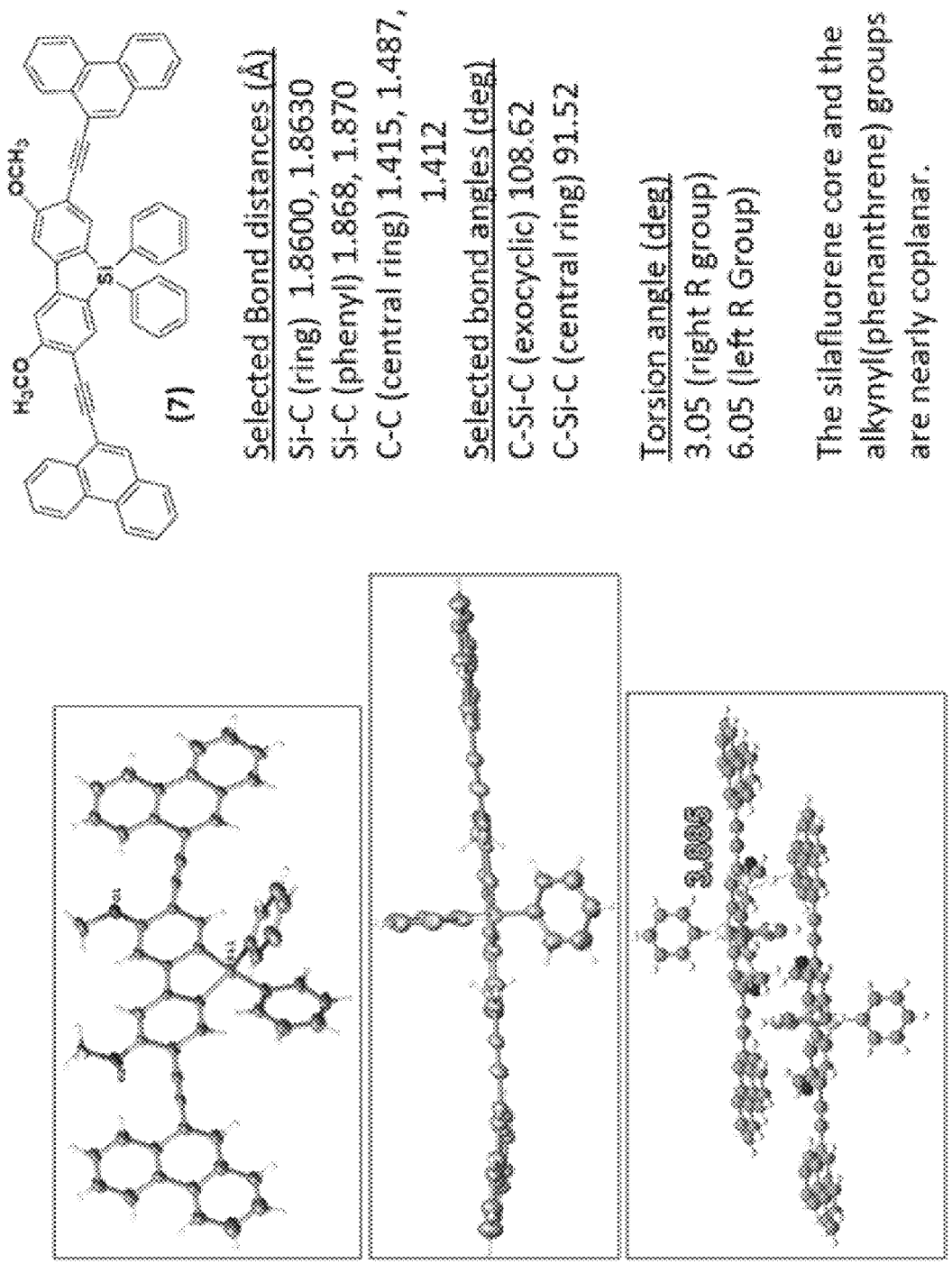
FIG. 12 is an exemplary embodiment of X-ray crystallography of compound 7 in accordance with the present disclosure.
Figure 13:
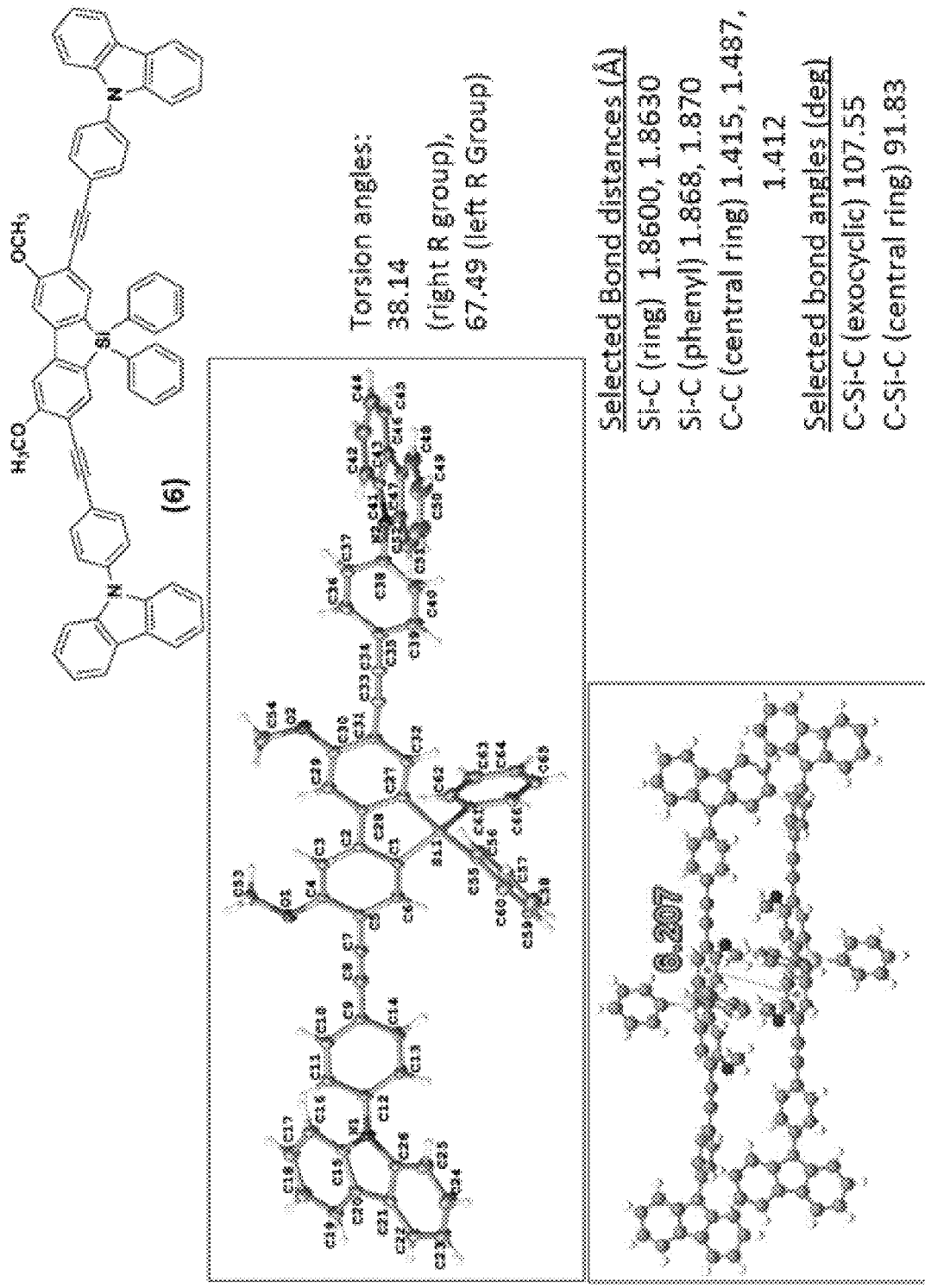
FIG. 13 is an exemplary embodiment of X-ray crystallography of compound 6 in accordance with the present disclosure.
Figure 15:
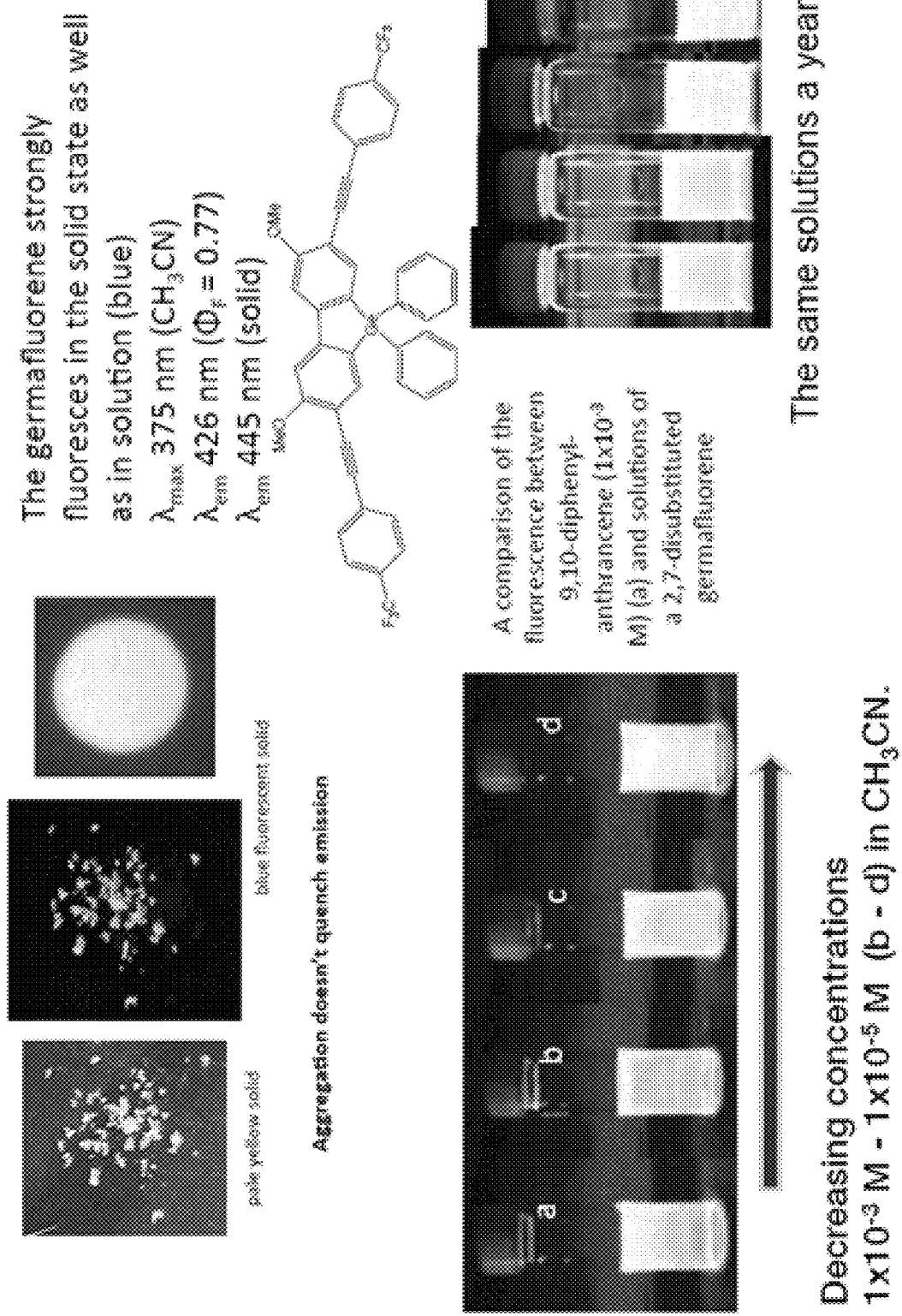
FIG. 15 is an exemplary embodiment of the fluorescence intensity of a 2,7-disubstituted germafluorene in accordance with the present disclosure.
Figure 16:
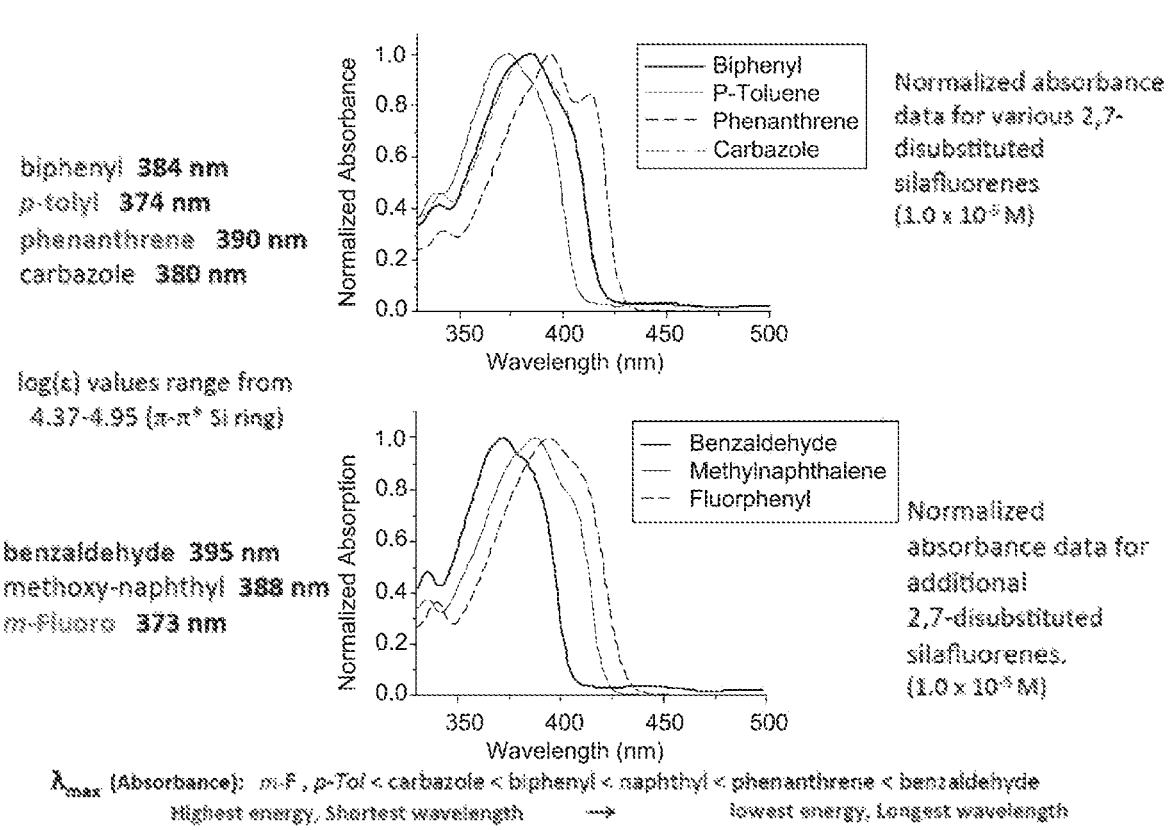
FIG. 16 is an exemplary embodiment of absorbance data for silafluorenes in $CH_2Cl_2$ in accordance with the present disclosure.
Figure 17:
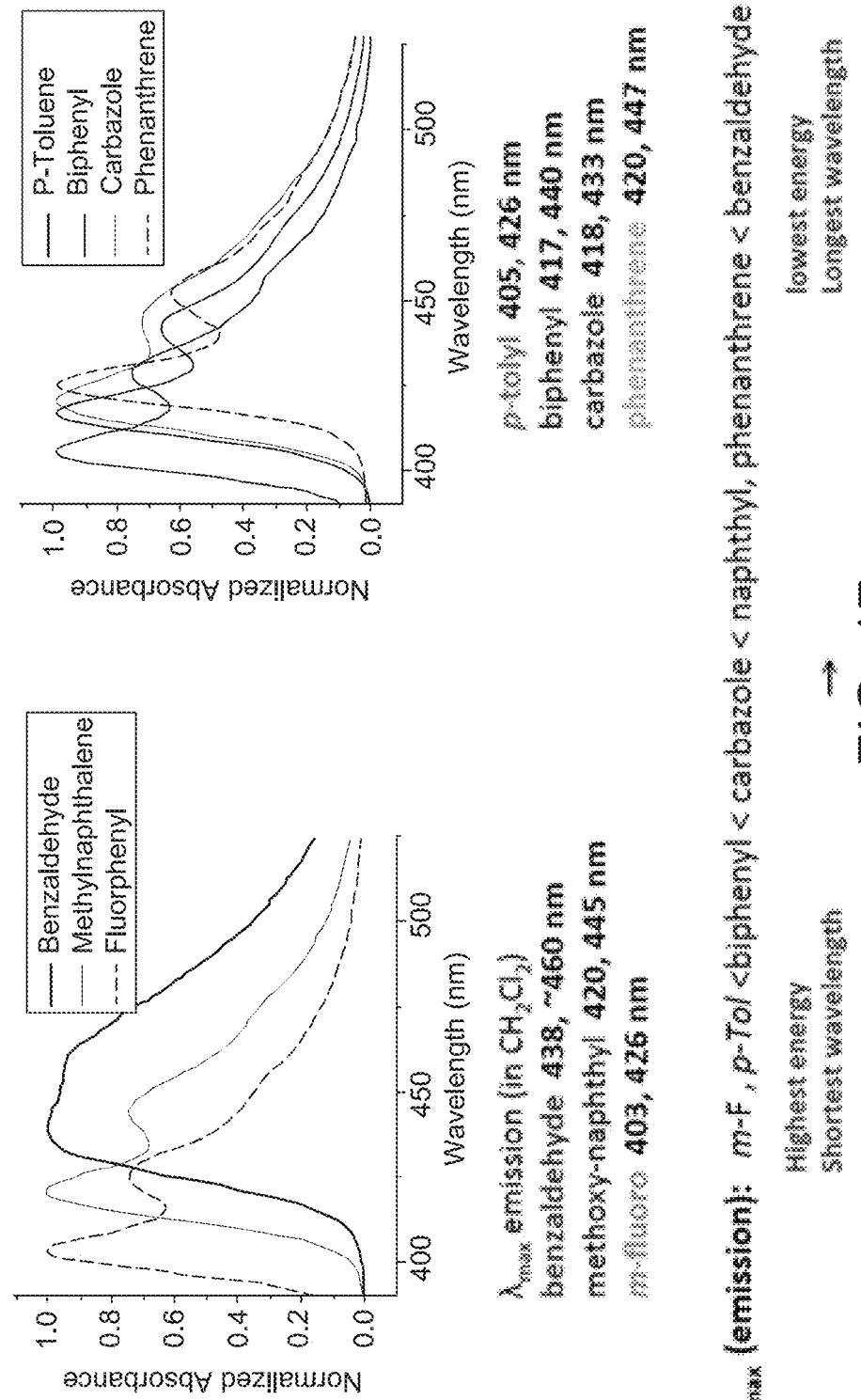
FIG. 17 is an exemplary embodiment of emission data for silafluorenes in $CH_2Cl_2$ in accordance with the present disclosure.
Figure 19:
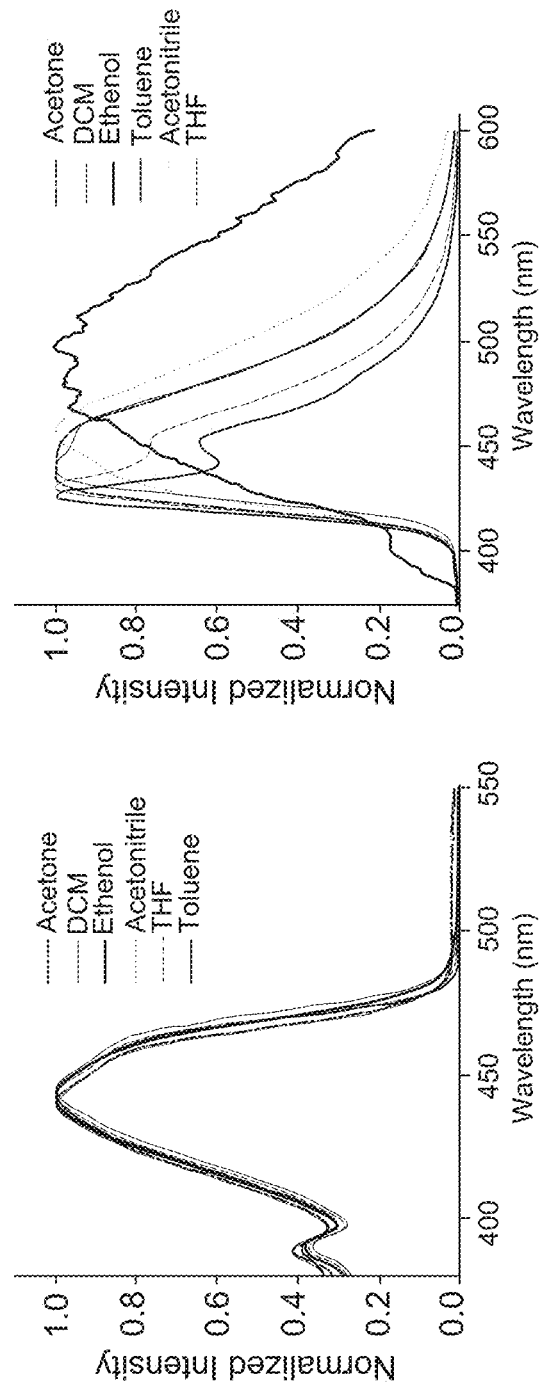
FIG. 19 is an exemplary embodiment of absorbance and emission data for benzaldehyde-silafluorenes in $CH_2Cl_2$ in accordance with the present disclosure.

Characterization of new compounds was accomplished with $^1H$, $^{13}C$, $^{29}Si$ NMR and UV-Vis and fluorescence spectroscopy, X-ray crystallography, EA, mp (off-white to yellow solids). FIGS. 12-14 show the crystal structures for compounds 7, 6 and 4, respectively along with selected bond distances and angles. FIGS. 15-19 show the corresponding optical data.

Example 5. Metallafluorene Fluorescence

Figure 20:
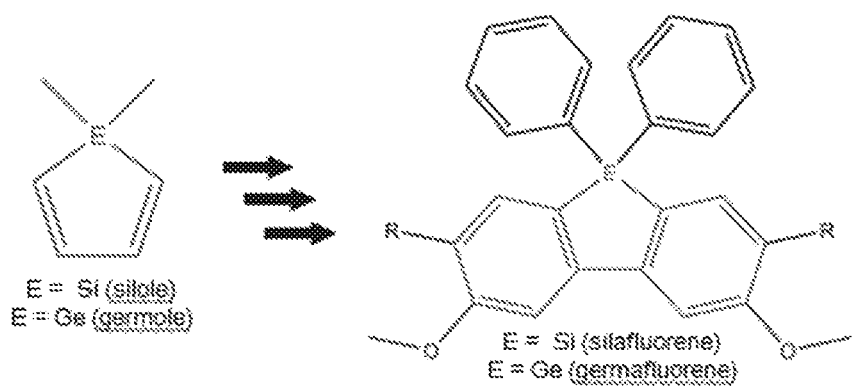
FIG. 20 is an exemplary embodiment of metallafluorenes exhibiting tunable fluorescence in accordance with the present disclosure.

Fluorescent materials' applications all have one common goal: efficiency. Chemicals which efficiently convert input energy to output light have been in high-demand, from uses as light sources to chemical sensors. These molecules are particularly valuable in their modifiability: The output efficiency of a fluorescent molecule is intrinsically related to its electronic structure. Highly efficient blue-emitting fluorescent molecules called silafluorenes and germafluorenes are studied for their fluorescence properties, in part for the goal of biochemical probing (FIG. 20).

Figure 21:
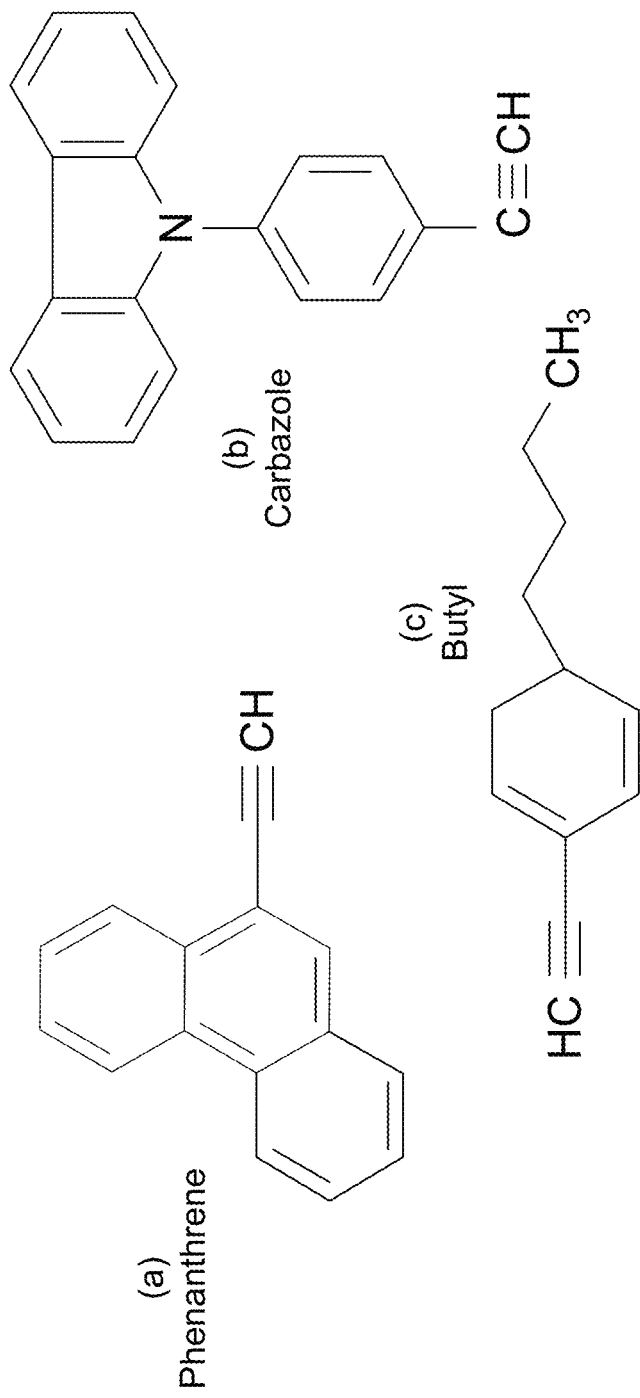
FIG. 21 is an exemplary embodiment of R-groups used to demonstrate fluorescence in accordance with the present disclosure.
Figure 22:
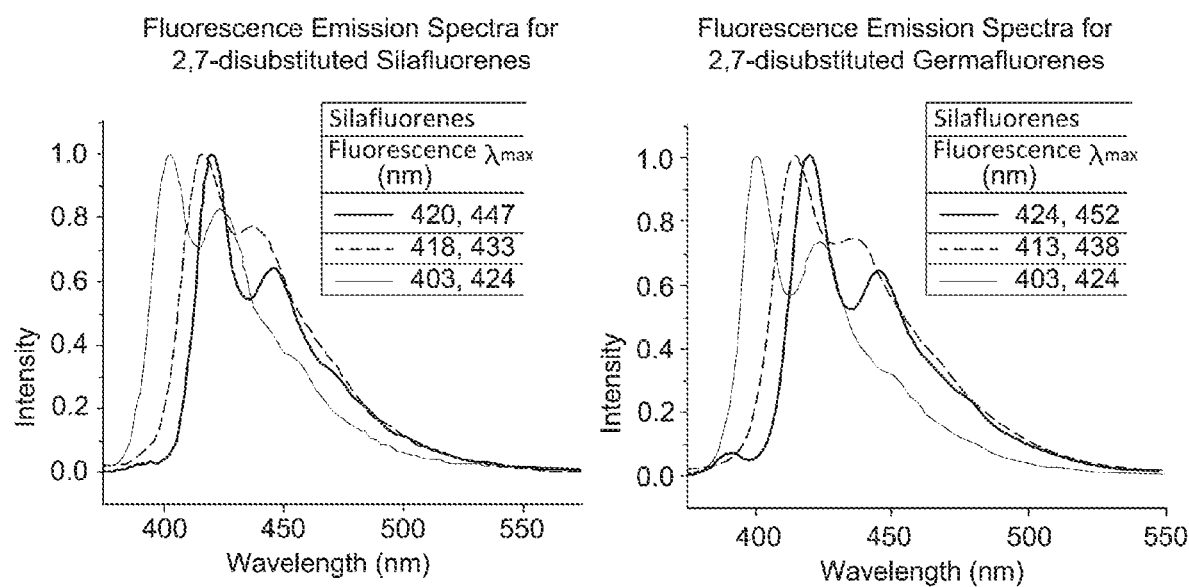
FIG. 22 is an exemplary embodiment of fluorescence emission spectra for (left) silafluorenes a, b, c from FIG. 21 and (right) corresponding germafluorenes.

Metalloles provide a structural and electronic basis for metallafluorenes but lack fluorescence intensity. Metallafluorenes improve fluorescence intensity by adding electron-donating and -withdrawing groups. The emission energy—and color—are tunable using these groups (FIGS. 21 and 22). Sila- and germafluorenes have been synthesized with high emission intensity and efficiency.

Silafluorenes may be used as biochemical probes, and more specifically, cellular probing agents. Silafluorenes are water-soluble enough to measurably fluoresce. Silafluorenes have shown little to no toxicity towards cells. Silafluorenes' emissions show (via confocal microscopy) their entrance into cells.

Figure 23:
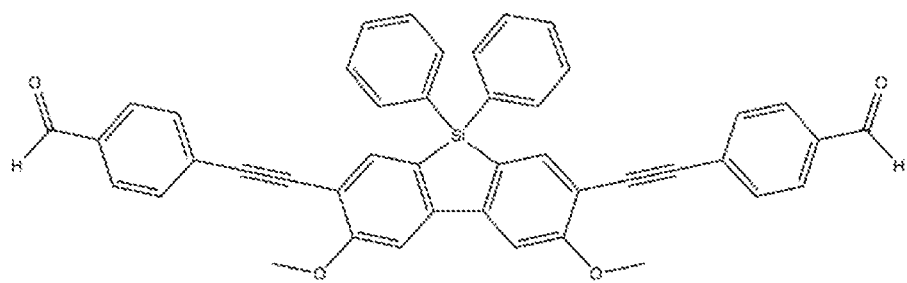
FIG. 23 is an exemplary embodiment depicting the structure of 2,7-bis(4-ethynylbenzaldehyde)-3,6-dimethoxysilafluorene, abbreviated as "benzaldehyde silafluorene," in accordance with the present disclosure.
Figure 24:
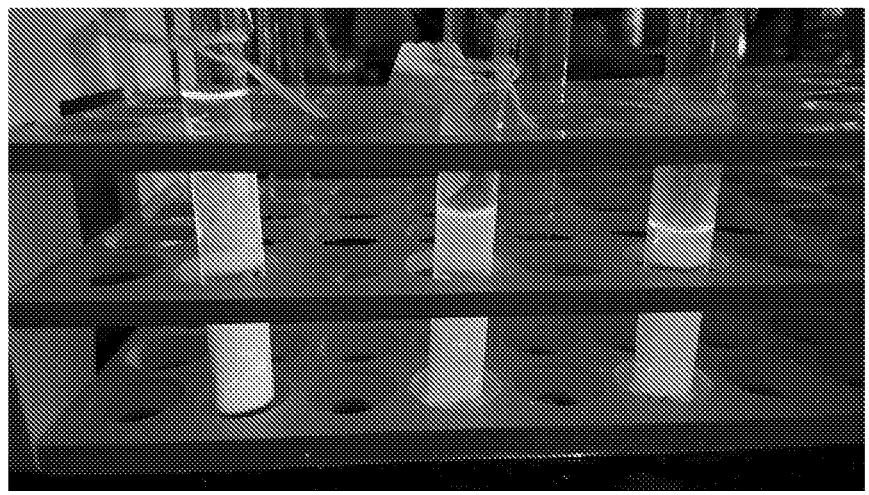
FIG. 24 is an exemplary embodiment of the solvatochromic properties of benzaldehyde silafluorene in (from left→right): ethanol, dichloromethane, and hexanes, in accordance with the present disclosure. $\lambda_{max}$ ranges over 100 nm (from roughly 440-550 nm) depending on the solvent.

Solvents, like water and dichloromethane, greatly affect the fluorescence energy (i.e., color) of some molecules—this is called solvatochromism. Excited electrons may mobilize across the molecule more easily in these cases. For example, 2,7-bis(4-ethynylbenzaldehyde)-3,6-dimethoxysilafluorene emits green in ethanol, but blue in nonpolar solvents (FIGS. 23-24).

Tunability of Silafluorenes

Metallafluorene fluorescence can be tuned via variable ethynyl substituents. They also fluoresce differently depending on the polarity of their solvent. This variability makes them good potential probes of biological systems. Their fluorescent behavior was characterized in aqueous solution (FIG. 25). Identification of interactions with biomolecules is studied, and their viability as cellular stains is determined.

Tunability Outcomes

Metallafluorenes clearly interact with detergents (lipid mimetics), but they may also interact with other biomolecules. Triton X-100 is a nonionic detergent; other charged detergents may elicit different spectral changes. All fluorescence spectra were collected at constant pH, and these compounds may be pH-sensitive. Between the 9Si and the 13Si, there are different staining patterns. Metallafluorenes may exhibit unique staining properties. Staining may be altered and/or further improved by chemically fixing cells.

Example 6. Emission Behavior of Metallafluorenes in Aqueous Solution

Figure 26:
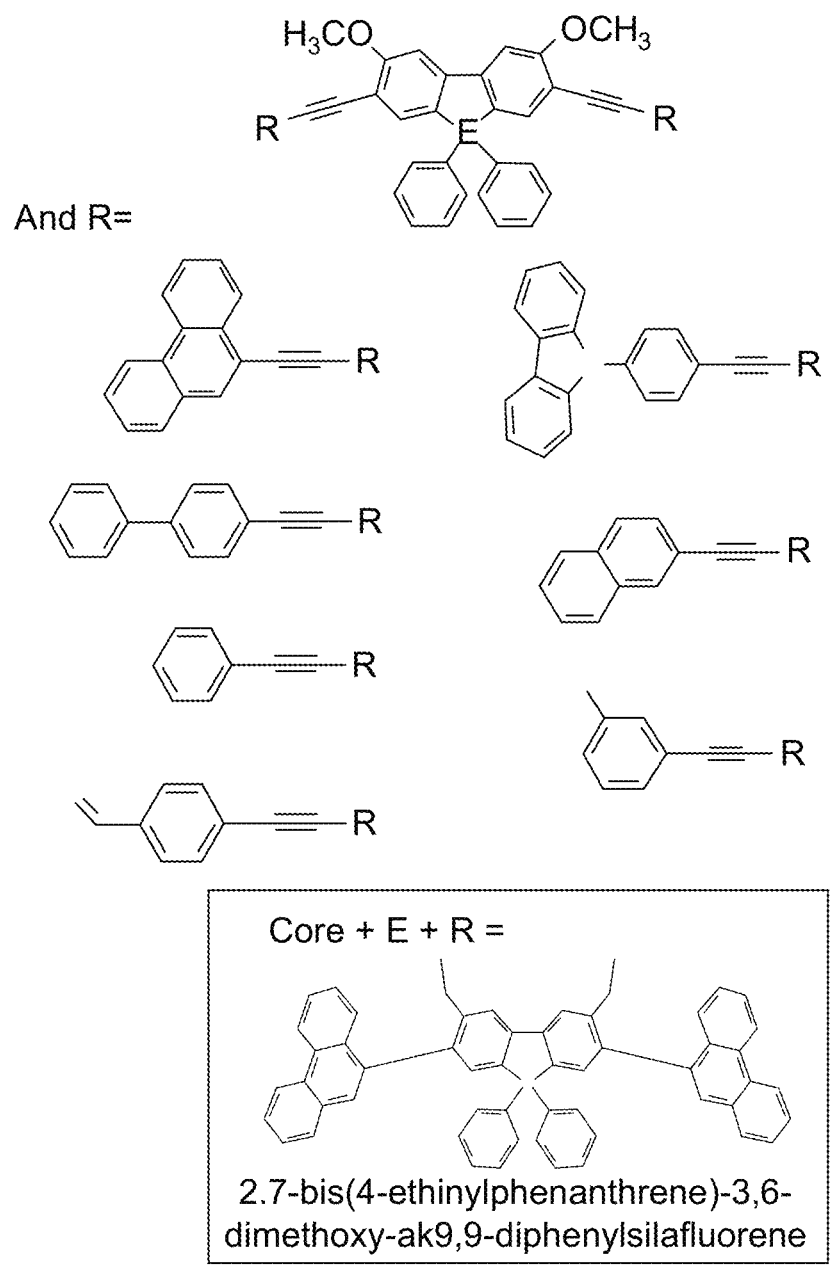
FIG. 26 is an exemplary embodiment of R groups and structures of the compounds tested for fluorescence in aqueous solutions in accordance with the present disclosure.
Figure 27:
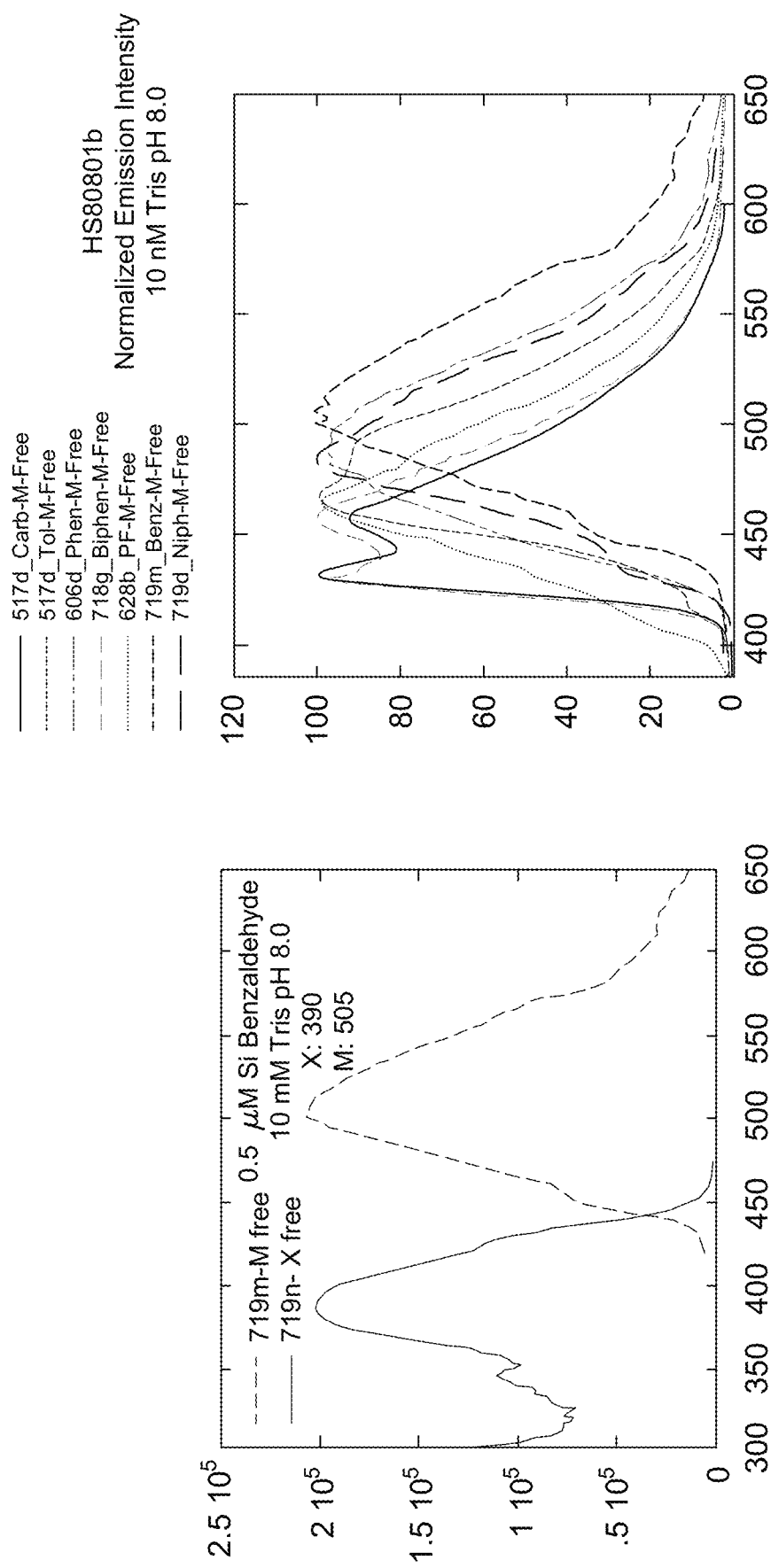
FIG. 27 is an exemplary embodiment of fluorescence spectra of metallafluorene compounds in aqueous solution in accordance with the present disclosure.

Fluorescence spectra of seven metallafluorenes were collected in 10 mM Tris pH 8.0 at 25° C. (FIG. 27). The concentration of each compound was such that the absorbance at $\lambda_{max}$ was 0.1. The R groups tune the spectral behavior (FIG. 26). This can be useful in microscopy and spectral studies.

Figure 28:
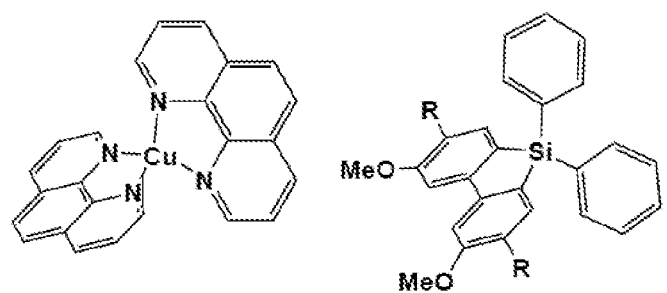
FIG. 28 is an exemplary embodiment depicting the structures of (left) [Cu(phen)$_2$] and (right) 9,9-diphenyl-silafluorene in accordance with the present disclosure.

Example 7. Interactions with Biomolecules: Spectroscopic DNA Binding Studies The silafluorene molecule shares a couple of important features of DNA binding molecules such as a) a polycyclic moiety that is common to molecules that interact with the base stack of DNA (intercalation), strong emission behavior, and a tetrahedral shape, and b) copper bis(phenanthroline) binds to DNA and has shown antimicrobial and anticancer activity (FIG. 28).

Data show that 2,7-bis-alkynyl(phenanthrene)silafluorene can be dissolved in DMSO and subsequently diluted into aqueous buffer at low micromolar concentration (FIG. 29). This compound shows a promising decrease in fluorescence emission upon addition of calf thymus (mixed sequence) DNA suggesting an interaction with DNA.

Example 8. Interactions with Biomolecules: Spectroscopic Detergent Studies

Figure 30:
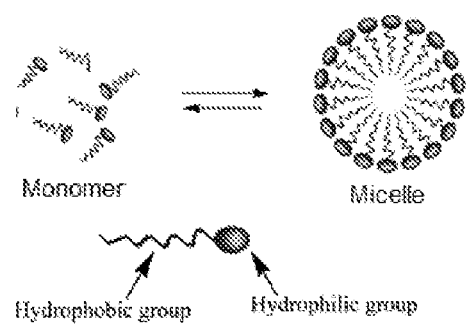
FIG. 30 is an exemplary embodiment depicting detergent structures in accordance with the present disclosure.

Detergents are membrane mimetics. Detergents are amphiphilic: they have a hydrophobic tail with a hydrophobic head. Above a certain concentration, detergent monomers aggregate to form micelles (FIG. 30). This concentration is the critical micelle concentration (CMC).

Figure 31A:
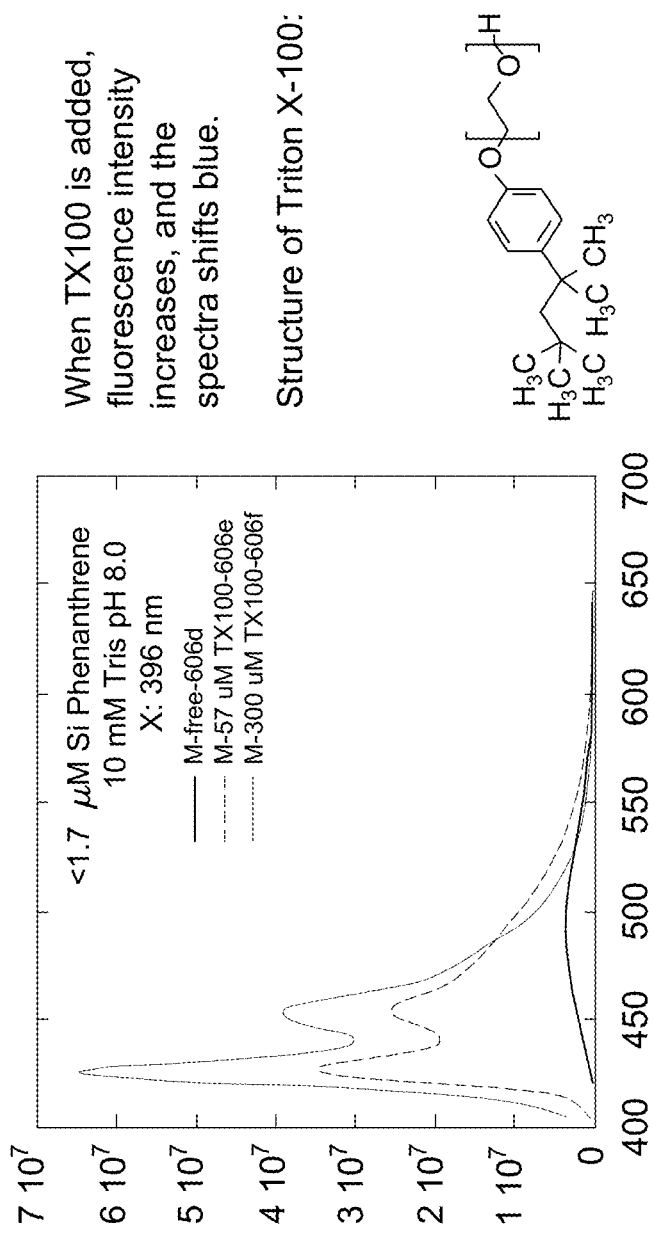
FIG. 31A is an exemplary embodiment of fluorescence spectra of metallafluorene compounds with detergent in aqueous solution in accordance with the present disclosure.
Figure 31B:
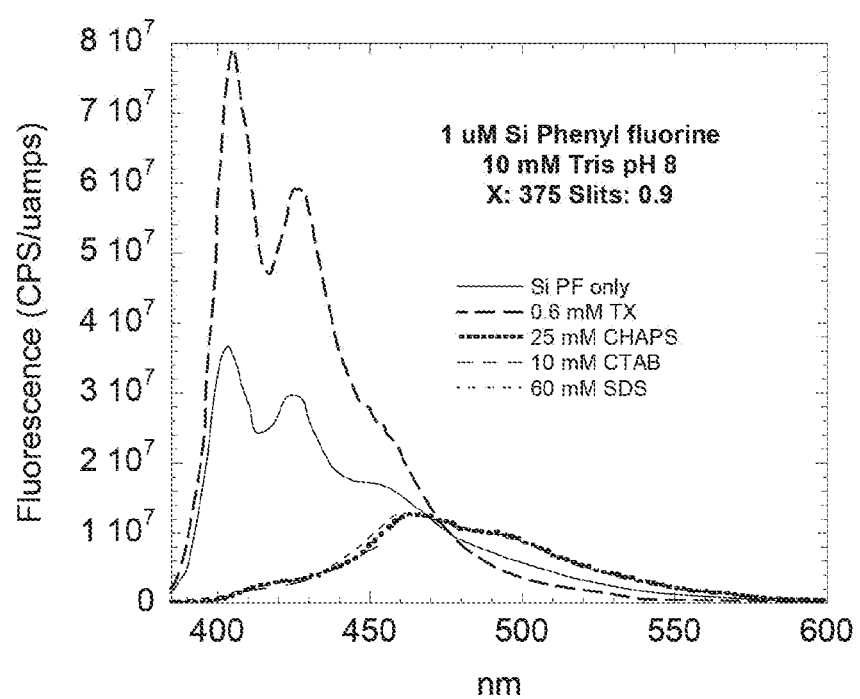
FIG. 31B is an exemplary embodiment of fluorescence spectra of metallafluorene compounds with detergent in aqueous solution in accordance with the present disclosure.
Figure 32:
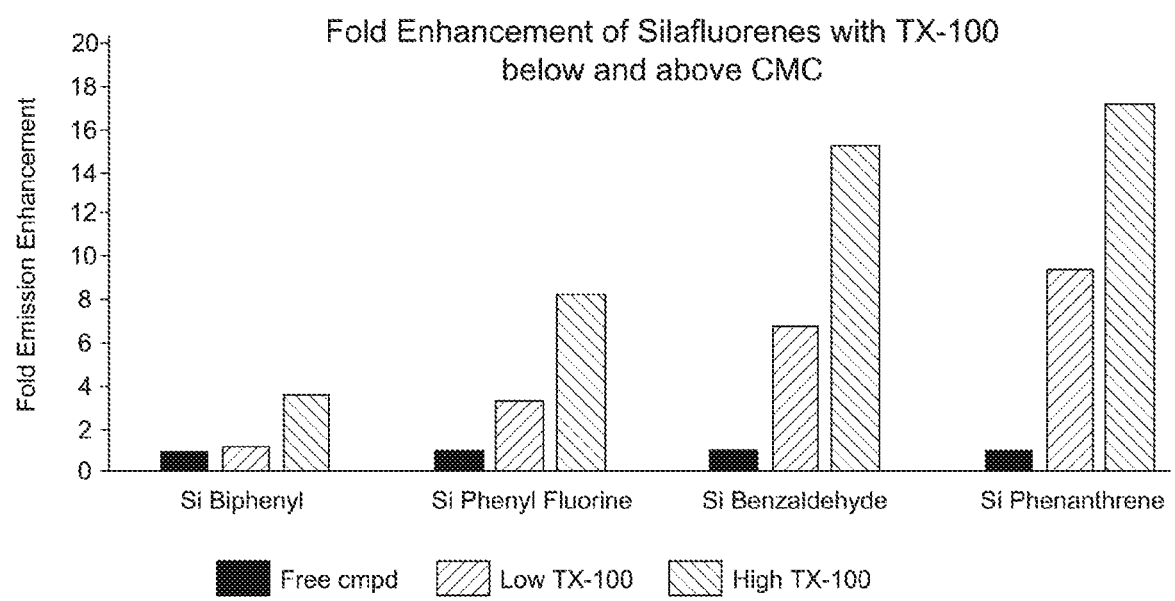
FIG. 32 is an exemplary embodiment of fold enhancement of silafluorenes with TX-100 below and above CMC in accordance with the present disclosure.

Detergents enhance fluorescence. Triton X-100 (TX100) was added to each metallafluorene at concentrations below and above TX-100's CMC (0.3 mM), and fluorescence was measured (FIGS. 31A, 31B, and 32). These data suggest that metallafluorenes could be sensitive to membranes and could serve as a probe.

Example 9. Cellular Toxicity Studies

Figure 33:
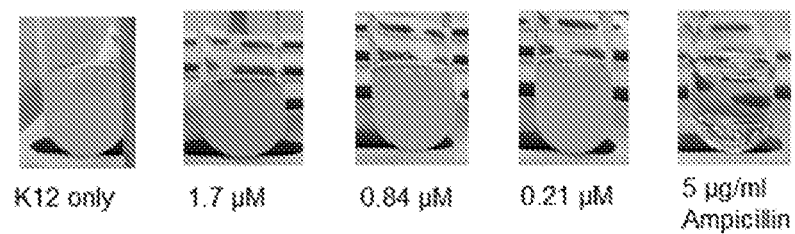
FIG. 33 is an exemplary embodiment of *E. coli* K12 treated with 2,7-bis(4-ethynylphenanthrene)-3,6-dimethoxy-9,9-diphenylsilafluorene in DMSO in accordance with the present disclosure.
Figure 34:
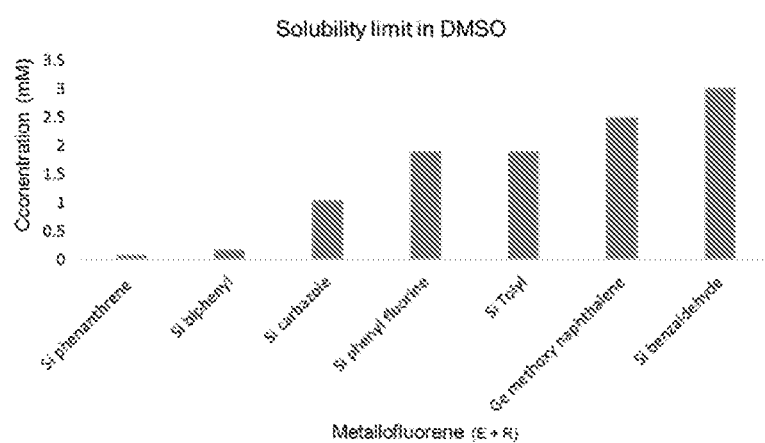
FIG. 34 is an exemplary embodiment of solubility limits of shown compounds in DMSO in accordance with the present disclosure.

Gram negative and positive bacteria were treated with a range of concentrations of each metallafluorene and allowed to grow overnight. Ampicillin was used as a positive control. Turbid media after incubation meant that the metallafluorene did not inhibit bacterial growth (FIG. 33). Toxicity of metallafluorenes was tested in gram negative bacteria (*E. coli*) and gram-positive bacteria (*S. aureus*). Each compound was diluted so that there was either 2% DMSO in *E. coli* cultures or 10% DMSO in *S. aureus* cultures. The data show that metallafluorenes are not toxic to bacteria (FIG. 34).

Example 10. Cellular Imaging Studies

Figure 35:
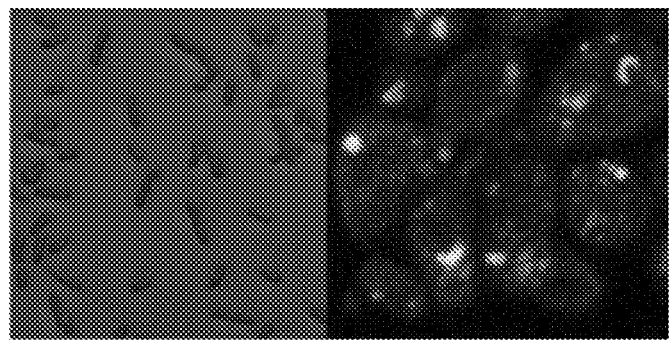
FIG. 35 is an exemplary embodiment of confocal images of fixed cells after 10 min incubation with 9Si for (left) *E. coli* cells, overlay of transmitted light and fluorescence and (right) Fluorescence of yeast cells, in accordance with the present disclosure. Yellow color is for best contrast. 100×.
Figure 36:
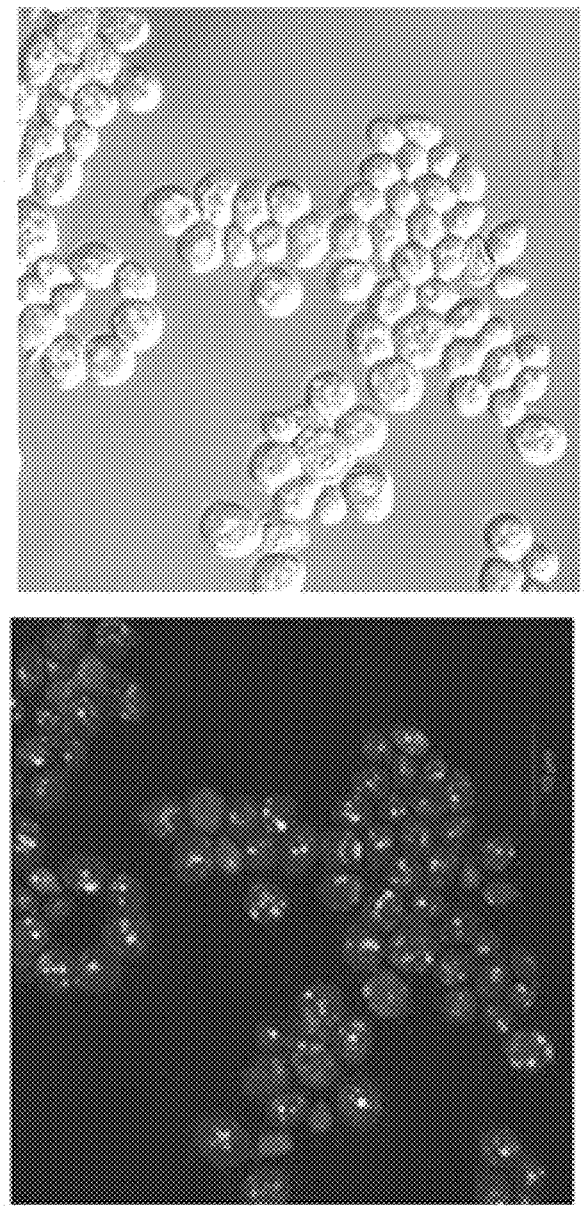
FIG. 36 is an exemplary embodiment of *S. cerevisiae* stained with 9Si phenanthrene at 100× magnification in accordance with the present disclosure. The scale bar is 10 microns. 9Si was excited with a 405 nm laser. Cells were permeabilized with DMSO. This image shows that metallafluorenes are either localizing onto an intracellular structure or self-aggregating within the cell.

*S. cerevisiae* were stained with 2,7-bis(4-ethynylphenanthrene)-3,6-dimethoxy-9,9-diphenylsilafluorene, referred to as Si phenanthrene, for 1 hour, then imaged on a confocal microscope (FIGS. 35 and 36).

S. cerevisiae were stained with 2,7-bis(4-ethynylbenzaldehyde)-3,6-dimethoxy-9,9-diphenylsilafluorene, referred to as Si benzaldehyde, for 1 hour, then imaged on a confocal microscope (FIG. 37). Again, DMSO was used to permeabilize cells.

Example 11. Inventive Compounds and Derivatives Thereof

Molecules containing Si as a central atom (not as a protecting group) with aromatic polycyclic groups have been shown to have useful applications in the biological milieu. Biological applications of these molecules based on their intense fluorescence in solution and in the solid-state are described herein.

Figure 38:
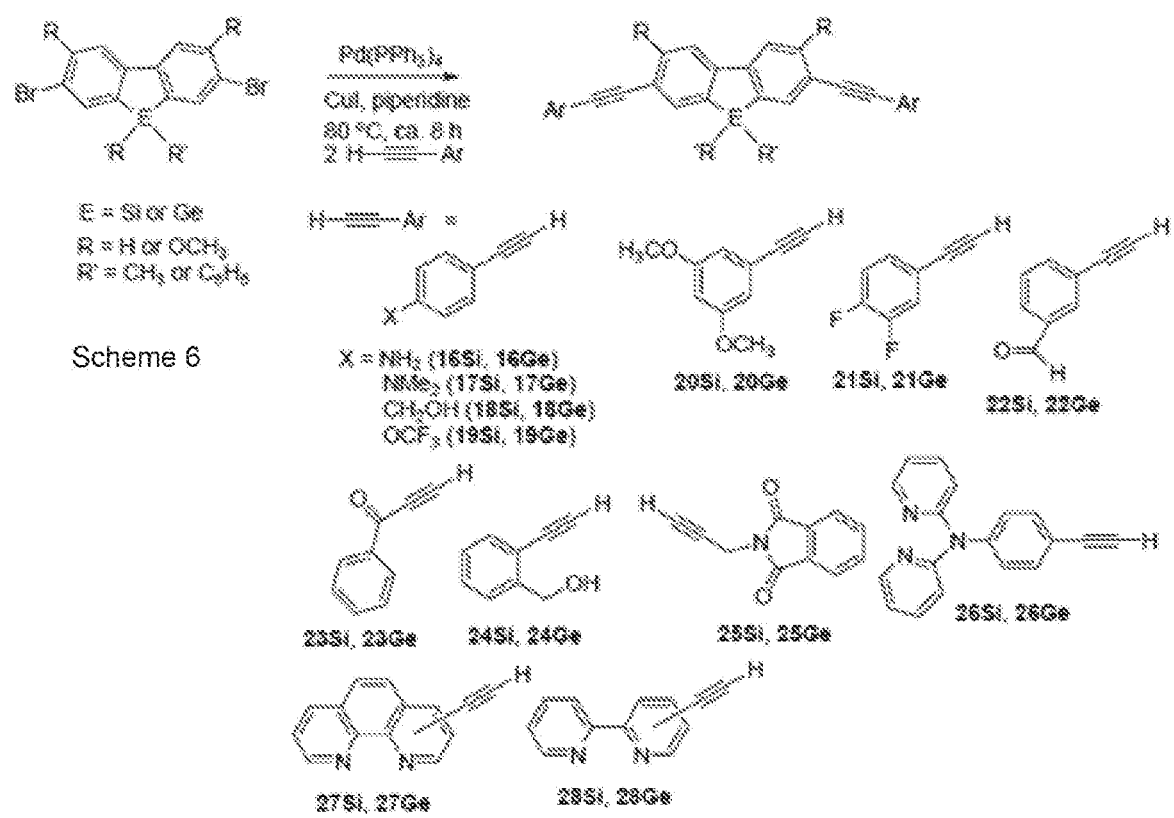
FIG. 38 is an exemplary embodiment depicting methods of synthesis in accordance with the present disclosure (Scheme 6).
Figure 39:
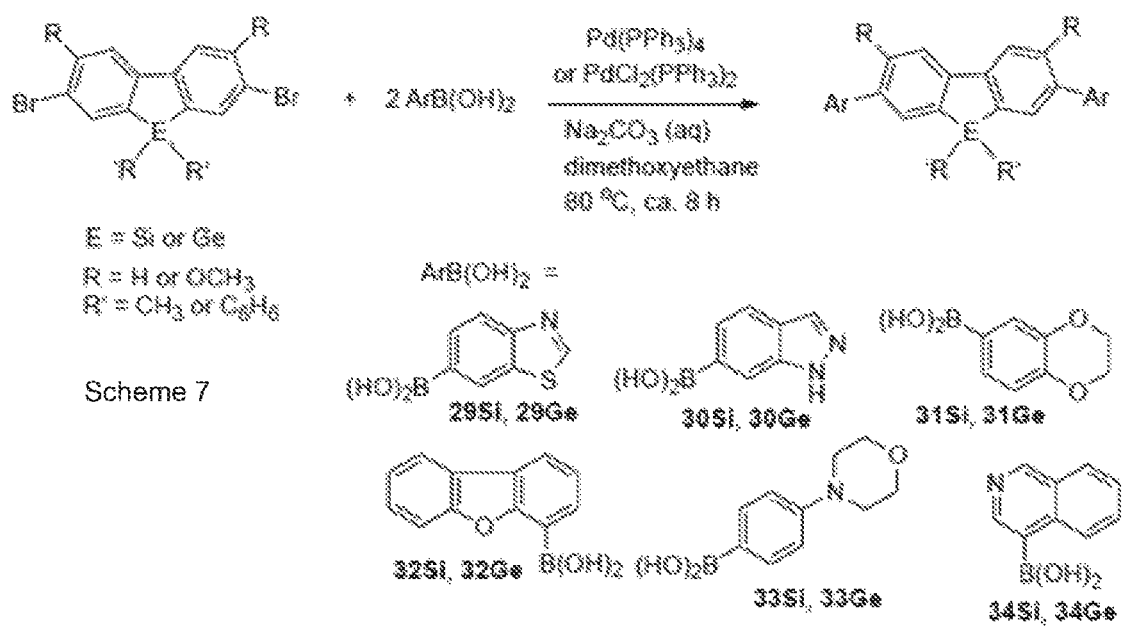
FIG. 39 is an exemplary embodiment depicting methods of synthesis in accordance with the present disclosure (Scheme 7).

As DNA ligands, the disclosed Si and Ge compounds could have exciting applications in diagnostics, detection, and potentially antibiotic and anticancer therapy. Derivatives 20Si/20Ge-28Si/28Ge (Scheme 4) and 29Si/29Ge-34Si/34Ge (Scheme 5) that are more water soluble are prepared and tested for DNA binding and antimicrobial behavior (FIGS. 38-39).

Substantial research has been reported on the synthesis, characterization and applications of luminescent Group 14 containing molecules such as siloles, silaindenes, silafluorenes (and some related Ge derivatives) primarily for OLED applications. Silafluorenes are also commonly named as dibenzosiloles. The optoelectronic properties of these molecules can be fine-tuned through careful design of the π-conjugated framework. Part of the unique optoelectronic properties of these molecules can be attributed to σ*-π* conjugation between the exocyclic groups on the Group 14 center and the π* orbitals on the butadiene unit. These features give rise to high electron mobility and affinity.

Functionalized silole molecules have been studied for their aggregation-induced emission (AIE) properties and as luminogens for biosensing, and light-up bioprobe applications. More recently, other silicon-ring systems based on the well-known fluorescein and rhodamine dyes have gained interest for their role as fluorescent probes for bio-imaging. A series of dibenzosiloles were prepared and investigated for their role as inhibitors in place of phenanthridinone, which is a structural component of ligands of retinoic acid receptor-related orphan receptors (RORs). These dibenzosiloles had significant ROR-inhibitory activity and could be a useful molecule type for the development of biologically active molecules.

The series of sila- and germafluorene molecules described herein contain either an -alkynyl(aryl) or -alkynyl(group) bound to the 2,7-positions of the metallafluorene ring system. In particular, substituents are incorporated that may enhance the water solubility of these ring systems, making them amenable to biological applications. Scheme 4 shows the reactions for the preparation of the sila and germafluorene molecules that contain new -alkynyl(aryl) (and other) groups bound to ring system (FIG. 38).

An improved procedure for the preparation of 2,7-dibromo-9,9-diphenylsila- and germafluorene (without OMe groups at 3,6-positions) is used for the preparation of these two starting compounds as shown in Scheme 6 (FIG. 38). The alkynyl groups can be attached to the ring system utilizing Sonogashira coupling reactions analogous to those shown in Scheme 2. Alternative Sonogashira coupling conditions have been reported and can be used if the conditions used in Scheme 2 do not provide some of the desired products in good yield. If needed, alcohols can be protected with a trimethylsilyl group by reaction with $Me_3SiCl$. The compound numbers for the 2,7-bis(alkynyl(aryl)-sila- and -germafluorenes are listed based on the aryl(alkyne) that are used to prepare them as shown in bold in Scheme 6 (20Si/20Ge-28Si28Ge).

The sila- and germafluorenes in Scheme 6 are synthesized with both methyl groups or phenyl groups attached to the group 14 center. The required dimethyldichlorosilane and— germane as well as the diphenyldichlorosilane and—germane precursors used in the ring closure step (analogous to Schemes 1 and 4 under air- and moisture-free conditions) are commercially available. Having the two different groups at the Si and Ge centers allows examination of the effects of having substituents of different size at the Group 14 center on the DNA binding studies. All of the alkynes with the exception of the bottom three shown in Scheme 4 are commercially available. The remaining alkynes with the nitrogen-based groups are prepared according to known procedures. Terminal (aryl)alkynes are readily prepared by Sonogashira coupling of an aryl halide with trimethylsilylacetylene catalyzed by Pd/Cu. In a second step, the trimethylsilyl group is removed by treatment with KF/MeOH to give the terminal alkyne product.

Synthesis reactions of a series of new 2,7-diaryl sila- and germafluorenes utilizing Suzuki-Miyaura coupling conditions are shown in Scheme 7 (FIG. 39). A series of arylboronic acids are reacted with the sila- and germafluorene rings utilizing Suzuki-Miyaura coupling reactions to incorporate functionalized aryl-based rings at the 2,7-sites using standard conditions as shown in Scheme 5.

A variety of homogeneous and heterogenous reaction conditions are known for the versatile Suzuki-Miyaura coupling reaction. The compound numbers for the 2,7-diarylsila- and -germafluorenes are listed based on the arylboronic acid used to prepare them as shown in bold in Scheme 7. Depending upon the nature of the aryl groups bound to the sila- and germafluorenes, blue to green emission may be produced from compounds. The use of aryl groups conjugated to the metallafluorene core can extend the conjugation, resulting in emission at longer wavelengths.

Alternative reaction conditions ensure good yields of the target compounds. The Suzuki-Miyaura coupling has been used for the reaction of triphenylamine diboronic acid with 2,2'-dibromo-9,9'-spiro-9-silabifluorene to yield a triphenylamine-spirosilabifluorene alternating polymer utilizing standard reaction conditions similar to those in Scheme 7. Suzuki coupling has also been used to prepare heterofluorene copolymers containing silafluorene, germafluorene and other metallafluorene units. A greener synthetic protocol for the synthesis of substituted organoboronic acids using bis (boronic acid) is known in the art. This procedure may be used to synthesize additional organoboronic acids.

The compounds described herein (Schemes 6 and 7) are air- and water stable with good thermal stability. The compounds can be characterized by multinuclear NMR, mass spectrometry, elemental analysis, UV-Vis and fluorescence spectroscopy, and X-ray crystallography.

Example 12. Biological Characterization

The new compounds are tested for solubility in polar, water miscible solvents such as acetonitrile, isopropyl alcohol, and DMSO. Molar extinction coefficients may be obtained via mass for use in quantitative work. From such stocks, many organic compounds are retained in solution after dilution from one of the above solvents into aqueous buffer. Solubility results are iteratively correlated with structural features to optimize water solubility.

The compounds are screened for spectral changes upon the addition of commercially available mixed sequence calf thymus (CT) DNA. It is common for DNA ligands to not luminesce in aqueous solution but exhibit emission upon binding DNA. Fluorescence emission spectra upon excitation at lambda max for absorption are collected. If a change in emission is observed, an approximate binding affinity is obtained via titration.

DNA ligands are often effective as antibiotics. As an initial screen of biological activity, all compounds are tested for antimicrobial activity against Gram positive (Staph aureus) and Gram negative (E. coli) using liquid culture. More specifically, by varying the concentration of compound in liquid culture, the concentration at which bacterial growth is inhibited can be determined (MIC).

Example 13. Characterization and Analysis

Figure 40:
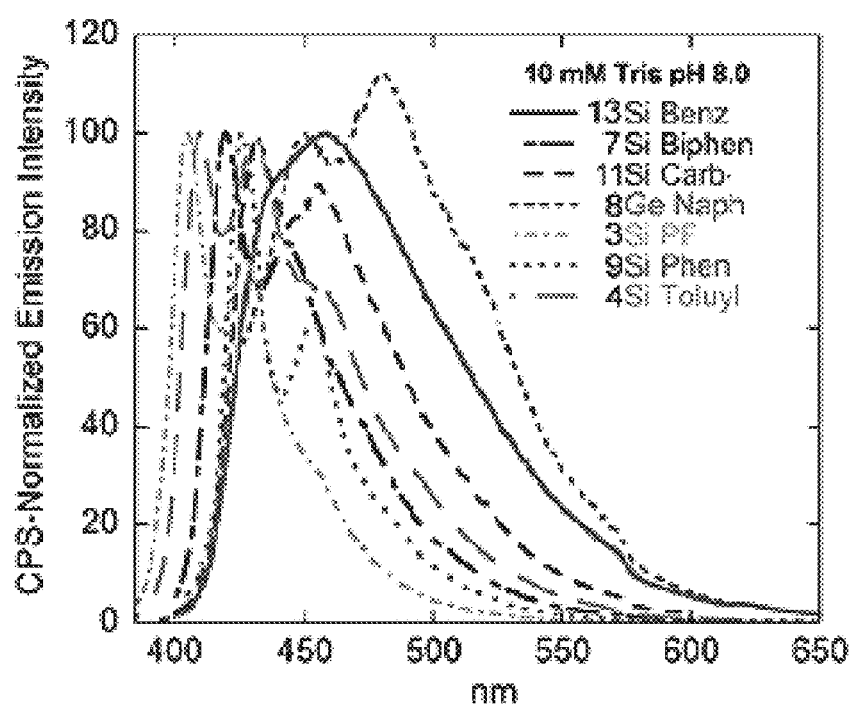
FIG. 40 is an exemplary embodiment of emission spectra of metallafluorenes in buffer in accordance with the present disclosure.

Silafluorenes with a broad range of alkynyl substituent groups: 3Si, 4Si, 7Si, 8Ge, 9Si, and 11Si, and 13Si are tested for solubility. Briefly, all are soluble at low micromolar concentrations in DMSO (9.1 and 7Si were least soluble), and absorption spectra and extinction coefficients were determined for all. All exhibit luminescence when these DMSO stocks are diluted into aqueous buffer (no more than 2% DMSO). In aqueous buffer, all compounds exhibit emission spectra from 400-650 nm, with varying $\lambda_{max}$ values. This provides a tunability to the optical behavior that is useful for imaging (FIG. 40).

Non-denaturing detergents, common proxies for membranes and lipids, were added to each compound. Indeed, when the neutral detergent Triton X-100 is added to 13Si, 9Si, 4Si and 3Si, dramatic blue shifts and emission enhancements were observed. The degree of enhancement ranged from 2-18-fold in the increasing order 8Ge=11Si<4Si=7Si<<3Si<<13Si=9Si. Moreover, the degree of enhancement is very sensitive to the aggregation state of the detergent: enhancement is more dramatic at concentrations at which the detergents are known to form micellar aggregates (i.e. the critical micelle concentration).

It is important to determine what parts of the metallafluorenes contribute most to desirable biological behavior, and subsequently, how these behaviors can be enhanced. Specific substituents of interest are outlined in Table 1 and discussed below.

TABLE 1

Metallafluorene substitutions.

| Substitution Type | Rationale | Scheme |
|---|---|---|
| Exocyclic aryl groups | Electron donating vs. withdrawing | 4 |
| Exocyclic aryl groups | o-, m-, -p substitution patterns | 4 |
| Si vs. Ge | Effect of central atom | 4 |
| Central substituent at Si/Ge | Electron donating vs. withdrawing | 5 |
| Removal of alkynyl group | Effect of this group | 5 |

Figure 41:
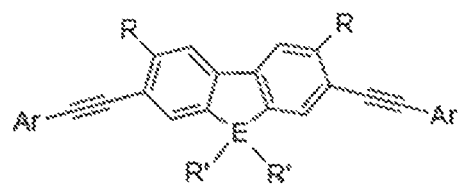
FIG. 41 is an exemplary embodiment of a target silafluorene (R=OMe or H, R'=Me or Ph) in accordance with the present disclosure.

It is noted that while 9Si showed the greatest emission enhancement upon the addition of detergent/membrane mimics, that of 3Si and 13Si derivatives are comparable. This would suggest that extended polycyclic structures (like 9Si) are not necessary for this function but electron-withdrawing substituents (like F and C=O) are important for this behavior (FIG. 41).

To test this hypothesis, the following types of structural differences are incorporated into the metallafluorene framework at two locations: 1, at the aryl groups linked to the 2,7-positions for the alkynyl(aryl)-substituted and the aryl-substituted sila- and germafluorenes and 2, directly at the Si or Ge center by preparing methyl derivatives and comparing to the corresponding phenyl derivative. See Schemes 6 and 7.

Some of the efforts focus on the synthesis, characterization, and bio-studies of the silafluorene derivatives in Schemes 6-9 with exocyclic phenyl substituents at the silicon center. Synthesis and characterization of the corresponding silafluorenes with exocyclic methyl groups at the silicon center may be pursued. Several germafluorene derivatives are synthesized based on the most promising silafluorene systems. The silafluorenes and germafluorenes described herein may be characterized by NMR, UV-Vis and fluorescence spectroscopy, mass spectrometry and X-ray crystallography, melting point, and elemental analysis.

To address whether germafluorene derivatives are better candidates for biological applications than the corresponding silafluorenes, several silafluorene derivatives are synthesized such as those shown in Schemes 6 and 7 (silafluorene precursor $Ph_2SiCl_2$ is much less expensive than corresponding Ge precursor) of both classes of compounds and their properties, stability, and biological applications results are compared. Several germafluorenes are synthesized and their properties are directly compared to the related silafluorenes to determine the role that the Group 14 center has on the photophysical properties and biological applications.

Scheme 6 shows the synthetic scheme to make luminescent 2,7-bis[alkynyl(aryl)]-3,6-dimethoxy-9,9-diphenylsilafluorenes and germafluorenes from a Pd-catalyzed Sonogashira coupling reaction between the 2,7-dibromo-3,6-dimethoxy-9,9-diphenylsilafluorene or germafluorene and an aryl-substituted terminal alkyne. The most desirable compounds have the highest quantum yields, most favorable excitation and emission behaviors, and luminescence enhancement upon the addition of membrane-mimicking detergents.

Figure 43:
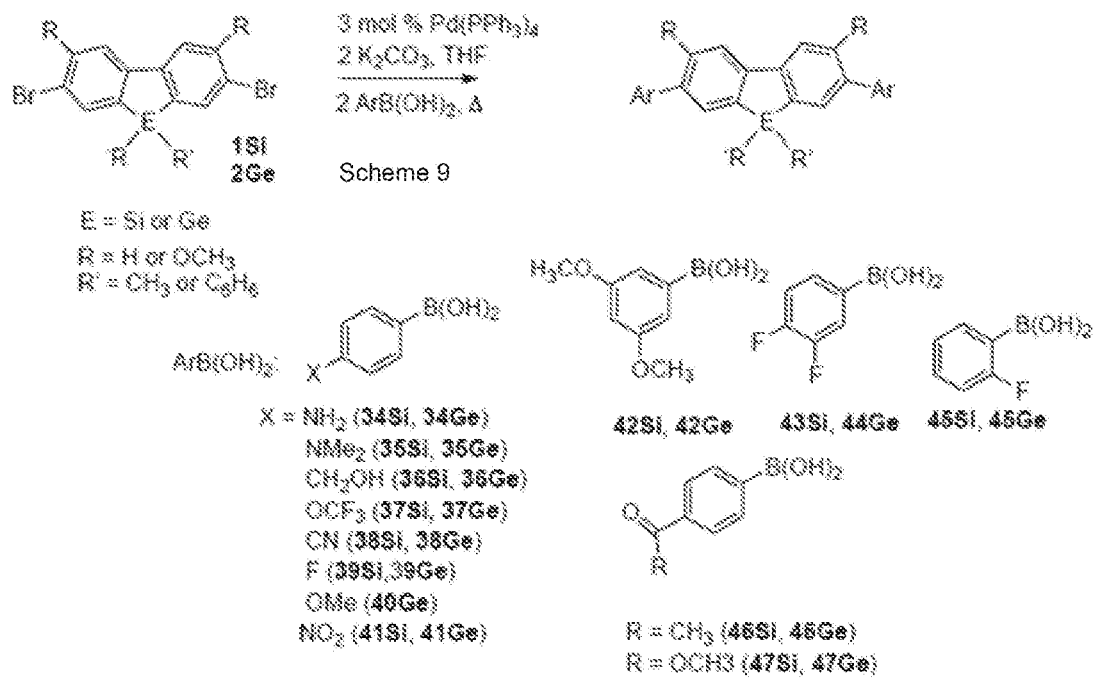
FIG. 43 is an exemplary embodiment depicting methods of synthesis in accordance with the present disclosure (Scheme 9).

Related molecules with the same aryl groups as shown in Scheme 9 are synthesized without the alkynyl group, where there is a direct bond between the aryl and the silafluorene or germafluorenes ring (FIG. 43). The synthesis of 2,7-di-(aryl)-3,6-dimethoxy-9,9-diphenylsilafluorene derivatives is particularly advantageous. The 2,7-di-(aryl)-9,9-diphenylsilafluorenes (without the methoxy groups) and 2,7-di-(aryl)-3,6-dimethoxy-9,9-diphenylgermafluorenes are synthesized and characterized and their photophysical properties are compared. This enables direct comparison of the photophysical properties by established protocols and biological activity of the new sila- and germafluorenes with respect to the role that the alkynyl group or the methoxy groups have on the photophysical properties and biological activity.

Suzuki coupling reactions are carried out with an arylboronic acid and the 2,7-dibromo-3,6-dimethoxy-9,9-diphenyl-silafluorene or -germafluorene and the 9,9-dimethylsila and -germafluorenes with the commercially available arylboronic acids shown in Scheme 9. Once the compounds are isolated, purified and fully characterized then a direct comparison is made with the properties of these compounds with their related 2,7-ethynyl(aryl) derivatives shown in Scheme 9.

The behavior of several compounds described herein suggests that forming dimers extends conjugation and thus provides greater luminescence enhancement. Asymmetric compounds containing one modified alkynyl(aryl) substituent could serve as building blocks for dimer and also represent a new direction in the preparation of this class of compounds.

Example 14. Mono-Functionalized and Asymmetric Sila- and Germafluorenes

There are a limited number of reported syntheses of mono-functionalized or asymmetric sila- and germafluorenes. This class of molecules is important since they provide an entry into developing asymmetric difunctionalized sila- and germafluorenes. The vast majority of efforts in the silafluorene area focus on silicon homo- and co-polymer preparation and applications. The efforts described herein lie in the development of asymmetric mono- and di-functionalized sila- and germafluorenes with properties that can be tuned by the nature of the different -alkynyl(aryl) or -aryl groups at the 2,7-positions of the ring.

Figure 44:
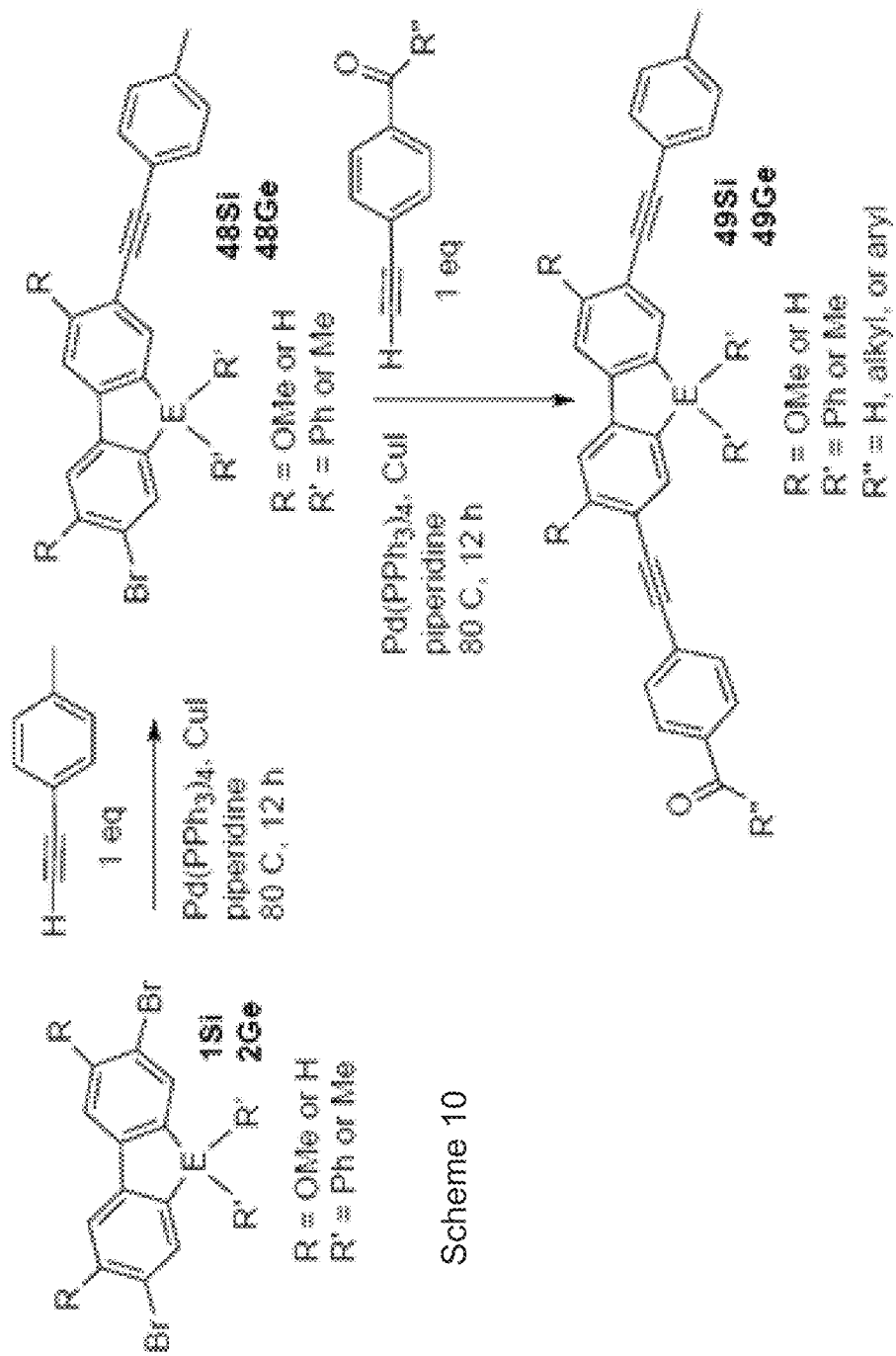
FIG. 44 is an exemplary embodiment depicting methods of synthesis in accordance with the present disclosure (Scheme 10).

Mono-functionalized sila- and germafluorenes (48Si/48Ge) can be synthesized with one alkynyl unit incorporated at the 2-position of the ring (48Si/48Ge, Scheme 6). The reactions are run under dilute conditions for both the starting dibromosilafluorene and the 4-ethynyltoluene with slow addition of the alkyne to the flask containing the dibromo-sila-(1Si) or germafluorene (2Ge). Some disubstituted silo- or germafluorenes may be produced but can be separated by recrystallization and/or column chromatography. The mono-substituted derivative can be reacted in a subsequent step with a different alkyne to give a new 2,7-difunctionalized sila- or germafluorene, 49Si or 49Ge. This reaction is outlined in the 2nd step of Scheme 10 to prepare a compound with an ethynyl(p-tolyl) group at the 2-position and a different ethynyl group with ketone functionality at the 7-position (FIG. 44).

Figure 45:
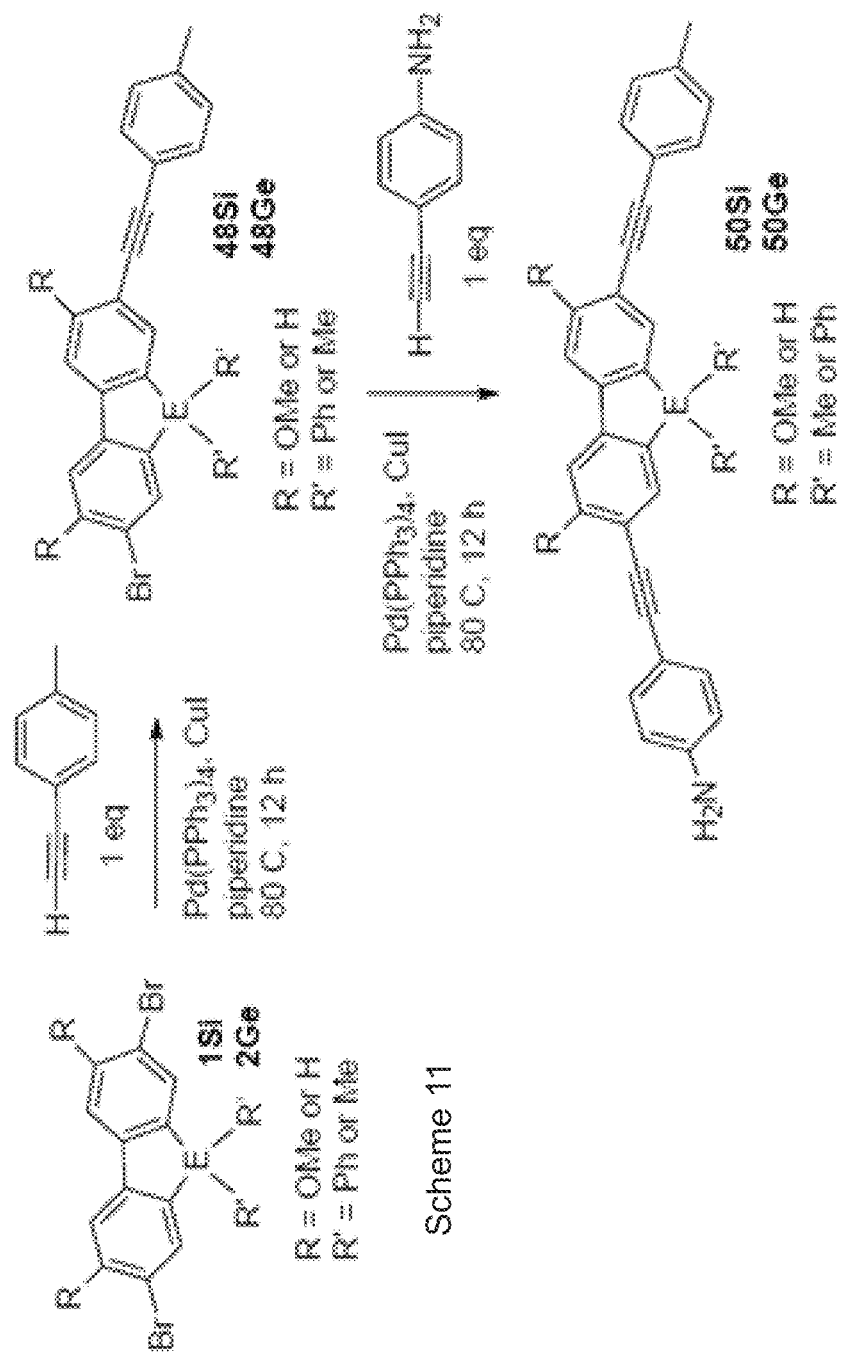
FIG. 45 is an exemplary embodiment depicting methods of synthesis in accordance with the present disclosure (Scheme 11).

Different monosubstituted derivatives of 48Si/48Ge can be prepared starting with a different alkyne than the 4-ethylnyltoluene shown in Scheme 6. A similar type of reaction can be performed to incorporate a different group at the 7-position. Scheme 11 shows the reaction to produce 50Si or 50Ge (FIG. 45).

Figure 46:
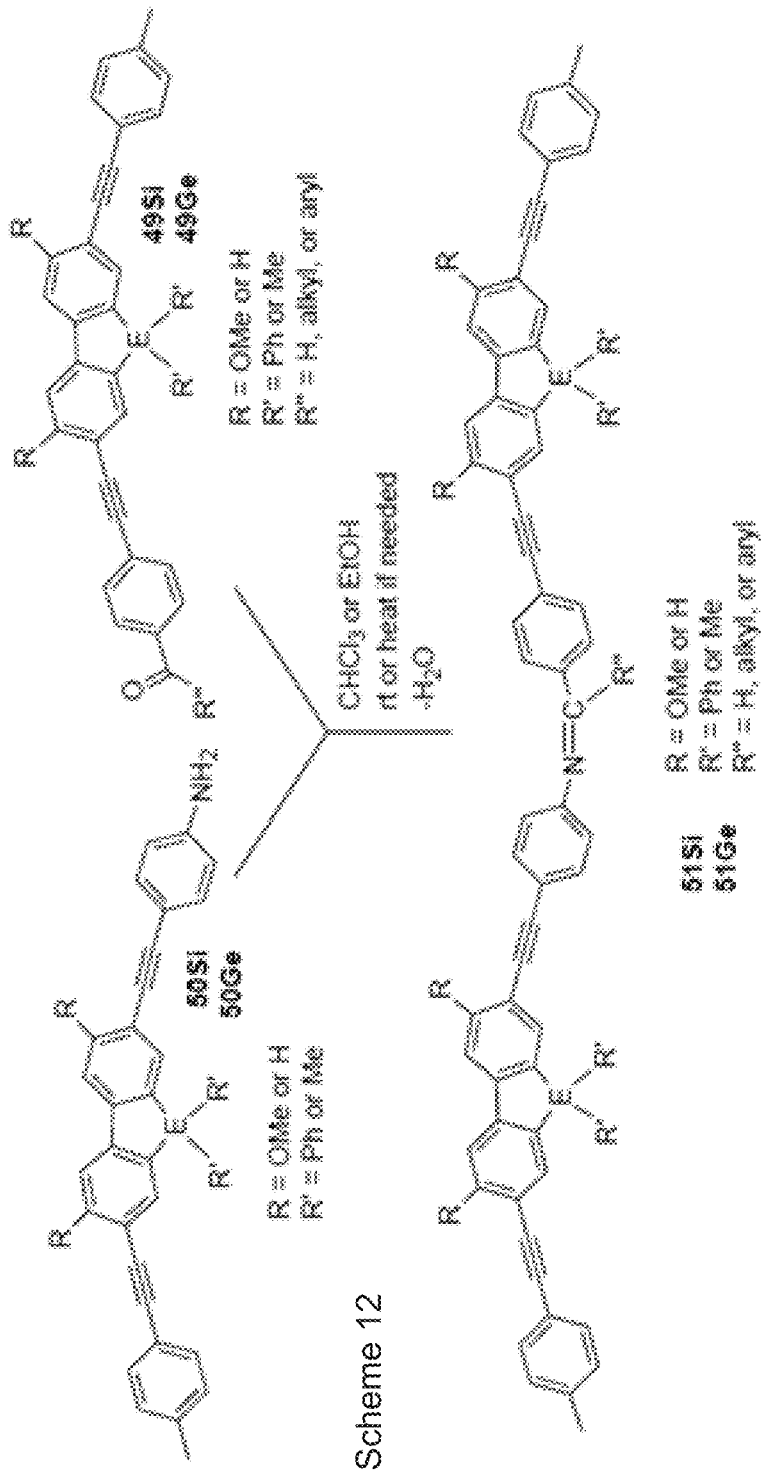
FIG. 46 is an exemplary embodiment depicting methods of synthesis in accordance with the present disclosure (Scheme 12).

Schiff base compounds can be readily prepared from a primary amine and a carbonyl compound through a condensation reaction to examine the effects of extended conjugation via the formation of silafluorenes with two centers. This is a unique and unknown route to making silafluorene and germafluorene based dimer systems. Carbonyl compounds can undergo the Schiff base reaction with primary amines. The reaction of the asymmetric sila- or germafluorenes (49Si/49Ge) shown in Scheme 12 that contain the carbonyl functionality with an asymmetric sila- or germafluorene containing an amine functionality (50Si/50Ge) is performed. Scheme 12 shows the reaction to form the Schiff Base product (FIG. 46).

The photophysical properties of the Schiff Base products are significantly different than the precursors. They exhibit strong fluorescence at longer wavelength due to extended conjugation of the pi-system in the targeted product. The extended conjugation found in these products red shifts the absorption and emission wavelengths to lower energy. Additional precursors other than those shown in Scheme 12 can be synthesized utilizing other (aryl)alkyne groups at the 2-position by changing from 4-ethynyltoluene (Scheme 11) to other alkyne precursors such as those shown in Scheme 4. Biological studies are performed with these new derivatives.

Figure 42:
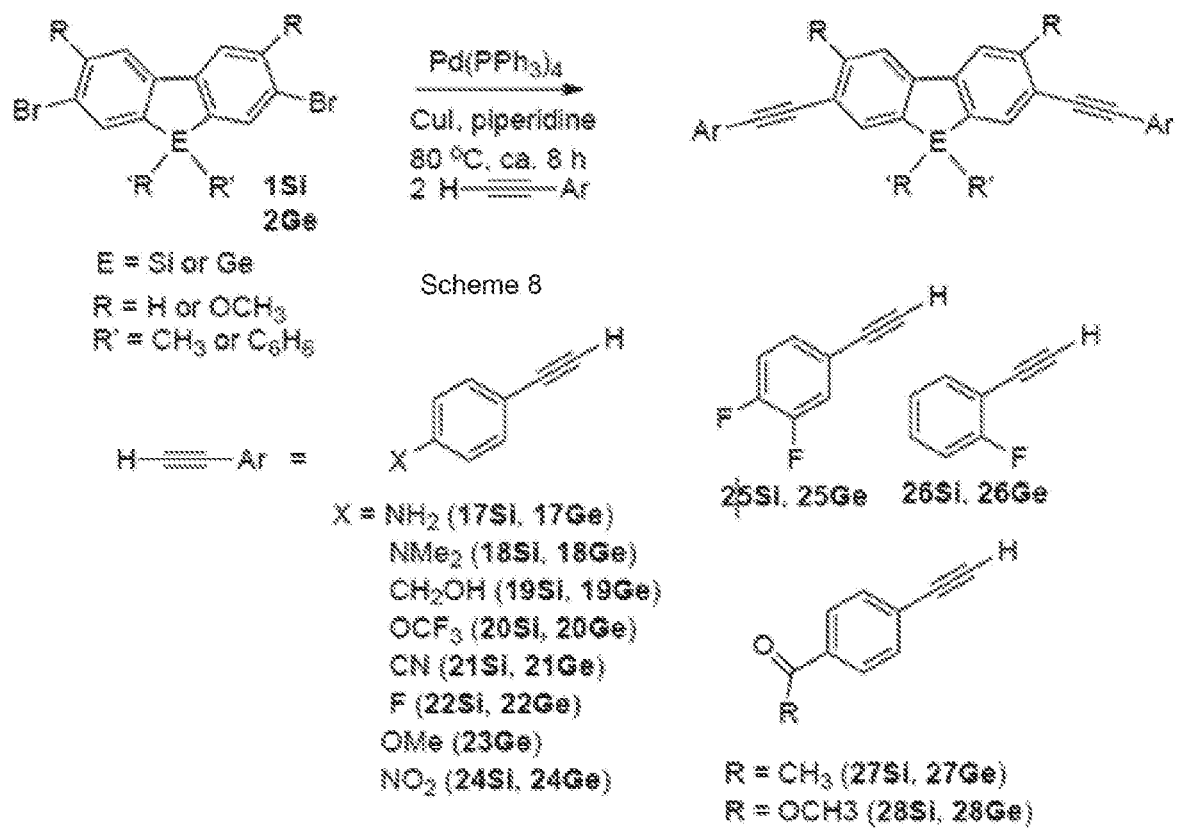
FIG. 42 is an exemplary embodiment depicting methods of synthesis in accordance with the present disclosure (Scheme 8).
Figure 47:
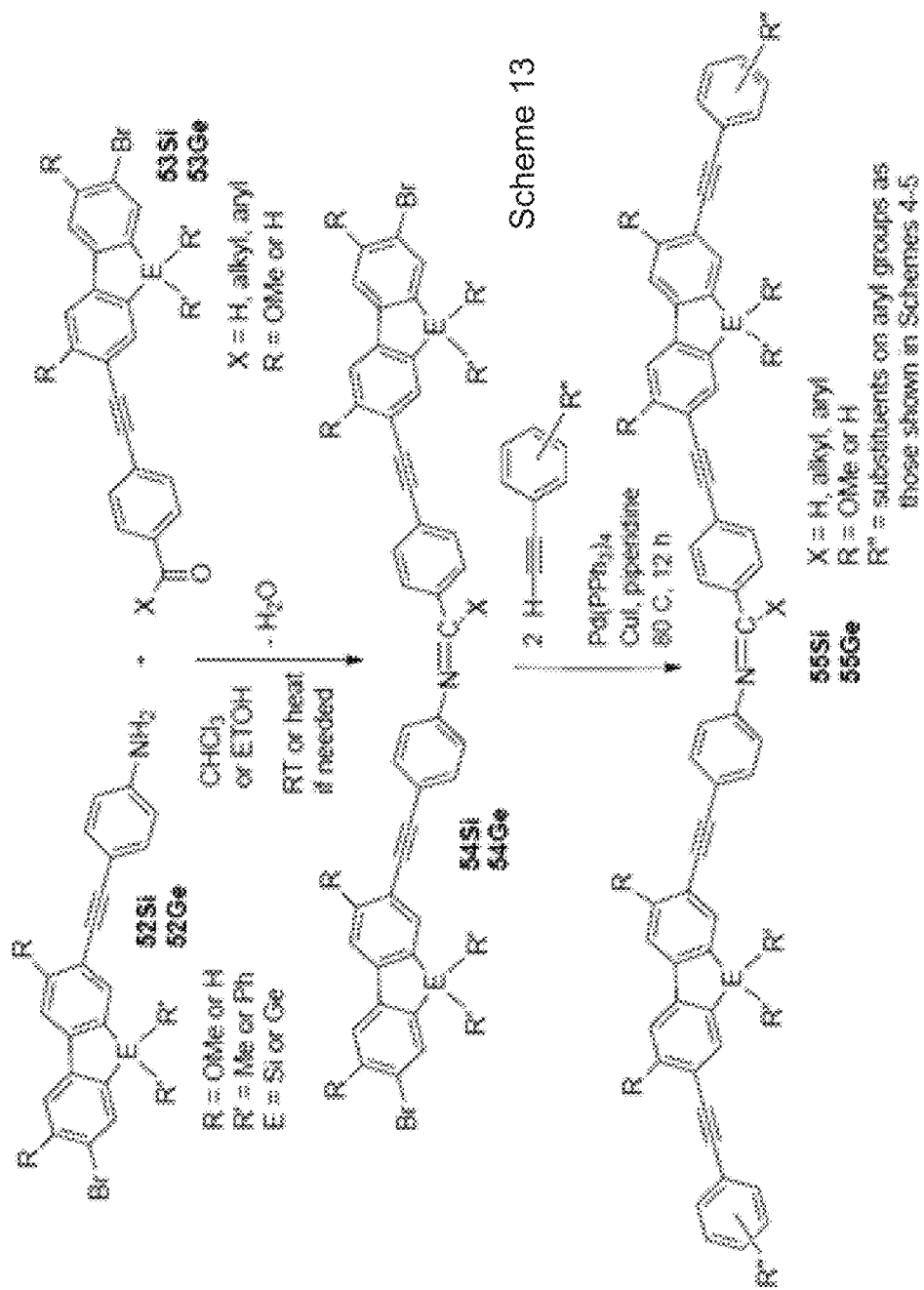
FIG. 47 is an exemplary embodiment depicting methods of synthesis in accordance with the present disclosure (Scheme 13).

The Schiff Base reaction may be performed utilizing a mono-functionalized precursor that contains the -alkynyl(4-aniline) moiety (52Si/52Ge) bound to the 2-position of the sila- or germafluorene with an -alkynyl-(4-arylketone) or -alkynyl(4-arylaldehyde) substituted at the 2-position of another sila- or germafluorene (53Si/53Ge) as shown in Scheme 9. This reaction initially gives a Schiff Base product with a bromo-substituent on each sila- or germafluorene unit (54Si/54Ge) that could be further functionalized with different aryl(alkyne) groups such as those in Scheme 8 (FIG. 42) through a palladium-catalyzed Sonogashira coupling reaction to give a variety of new Schiff base derivatives 55Si/55Ge as shown at the bottom of Scheme 13 (FIG. 47).

Example 15. Biological Applications

Schiff base compounds and their metal complexes exhibit a wide range of biological activities including antibacterial, antitumor and antifungal properties.

For each compound, the extinction coefficients and solubility limits in DMSO (common water miscible solvent used for the preparation of stock solutions), solubility in cellular growth media and buffer (10 mM Tris, pH 8.0) from when diluted from a DMSO stock are determined. The latter determines the concentration limits for use in microscopy.

For each compound, excitation and emission spectra in buffered aqueous solution (i.e. determine $\lambda_{max}$ for both) are collected, and quantum yields are determined to ascertain and compare the potential applications of each compound. Since excitation wavelengths are fixed, due to the use of lasers, on the confocal microscope and emission behavior is determined by these features, it is especially important to optimize these properties through synthesis of compounds with the best wavelength ranges and quantum yields.

Figure 48:
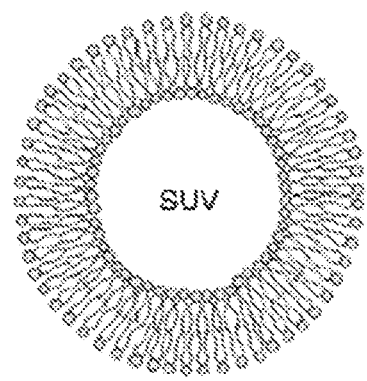
FIG. 48 is an exemplary embodiment of a structure of small unilamellar vesicles in accordance with the present disclosure.

For each compound, changes in excitation and emission spectra are determined when Triton X-100 (micelle 10 nm diameter), CHAPS (micelle 3 nm diameter) and small unilamellar vesicles (SUV) are added. SUVs are composed of phospholipids, are 50 nm in diameter, are easy to make in the lab and have been used extensively in fluorescence studies (FIG. 48). The largest emission enhancements, and the best placement (wavelengths) for emission peaks upon binding of these ligands are desirable. This also reduces the breadth of compounds that are needed to test as cellular stains.

The strength of the interactions, which dictates the sensitivity (concentration regime), may be quantitated to use the interaction as a probe of the interactions of membranes with other ligands such as proteins. These interactions also have use in characterizing membrane phase transitions and other physical characteristics.

9Si can enter *E. coli* and yeast cells, localize and luminesce. This is an exciting result that encourages biological applications. Based on the results described herein, compounds with the most desirable spectral behavior (i.e. excitation and emission $\lambda_{max}$ as well as fold luminescence enhancement in the presence of detergents and/or SUV) are chosen and assessed for their abilities to enter cells and to stain basic cellular structures that often feature membranes. These include organelles like the nucleus and the mitochondria. A variety of cells are tested. Since they are larger than prokaryotes, such as bacteria, easier to image, and have internal organelle structures, eukaryotic cells are the focus. Cells readily available include *E. coli*, yeast, BV2 cells, macrophages, microglial cells, THP1 human monocytes, human neural cells, and HEK 293, among others. Common stains like DAPI are used to map the location of the compounds in the cell.

Example 16. Fold Enhancements

Figure 49:
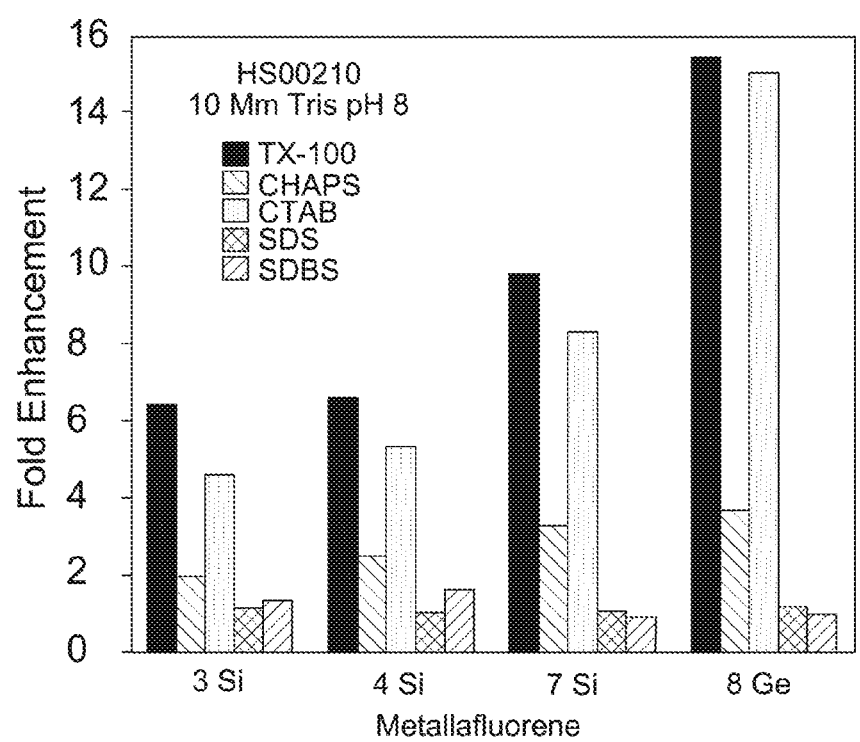
FIG. 49 is an exemplary embodiment of fluorescence of 3Si inside of CHO cells in accordance with the present disclosure.
Figure 50:
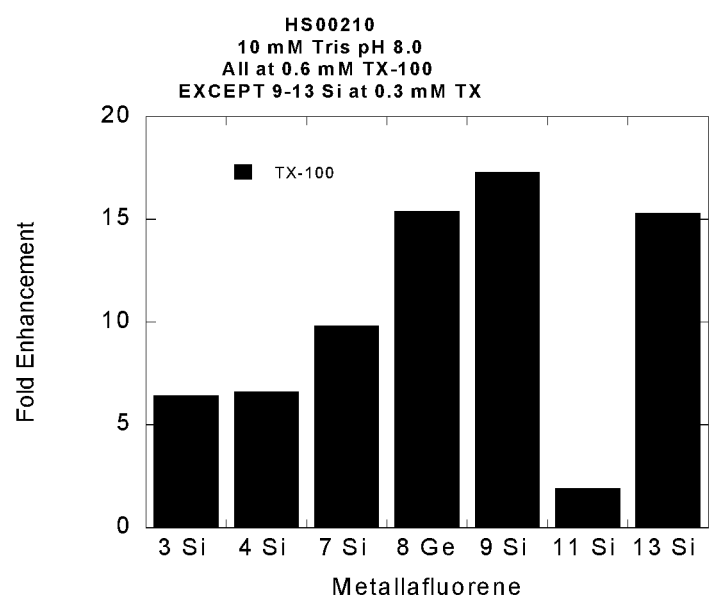
FIG. 50 is an exemplary embodiment of fold enhancements of metallafluorenes in the presence of TX-100 in accordance with the present disclosure.

Fold enhancements were measured in emission in the presence of surfactants TX-100, CHAPS, SDS, SDBS, and CTAB (FIGS. 49-50). Further, the fold enhancements are sensitive to the aggregation state of the surfactants, that is, enhancements are higher above the CMC than below. This means these compounds could be used to detect surfactants in wastewater for example; to detect their aggregation state (and by inference their concentration), and could also possibly be used to detect CMCs of new or unknown surfactants, provided they do not also influence CMC.

Figure 51:
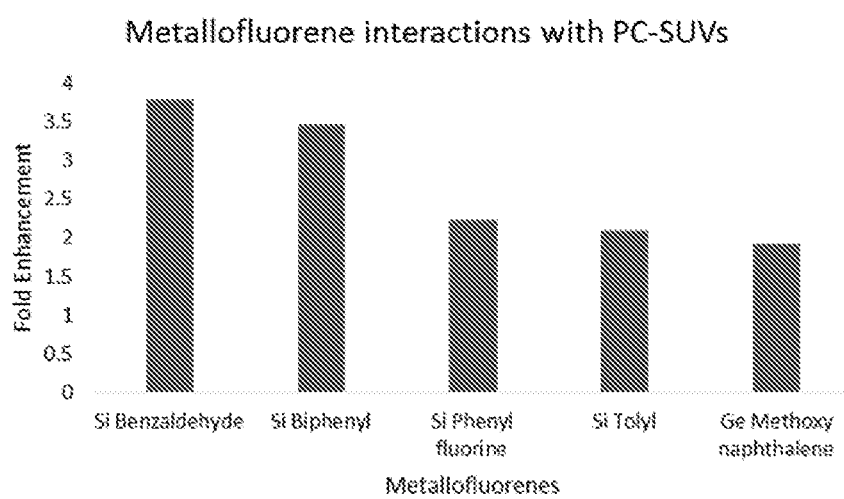
FIG. 51 is an exemplary embodiment of fold enhancements of metallafluorenes in the presence of PC-SUVs in accordance with the present disclosure.

L-α-phosphatidylcholine (PC) derived from egg yolk was used to prepare small unilamellar vesicles (SUVs) via bath sonication. Fluorescence emission of metallafluorenes was measured in the presence and absence of PC-SUVs to assess an interaction (FIG. 51).

Quantum yields were collected for these compounds in aqueous solution and in the presence of the aforementioned surfactants and the data are shown in Table 2. Quantum yields in the presence of surfactants are markedly higher than in their absence. In the presence of detergents, the quantum yield is recovered to near perfect quantum efficiency.

TABLE 2

Quantum yield data.

| Metallafluorene | $\varphi_{DCM}$ | $\varphi_{Tris}$ | $\varphi_{TX}$ | $\varphi_{CHAPS}$ | $\varphi_{CTAB}$ | $\varphi_{SDS}$ | $\varphi_{SBDS}$ |
|---|---|---|---|---|---|---|---|
| 3Si | 0.80 | 0.34 ± 0.005 | 1.0 ± 0.04 | 0.90 ± 0.02 | 0.98 | 0.55 ± 0.03 | 0.49 ± 0.09 |
| 4Si | 0.89 | 0.24 ± 0.01 | 0.97 ± 0.04 | 0.86 | 0.93 | 0.55 | 0.56 |
| 7Si | 0.82 | 0.11 ± 0.01 | 0.94 ± 0.05 | 0.32 | 0.93 | 0.88 ± 0.05 | 0.73 |
| 8Ge | 0.75 | 0.094 ± 0.01 | 0.85 ± 0.06 | 0.93 | 0.99 | 0.30 | 0.47 |

Figure 52:
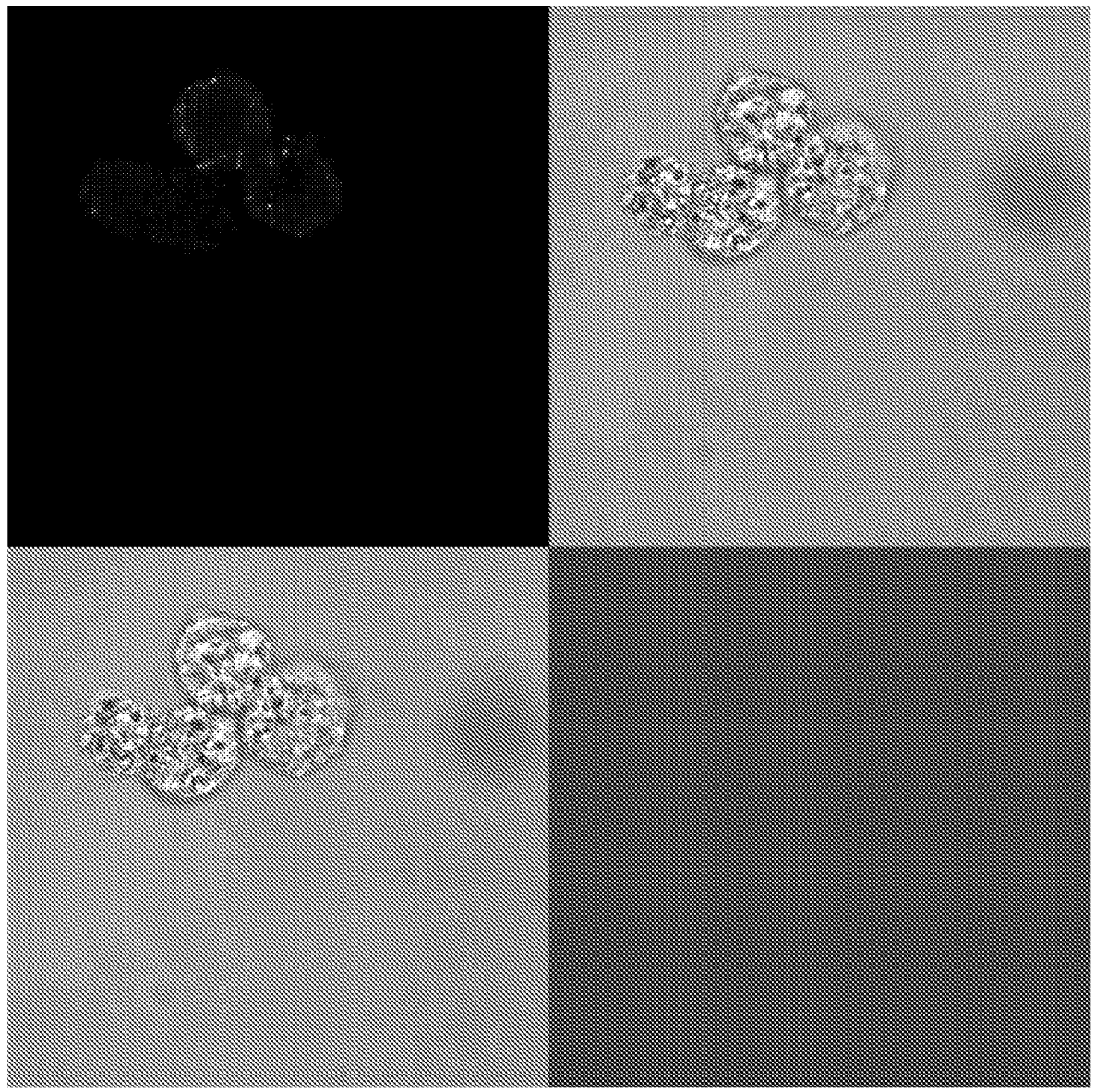
FIG. 52 is an exemplary embodiment of ExpiCHO cells stained with 10 μM 3Si for 15 minutes in accordance with the present disclosure.

Fluorescence of 3Si has been observed inside of CHO cells (FIG. 52). The surfactants are 0.6 mM TX-100, 25 mM CHAPS, 20 mM CTAB, 30 mM SDS, and 10 mM SDBS. ExpiCHO cells were stained with 10 μM 3Si for 15 minutes. Experimental details include Gains: 762; Digital gains: 2.3; Pinhole: 1 AU; and 2% Laser intensity.

Although specific features and applications of various embodiments of the disclosure may be shown in some drawings and not in others, this is for convenience only. In accordance with the principles of the disclosure, any feature illustrated herein may be referenced and/or claimed in combination with any feature.

In the specification and the claims, reference is made to a number of terms, which shall be defined to have the following meanings. The singular forms "a," "an," and "the" include plural references unless the context clearly dictates otherwise. The terms "comprising," "including," and "having" are intended to be inclusive and mean that there may be additional elements other than the listed elements. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

What is claimed is:

1. A method of measuring luminescence, the method comprising introducing a composition comprising
a compound of Formula I,

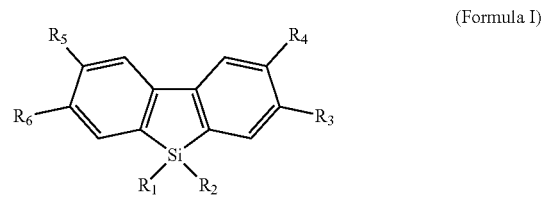

(Formula I)

wherein $R_1$ and $R_2$ are each independently selected from the group consisting of hydrogen, alkyl, and aryl; and wherein $R_3$, $R_4$, $R_5$, and $R_6$ are each independently selected from the group consisting of hydrogen, alkoxy, Y, and

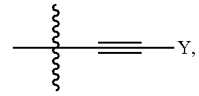

with the proviso that at least two of $R_3$, $R_4$, $R_5$, and $R_6$ are selected from the group consisting of Y and

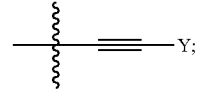

wherein Y is selected from the group consisting of aryl, substituted aryl, heteroaryl, and substituted heteroaryl;

a solvent; and a detergent;

optically exciting the composition; and measuring luminescence produced by the compound of Formula I.

2. The method according to claim 1, wherein the method step of introducing the composition comprises introducing the composition into a live cell.

3. The method according to claim 1, wherein the detergent is selected from the group consisting of anionic detergents, nonionic detergents, cationic detergents, zwitterionic detergents, and combinations thereof.

4. The method according to claim 1, wherein the method step of optically exciting the composition comprises irradiating the composition with a visible light source.

5. The method according to claim 1, wherein the solvent is a polar, water miscible solvent selected from the group consisting of acetonitrile, isopropyl alcohol, DMSO, and combinations thereof.

6. A method of measuring luminescence, the method comprising
introducing a composition comprising
a compound of Formula IV,

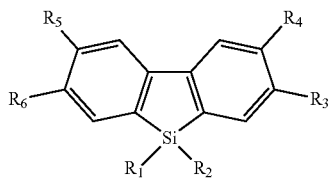
(Formula I)

wherein $R_1$ and $R_2$ are each independently selected from the group consisting of hydrogen, alkyl, and aryl; and
wherein $R_3$, $R_4$, $R_5$, and $R_6$ are each independently selected from the group consisting of hydrogen, alkoxy, Y, and ⸺≡⸺ with the proviso that at least two of $R_3$, $R_4$, $R_5$, and $R_6$ are selected from the group consisting of Y and ⸺≡⸺;
wherein Y is selected from the group consisting of

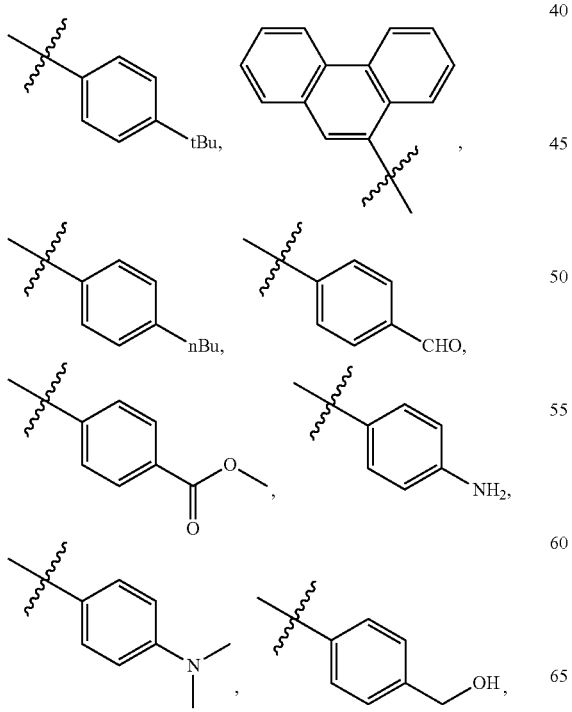

-continued

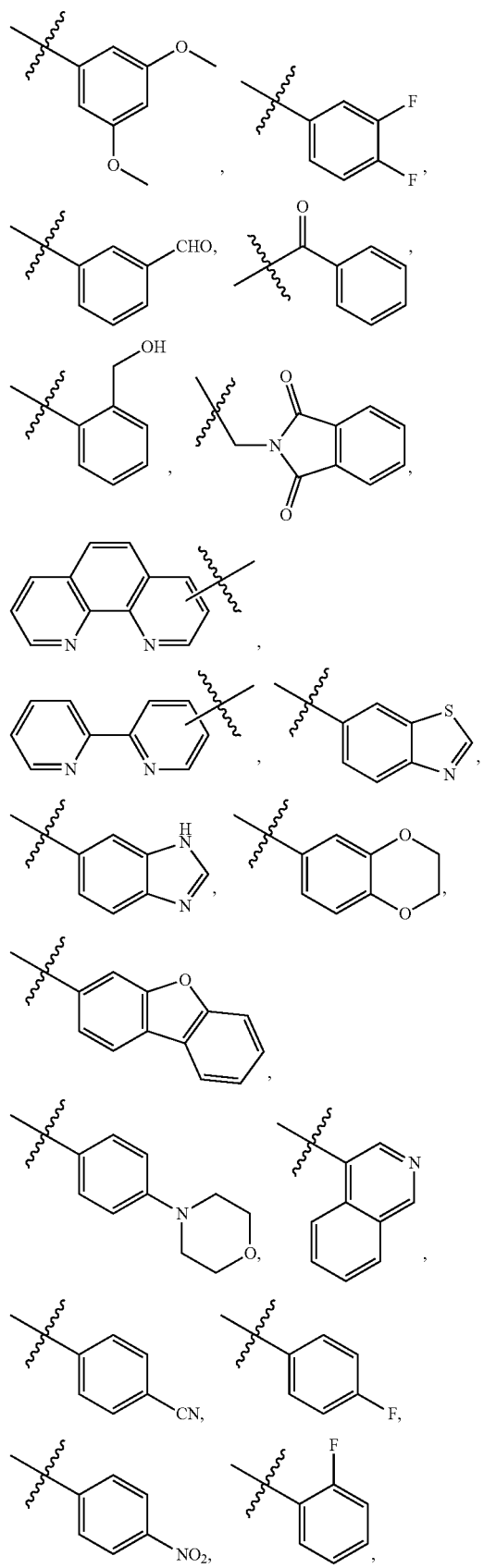

-continued

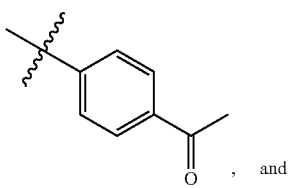

, and

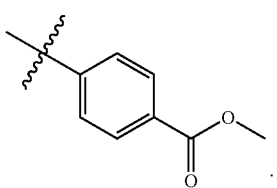

.

a solvent; and
a detergent;
optically exciting the composition; and
measuring luminescence produced by the compound of Formula IV.

7. The method according to claim 6, wherein the method step of introducing the composition comprises introducing the composition into a live cell.

8. The method according to claim 6, wherein the detergent is selected from the group consisting of anionic detergents, nonionic detergents, cationic detergents, zwitterionic detergents, and combinations thereof.

9. The method according to claim 6, wherein the method step of optically exciting the composition comprises irradiating the composition with a visible light source.

10. The method according to claim 6, wherein the solvent is a polar, water miscible solvent selected from the group consisting of acetonitrile, isopropyl alcohol, DMSO, and combinations thereof.

* * * * *